US012138765B2

(12) United States Patent
Yagi et al.

(10) Patent No.: US 12,138,765 B2
(45) Date of Patent: Nov. 12, 2024

(54) STAPLE REMOVAL DEVICE

(71) Applicant: MAX CO., LTD., Tokyo (JP)

(72) Inventors: Nobuaki Yagi, Tokyo (JP); Katsuya Hakozaki, Tokyo (JP); Kazuya Igata, Tokyo (JP)

(73) Assignee: Max Co., Ltd., Tokyo (JP)

( * ) Notice: Subject to any disclaimer, the term of this patent is extended or adjusted under 35 U.S.C. 154(b) by 412 days.

(21) Appl. No.: 17/631,411

(22) PCT Filed: Jul. 31, 2020

(86) PCT No.: PCT/JP2020/029515
§ 371 (c)(1),
(2) Date: Jan. 28, 2022

(87) PCT Pub. No.: WO2021/020573
PCT Pub. Date: Feb. 4, 2021

(65) Prior Publication Data

US 2022/0274237 A1 Sep. 1, 2022

(30) Foreign Application Priority Data

Aug. 1, 2019 (JP) ................................. 2019-142574
Aug. 1, 2019 (JP) ................................. 2019-142575
(Continued)

(51) Int. Cl.
*B25C 11/00* (2006.01)

(52) U.S. Cl.
CPC .................................... *B25C 11/00* (2013.01)

(58) Field of Classification Search
CPC ... B25C 11/00; B25C 5/00; B25C 5/16; B27F 7/19
See application file for complete search history.

(56) References Cited

U.S. PATENT DOCUMENTS 3,528,643 A * 9/1970 Ricci ........................ B25C 11/00 227/63
4,901,981 A 2/1990 Knippels et al.
(Continued)

FOREIGN PATENT DOCUMENTS

CN 2395852 Y 9/2000
CN 101941196 A 1/2011
(Continued)

OTHER PUBLICATIONS

International Search Report for PCT/JP2020/029515 dated Sep. 8, 2020 (5 pp.) with English Translation.
(Continued)

*Primary Examiner* — Lee D Wilson
(74) *Attorney, Agent, or Firm* — Banner & Witcoff, Ltd.

(57) ABSTRACT

A staple removing device includes: a placing table on which a sheet bundle bound by a staple is placed; a removing part located below the placing table, configured to remove the staple from the sheet bundle placed on the placing table, and including a tip end portion that can be inserted between the sheet bundle and the staple and is configured to be movable along the placing table between a standby position and a removal position and to be inserted between the sheet bundle and the staple when the tip end portion moves to the removal position; and a first motor configured to move the removing part, wherein the tip end portion moves while maintaining a state of protruding from the placing table via an opening portion at least until passing through the removal position from a front of the removal position.

9 Claims, 69 Drawing Sheets

(30) Foreign Application Priority Data

| | | |
|---|---|---|
| Oct. 7, 2019 | (JP) | 2019-184850 |
| Jul. 10, 2020 | (JP) | 2020-119478 |

(56) References Cited

U.S. PATENT DOCUMENTS

| | | | | |
|---|---|---|---|---|
| 11,279,015 B2 * | 3/2022 | Hakozaki | B25C 11/00 | |
| 11,623,332 B2 * | 4/2023 | Yagi | B25C 11/00 254/28 | |
| 2004/0022563 A1 | 2/2004 | Maruchi et al. | | |
| 2010/0006618 A1 | 1/2010 | Ambjornsson et al. | | |
| 2013/0127108 A1 * | 5/2013 | Shiraishi | B65H 3/08 271/11 | |
| 2013/0206810 A1 * | 8/2013 | Kato | B25C 5/025 227/68 | |
| 2019/0184537 A1 * | 6/2019 | Hakozaki | B25C 11/00 | |
| 2021/0402582 A1 * | 12/2021 | Yagi | B25C 11/00 | |
| 2022/0176533 A1 * | 6/2022 | Yagi | B25C 11/00 | |
| 2022/0274237 A1 * | 9/2022 | Yagi | B25C 11/00 | |
| 2023/0242372 A1 * | 8/2023 | Jariabka | B65H 83/02 270/1.01 | |

FOREIGN PATENT DOCUMENTS

| | | | |
|---|---|---|---|
| CN | 103507032 | A | 1/2014 |
| CN | 104589284 | A | 5/2015 |
| CN | 205521223 | U | 8/2016 |
| CN | 107598848 | A | 1/2018 |
| JP | S63-180481 | A | 7/1988 |
| JP | 05-016161 | A | 3/1993 |
| JP | H05-088881 | U | 12/1993 |
| JP | 08-141935 | A | 6/1996 |
| JP | H10-166282 | A | 6/1998 |
| JP | 4078728 | B2 | 4/2008 |
| JP | 5571264 | B1 | 8/2014 |
| JP | 2016-101653 | A | 6/2016 |
| JP | 2018-192563 | A | 12/2018 |
| JP | 2019-022923 | A | 2/2019 |
| KR | 1998-0024801 | U | 7/1998 |
| KR | 2012-0004392 | U | 6/2012 |
| NL | 2006273 | C2 | 8/2012 |
| WO | 2018/056360 | A1 | 3/2018 |

OTHER PUBLICATIONS

Written Opinion for PCT/JP2020/029515 dated Sep. 8, 2020 (4 pp.).

Extended European Search Report dated Jul. 21, 2023, issued by the European Patent Office in the corresponding European Patent Application No. 20847961.8. (5 pages).

* cited by examiner

STAPLE REMOVAL DEVICE

CROSS-REFERENCE TO RELATED APPLICATION

This application is a 371 National Phase Application of International Patent Application PCT/JP2020/029515, filed Jul. 31, 2020, which claims priority to Japanese Patent Application No. 2019-142574, filed Aug. 1, 2019, Japanese Patent Application No. 2019-142575, filed Aug. 1, 2019, Japanese Patent Application No. 2019-184850, filed Oct. 7, 2019, and Japanese Patent Application No. 2020-119478, filed Jul. 10, 2020, respectively, the entire contents of which are incorporated herein by reference and priority is claimed to each.

TECHNICAL FIELD

The present disclosure relates to a staple removing device.

BACKGROUND ART

In the related art, disclosed is a technology relating to a staple removing device configured to remove a staple from a sheet bundle (PTLs 1 and 2). This type of the staple removing device is configured to remove the staple from the sheet bundle by inserting a wedge-shaped plate between the sheet bundle and a crown portion of the staple.

PTL 1 discloses a staple removing device in which a staple removing means is arranged at a vertically lower position with respect to a sheet bundle and is driven to remove a staple from the vertically lower position by a driving means. In addition, PTL 2 discloses a staple removing device for a staple needle having a leg portion erecting process of erecting both leg portions of a staple needle to a predetermined state, and a needle removing process of inserting a needle pullout/erecting piece, which is configured to move in parallel to an inserting/erecting fork protruding piece, on a central main body portion of the staple needle exposed on a bound sheet between the bound sheet and the staple needle, so as to largely increase a distance between the central main body portion of the staple needle and a surface of the bound sheet.

CITATION LIST

Patent Literature

PTL 1: JP-A-2019-022923

PTL 2: Japanese Patent No. 5,571,264

SUMMARY OF INVENTION

Technical Problem

However, the staple removing device of the related art has following problems. That is, in PTL 1, since the staple removing means rotates to remove the staple from the lower position, there is theoretically only one point where a height of a claw from a placing table is greatest. Therefore, if the staple to be removed is not set correctly at the point, the claw is not inserted between the crown portion of the staple and the sheet surface, resulting in poor removal of the staple.

Further, according to PTL 2, the needle pullout/erecting piece is moved in parallel, a removing point of the staple is a plane, not a point. However, when the needle pullout/erecting piece is moved in parallel to the placing table, a tip end portion thereof may be caught at the crown portion of the staple, so that the needle pullout/erecting piece cannot be smoothly inserted between the crown portion and the sheet surface.

Therefore, in order to solve the above-described problems, an object of the present invention is to provide a staple removing device capable of preventing poor removal by enabling easy insertion of a tip end of a removing part between a sheet bundle and a crown portion of a staple when removing the staple from the sheet bundle.

Solution to Problem

A first aspect of the present disclosure relates to a staple removing device including a placing table on which a sheet bundle bound by a staple is placed; a sheet pressing part configured to press against the sheet bundle placed on the placing table; a removing part located below the placing table, configured to remove the staple from the sheet bundle placed on the placing table, and including a tip end portion that can be inserted between the sheet bundle and the staple and is configured to be movable along the placing table between a first position and a second position and to be inserted between the sheet bundle and the staple when the tip end portion moves to the second position; and a motor configured to move the removing part, wherein the placing table is provided with an opening into which the tip end portion can protrude, and wherein the tip end portion moves while maintaining a state of protruding from the placing table via the opening at least until passing through the second position from a front of the second position.

Advantageous Effects of Invention

According to the present disclosure, the tip end portion of the removing part is moved in the state of protruding from the placing table until passing through the second position from the front of the second position. Therefore, the tip end portion of the removing part can be easily inserted between the sheet bundle and the staple, so that it is possible to prevent poor removal during a removing operation.

BRIEF DESCRIPTION OF DRAWINGS

FIG. 20B is an enlarged view of main parts of the wedge plate and the placing table shown in FIG. 22A.

FIG. 47C is a perspective view showing the operation of the removing part.

FIG. 47D is a perspective view showing the operation of the removing part.

FIG. 47E is a perspective view showing the operation of the removing part.

FIG. 48A shows states of the wedge plate and the staple when removing the staple from the sheet bundle.

FIG. 48B shows the states of the wedge plate and the staple when removing the staple from the sheet bundle.

FIG. 48C shows the states of the wedge plate and the staple when removing the staple from the sheet bundle.

FIG. 48D shows the states of the wedge plate and the staple when removing the staple from the sheet bundle.

FIG. 48E shows the states of the wedge plate and the staple when removing the staple from the sheet bundle.

FIG. 49A is a plan view of a removing part according to a modified embodiment 3-2.

FIG. 49B is a side view of the removing part according to the modified embodiment 3-2.

FIG. 49C is a bottom view of the removing part according to the modified embodiment 3-2.

FIG. 49D is a cross-sectional view taken along a B-B line of the wedge plate shown in FIG. 49A.

Figure 50:
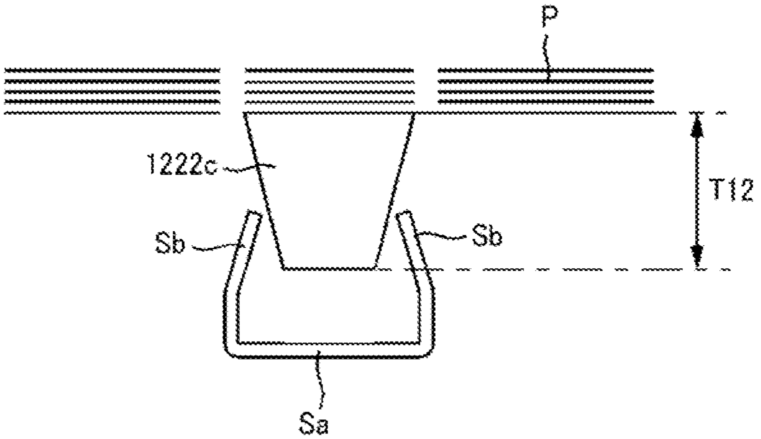

FIG. 50 shows states of the wedge plate and the staple when removing the staple from the sheet bundle according to the modified embodiment 3-2.

Figure 51A:
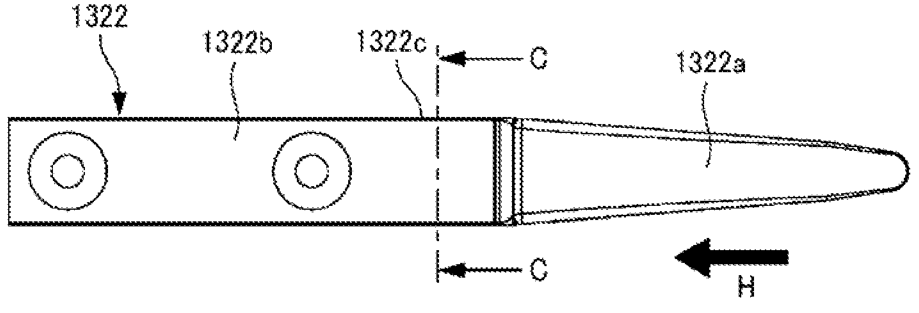

FIG. 51A is a plan view of a removing part according to a modified embodiment 3-3.

Figure 51B:
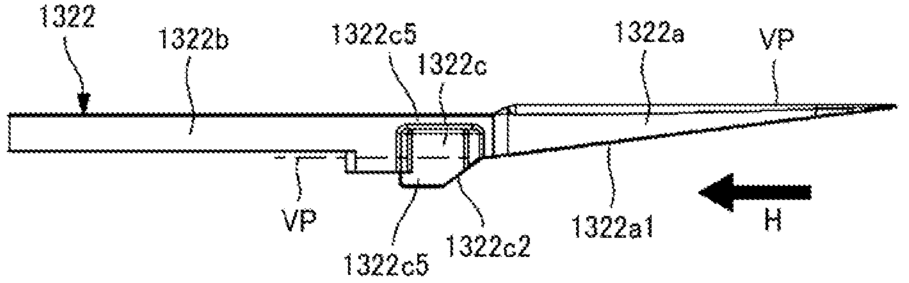

FIG. 51B is a side view of the removing part according to the modified embodiment 3-3.

Figure 51C:
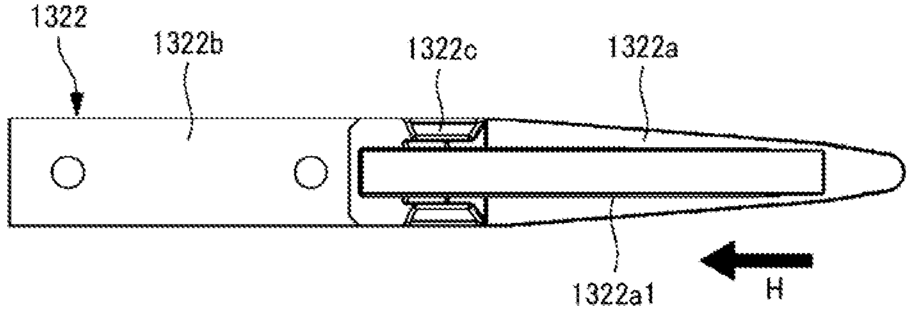

FIG. 51C is a bottom view of the removing part according to the modified embodiment 3-3.

Figure 51D:
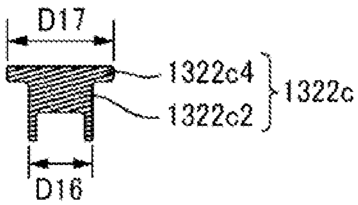

FIG. 51D is a cross-sectional view taken along a C-C line of the removing part shown in FIG. 51A.

Figure 52A:
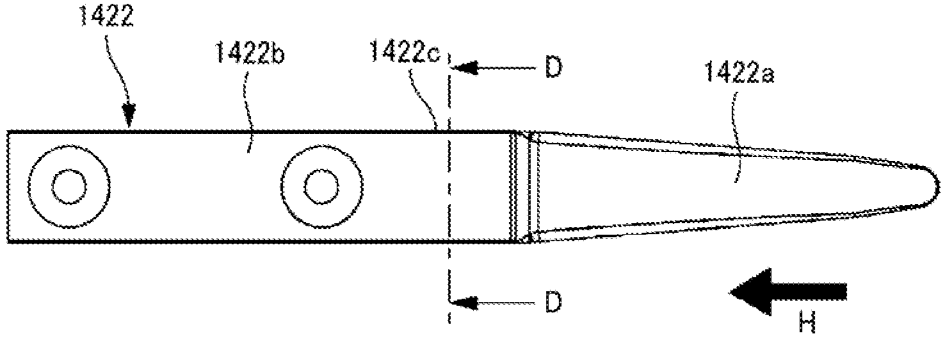

FIG. 52A is a plan view of a removing part according to a modified embodiment 3-4.

Figure 52B:
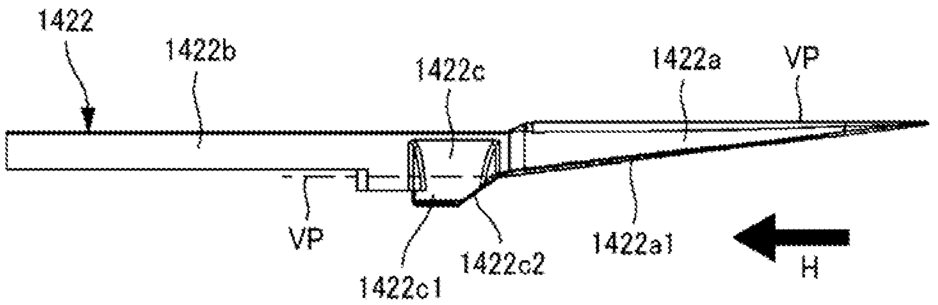

FIG. 52B is a side view of the removing part according to the modified embodiment 3-4.

Figure 52C:
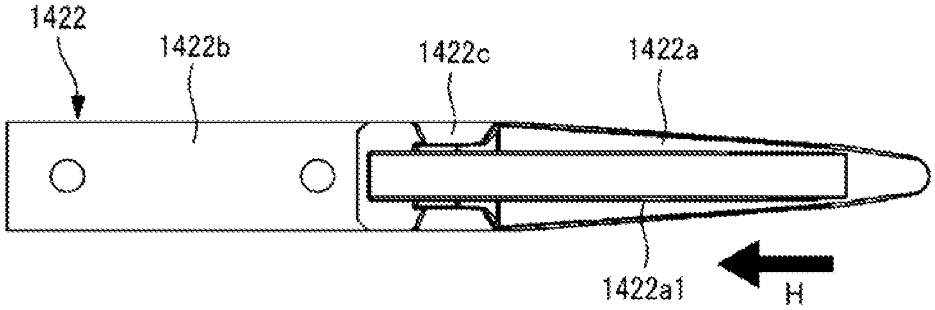

FIG. 52C is a bottom view of the removing part according to the modified embodiment 3-4.

Figure 52D:
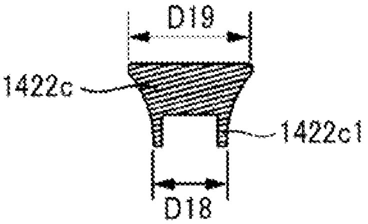

FIG. 52D is a cross-sectional view taken along a D-D line of the removing part shown in FIG. 52A according to the modified embodiment 3-4.

Figure 53A:
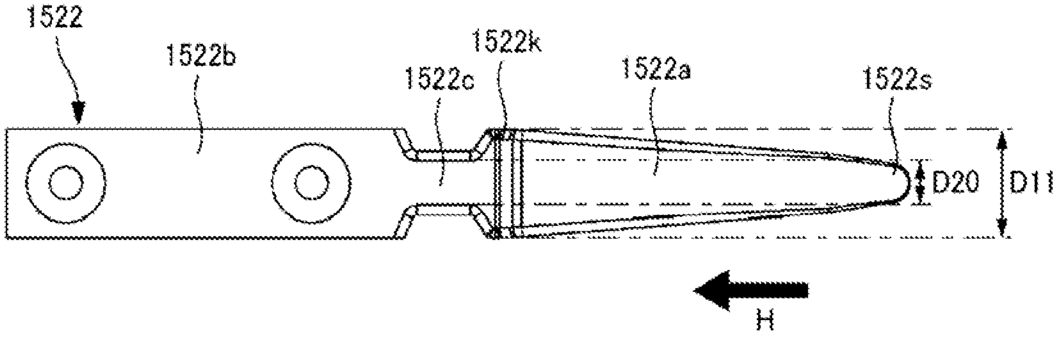

FIG. 53A is a plan view of a removing part according to a modified embodiment 3-5.

Figure 53B:
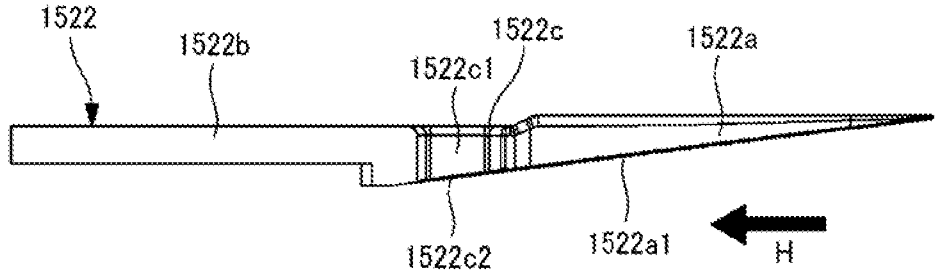

FIG. 53B is a side view of the removing part according to the modified embodiment 3-5.

Figure 53C:
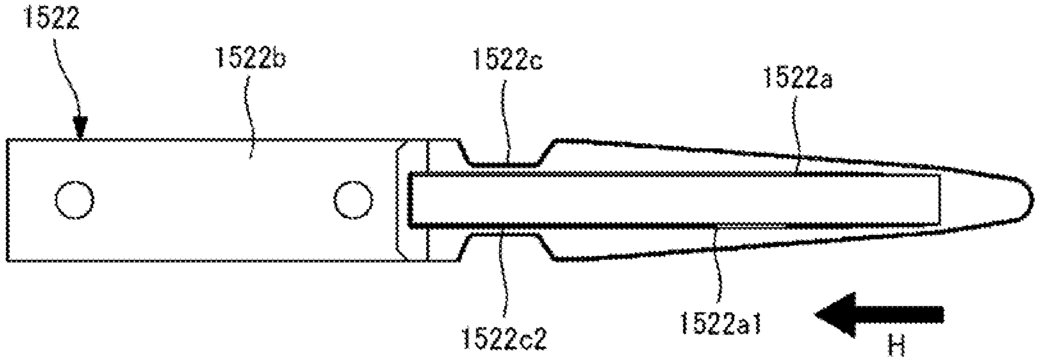

FIG. 53C is a bottom view of the removing part according to the modified embodiment 3-5.

DESCRIPTION OF EMBODIMENTS

Hereinafter, favorable embodiments of the present disclosure will be described in detail with reference to the drawings.

First Embodiment

Example of External Configuration of Staple Removing Device 1A

Figure 1A:
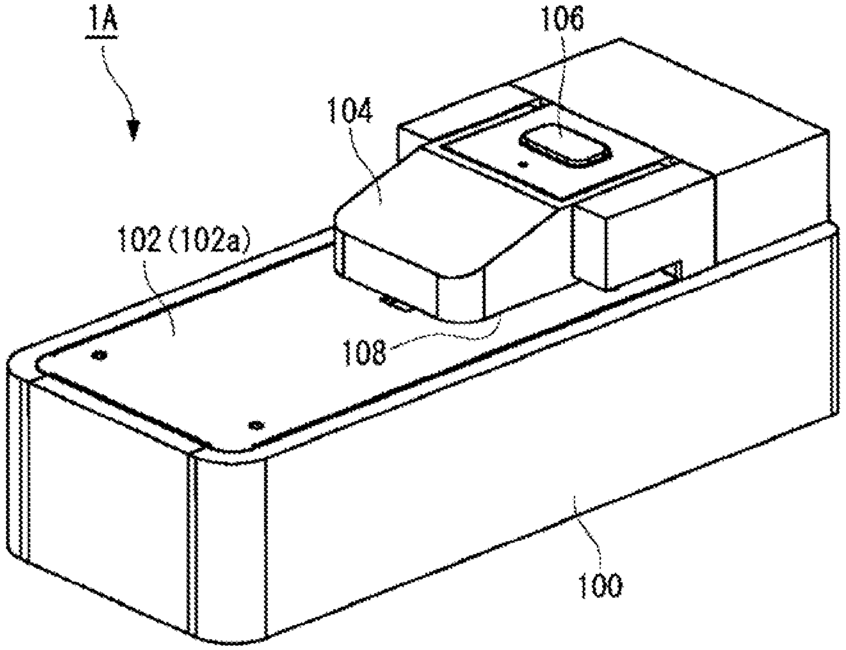
FIG. 1A is a front perspective view of a staple removing device according to a first embodiment.
Figure 1B:
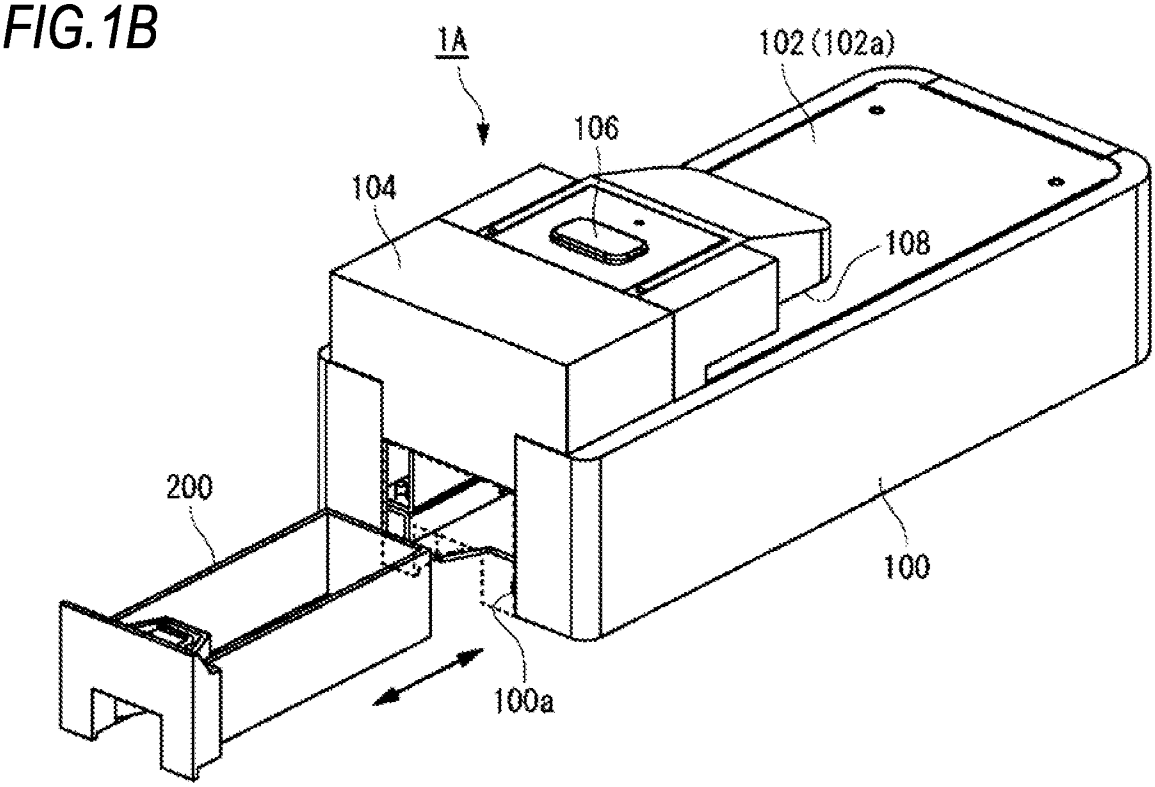
FIG. 1B is a rear perspective view of the staple removing device according to the first embodiment.
Figure 2A:
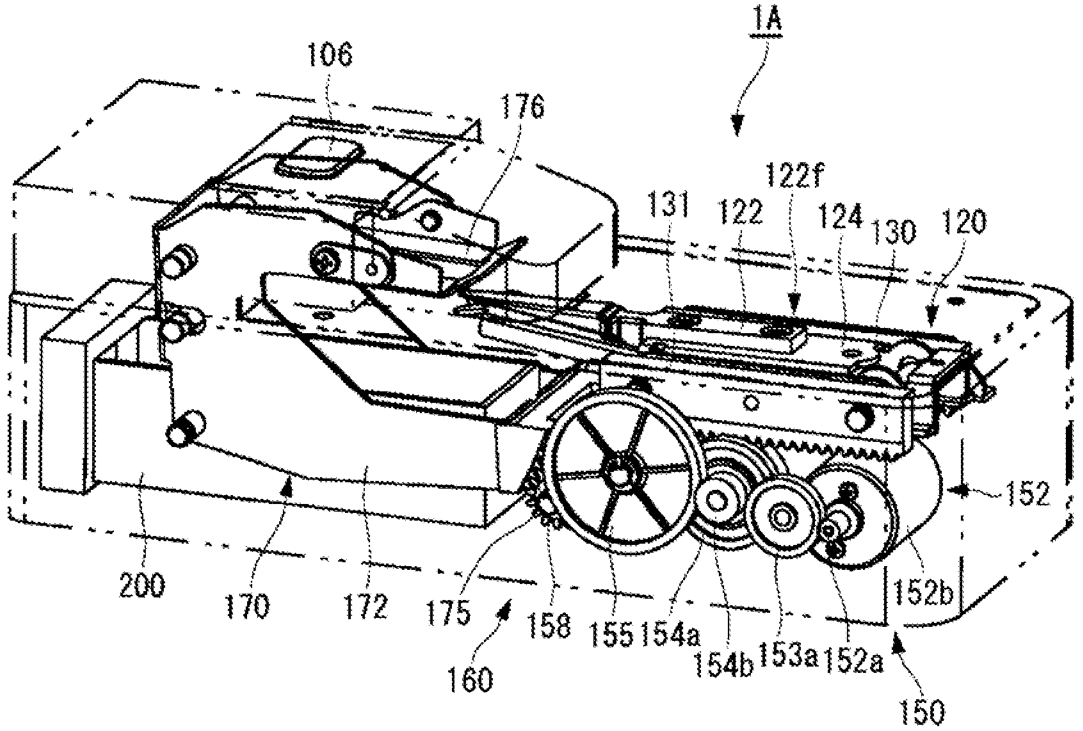
FIG. 2A is a right front perspective view of an inside of the staple removing device when a removing part according to the first embodiment is at a standby position.
Figure 2B:
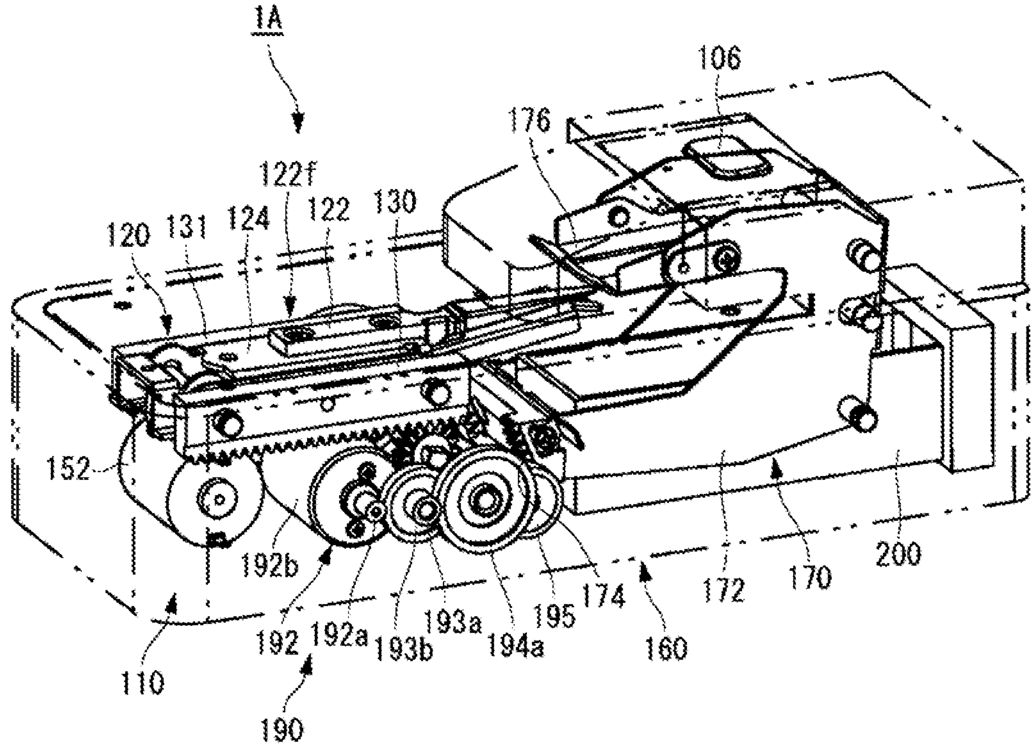
FIG. 2B is a left front perspective view of the inside of the staple removing device when the removing part according to the first embodiment is at the standby position.

FIG. 1A is a front perspective view of a staple removing device 1A, and FIG. 1B is a rear perspective view of the staple removing device 1A. In addition, FIG. 2A is a right front left rear perspective view of an inside of the staple removing device 1A, and FIG. 2B is a left front right rear perspective view of the inside of the staple removing device 1A.

The staple removing device 1A is a device for automatically removing a staple from a sheet bundle bound by the staple, and includes a housing 100 having a substantially cuboid shape, a placing table 102 on which the sheet bundle is placed, a removing part 120 located below the placing table 102 (inside the housing 100 with respect to the placing table 102) and configured to remove the staple from the sheet bundle placed on the placing table 102, a first motor 152 configured to drive the removing part 120, and an accommodation part 200 configured to accommodate the staple removed by the removing part 120.

A cover part 104 configured to cover a part of the placing table 102 is provided above the placing table 102 (a side on which the sheet bundle is placed with respect to the placing table 102). A predetermined gap is formed between the cover part 104 and the placing table 102, and the sheet bundle is inserted into the gap. A start switch 106 for operating the staple removal device 1A is provided on an upper surface of the cover part 104. Note that, in the present embodiment, a side on which the accommodation part 200 is provided is referred to as a rear side of the staple removing device 1A, and an opposite side is referred to as a front side of the staple removing device 1A.

The housing 100 is a substantially cuboid box body whose upper side is open, and is provided therein with the removing part 120, the first motor 152, the accommodation part 200, and the like.

The placing table 102 is provided to cover the upper opening of the housing 100, and has a placing surface 102*a* for placing a sheet bundle. The placing surface 102*a* is formed with an opening portion 102*b* so that a portion of the removing part 120 can protrude.

The removing part 120 has a predetermined length from a tip end portion 122*s* to a base end portion 122*k*. The removing part 120 has a wedge plate main body 122*a*, which is a first portion including a tip end portion 122*s* that can be inserted between a sheet bundle and (a crown portion Sa of) a staple and configured to remove the staple from the sheet bundle, a wedge plate base portion 122*f*, which is a second portion configured to drive by a drive force of the first motor 152 received by racks 130 and 131, and a narrowed portion 122*c*, which is a third portion located between the first portion and the second portion.

The wedge plate main body 122*a* is constituted by an elongated plate-shaped member, and at least the tip end portion 122*s* thereof is formed in a wedge shape so as to be easily inserted between the sheet bundle and the staple and to easily pull out the staple from the sheet bundle. In the present embodiment, the wedge plate main body 122*a* has a tapered shape from the base end portion 122*k* toward the tip end portion 122*s*. Specifically, the wedge plate main body is configured so that a plate thickness gradually decreases from the base end portion 122*k* toward the tip end portion 122*s*, in side view, and is also configured so that a plate width gradually decreases toward the tip end portion 122*s*, in top view.

Figure 4:
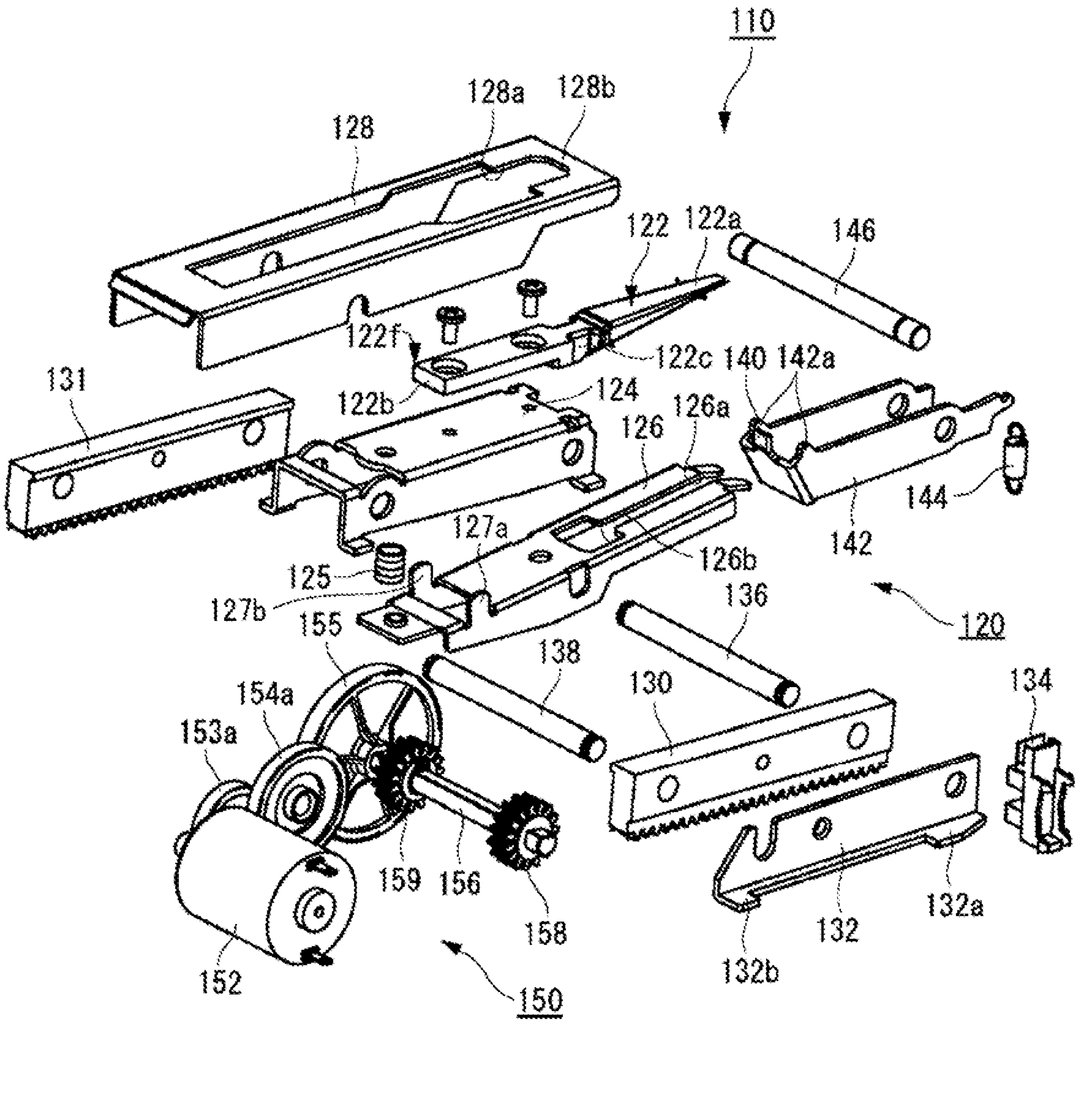
FIG. 4 is an exploded perspective view of a staple pullout mechanism according to the first embodiment.

The wedge plate base portion 122*f* has roles of supporting the wedge plate main body 122*a* via the narrowed portion 122*c*, and receiving power from the first motor 152 by the racks 130 and 131 and transmitting the power to the wedge plate main body 122*a*. As shown in FIG. 4 and the like, the wedge plate base portion 122*f* has a blade holder 124 constituted by a flat plate having a substantially U-shaped section, and a pair of racks 130 and 131 attached to side surfaces of the blade holder 124. The wedge plate main body 122*a* and an attaching portion 122*b* extending from the wedge plate base portion 122*f* are attached to an upper surface of the blade holder 124. Each of the racks 130 and 131 is a plate-shaped member having substantially the same length as a longitudinal direction of the blade holder 124, is formed on its lower surface with a plurality of teeth (rack) in mesh with a pinion 158, which will be described later, and is configured to receive a drive force of the first motor 152.

A sheet bundle insertion opening 108 for setting a sheet bundle in the cover part 104 is provided between the placing table 102 and the cover part 104. The start switch 106 is provided on the upper surface of the cover part 104 so as for a user to easily operate, and is constituted by a button for operating the staple removing device 1A. The accommodation part 200 is a box body whose upper side is open, and is configured to be insertable/removable with respect to an opening portion 100*a* formed on a rear end surface of the housing 100. The accommodation part 200 is arranged in a space part behind and below a central part in the housing 100.

Figure 17A:
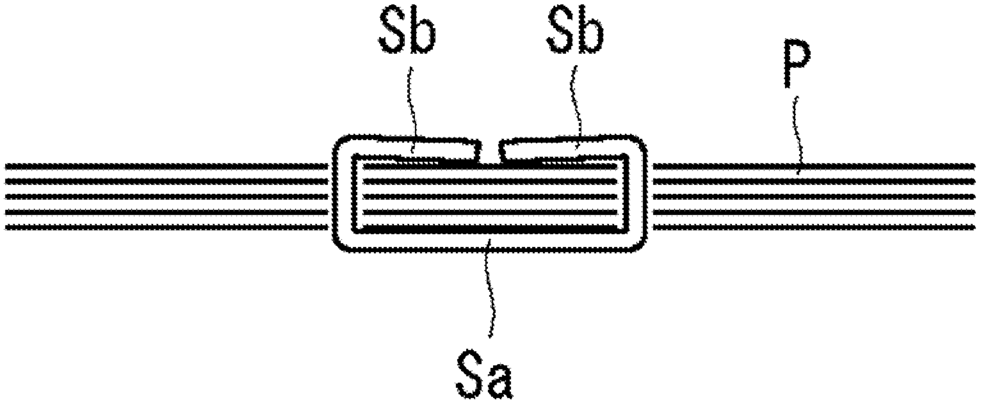
FIG. 17A shows states of the wedge plate and the staple when removing the staple from the sheet bundle according to the first embodiment.

Here, for convenience, a staple S in a state of binding a sheet bundle P is described with reference to FIG. 17A, which will be described later. The staple S has a crown portion Sa and a pair of leg portions Sb and Sb formed by bending both end portions in a longitudinal direction of the crown portion Sa. A sheet bundle P is bound by causing the pair of leg portions Sb and Sb to penetrate a plurality of stacked sheets from the lowermost sheet toward the uppermost sheet and bending inwardly the penetrating leg portions Sb and Sb. A binding position of the staple S is, for example, a corner portion or an edge portion of the sheet. In the present embodiment, the staple S is removed from such sheet bundle P.

Example of Internal Configuration of Staple Removing Device 1A

Figure 2C:
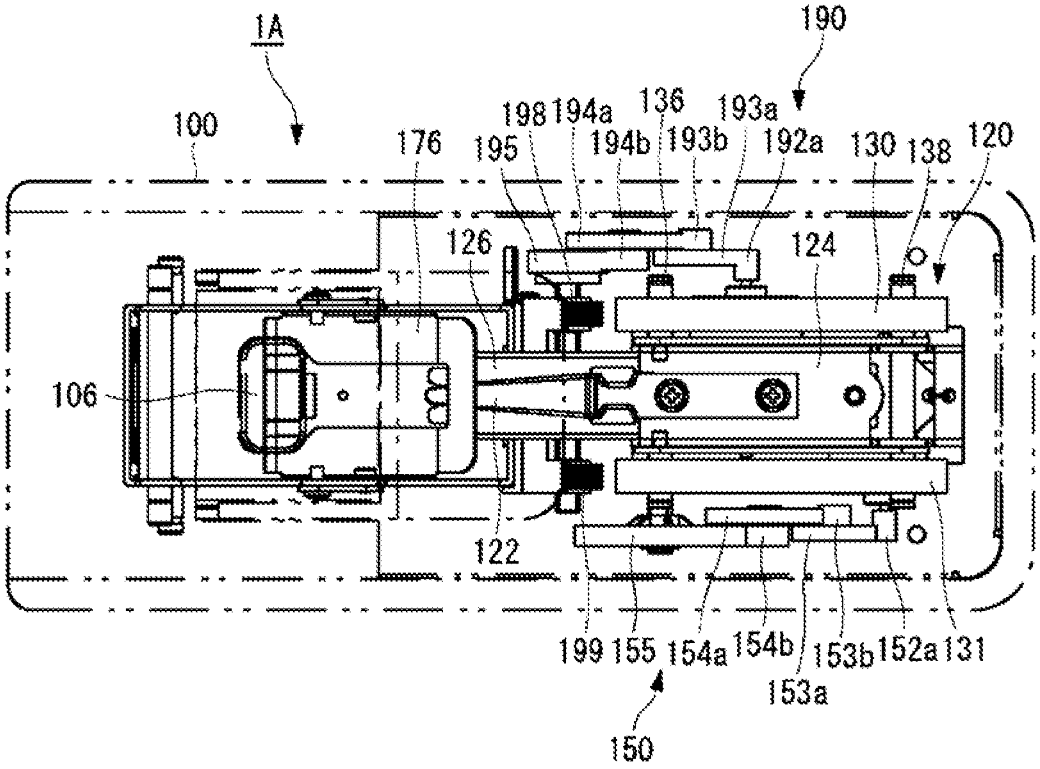
FIG. 2C is a plan view of the inside of the staple removing device when the removing part according to the first embodiment is at the standby position.
Figure 2D:
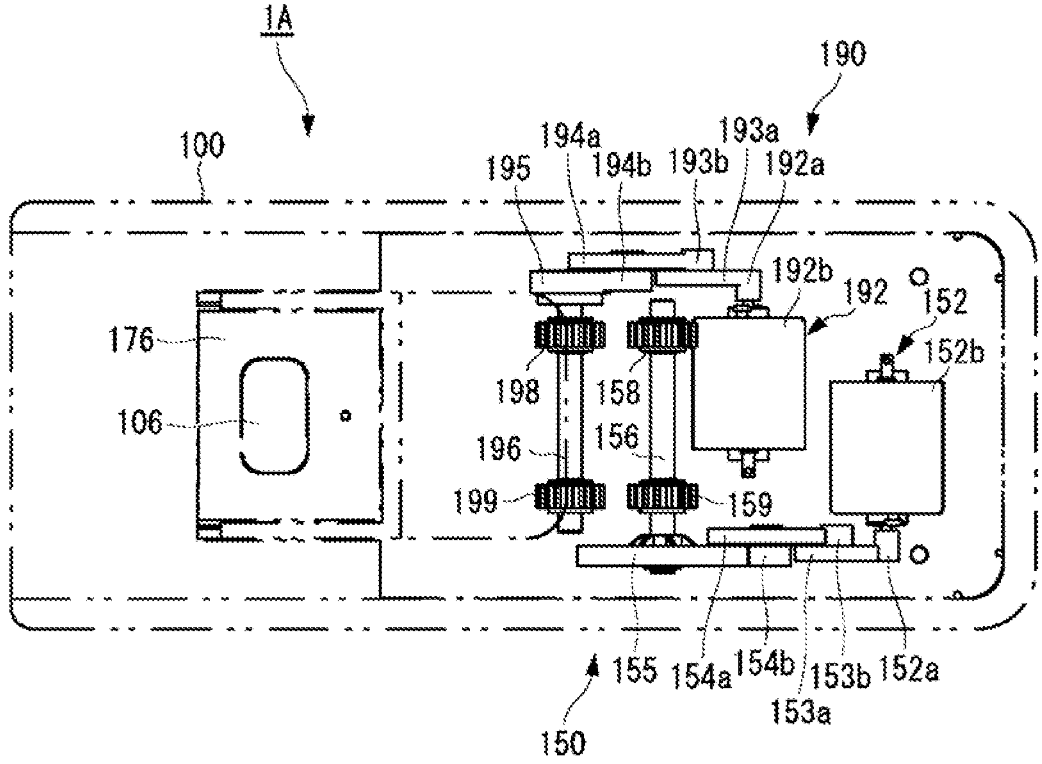
FIG. 2D is a plan view of a drive unit in the staple removing device according to the first embodiment.
Figure 2E:
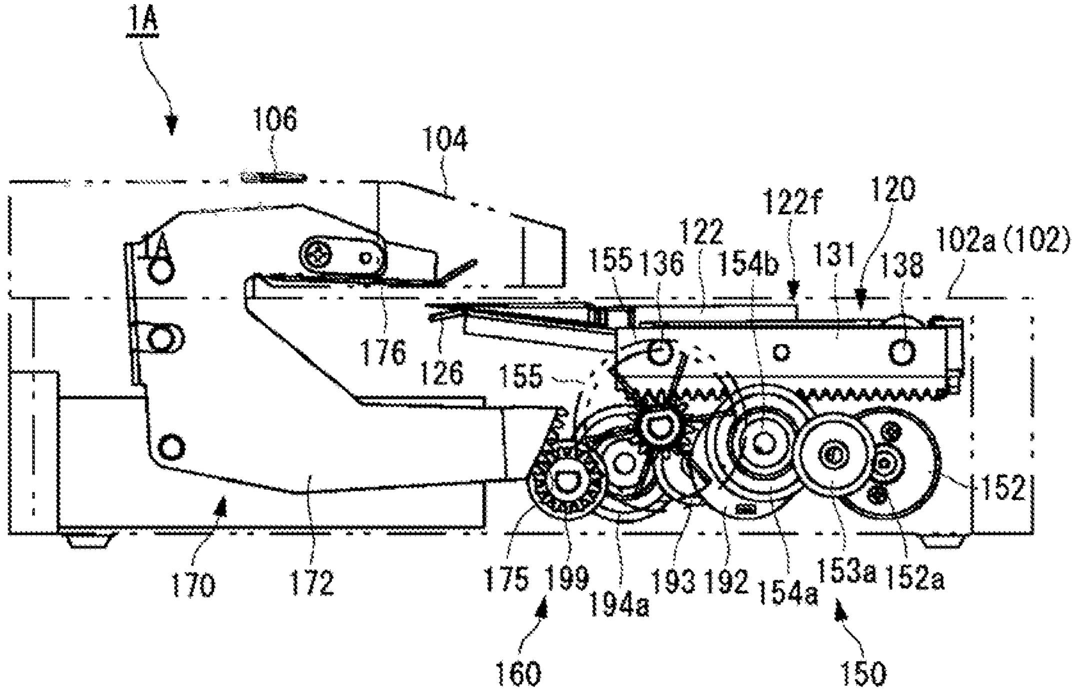
FIG. 2E is a side view of the inside of the staple removing device when the removing part according to the first embodiment is at the standby position.
Figure 3:
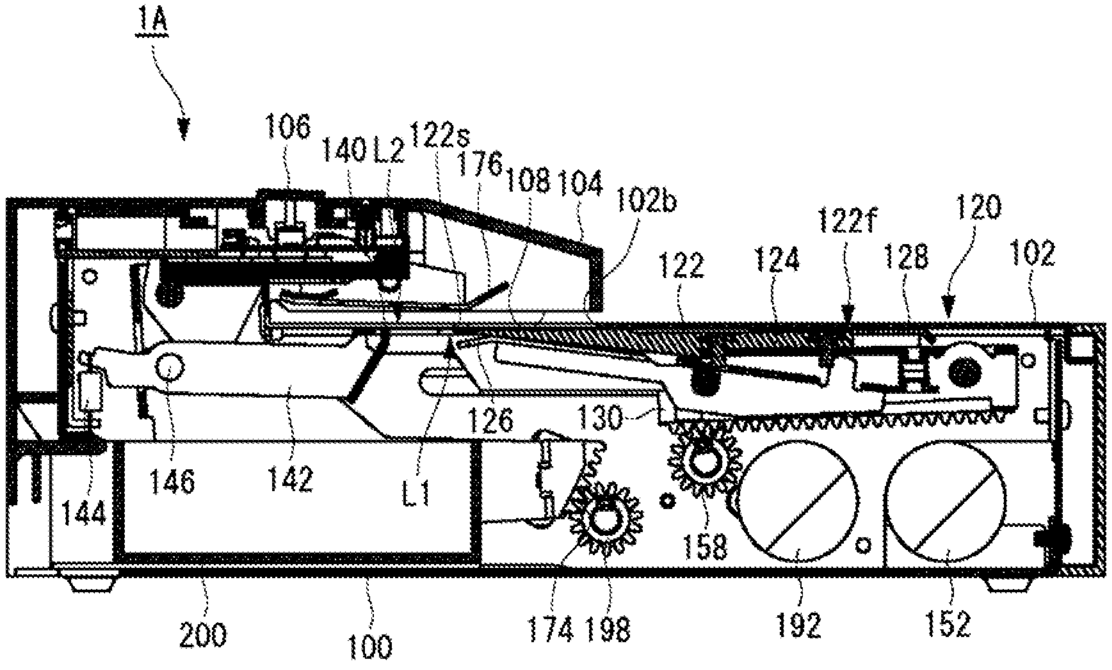
FIG. 3 is a side cross-sectional view of the inside of the staple removing device when the removing part according to the first embodiment is at the standby position.
Figure 5A:
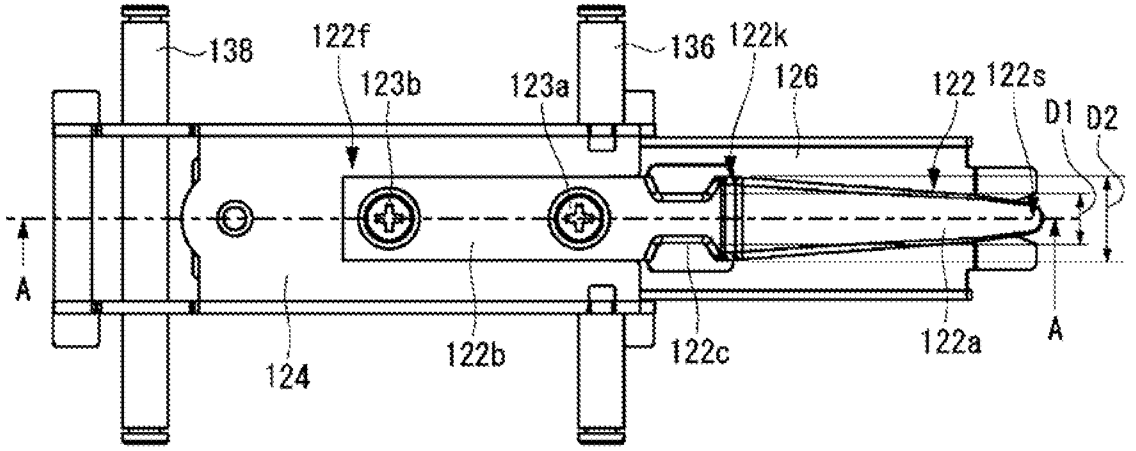
FIG. 5A is a plan view of the removing part according to the first embodiment.
Figure 5B:
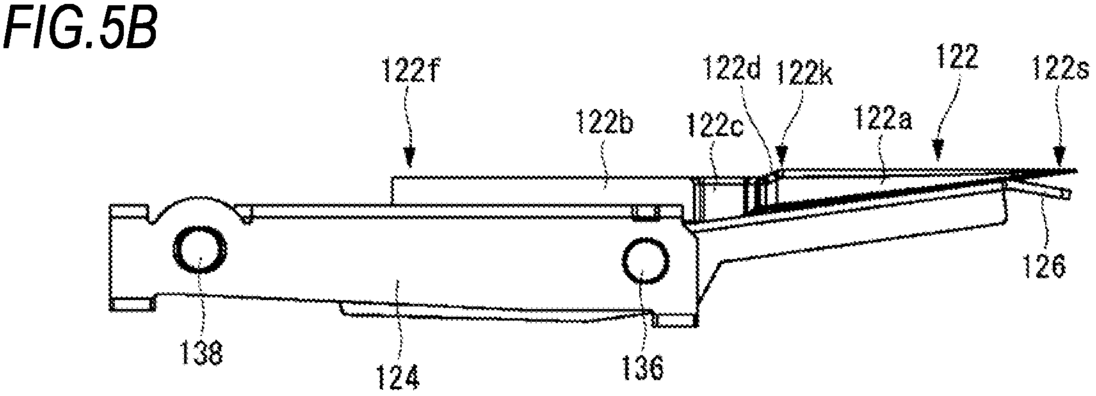
FIG. 5B is a side view of the removing part according to the first embodiment.
Figure 5C:
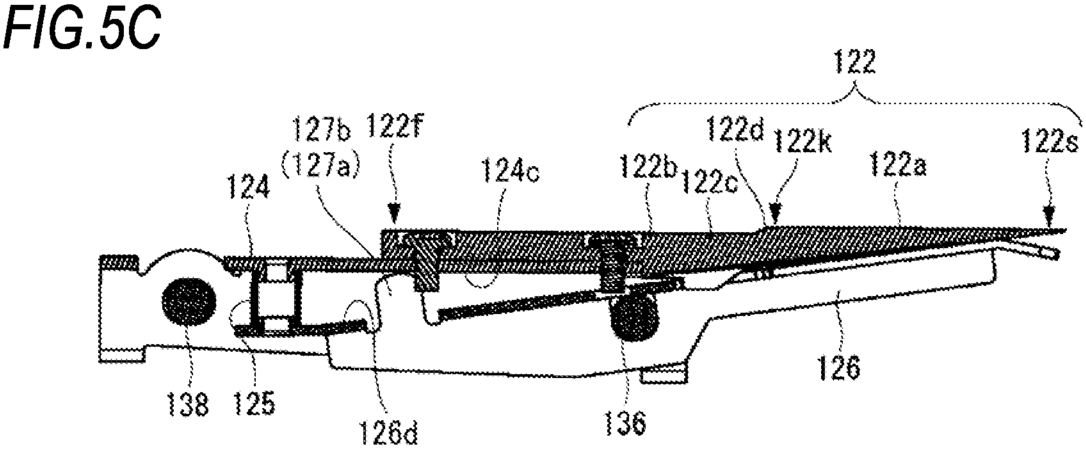
FIG. 5C is a cross-sectional view taken along an A-A line of the removing part shown in FIG. 5A.
Figure 6:
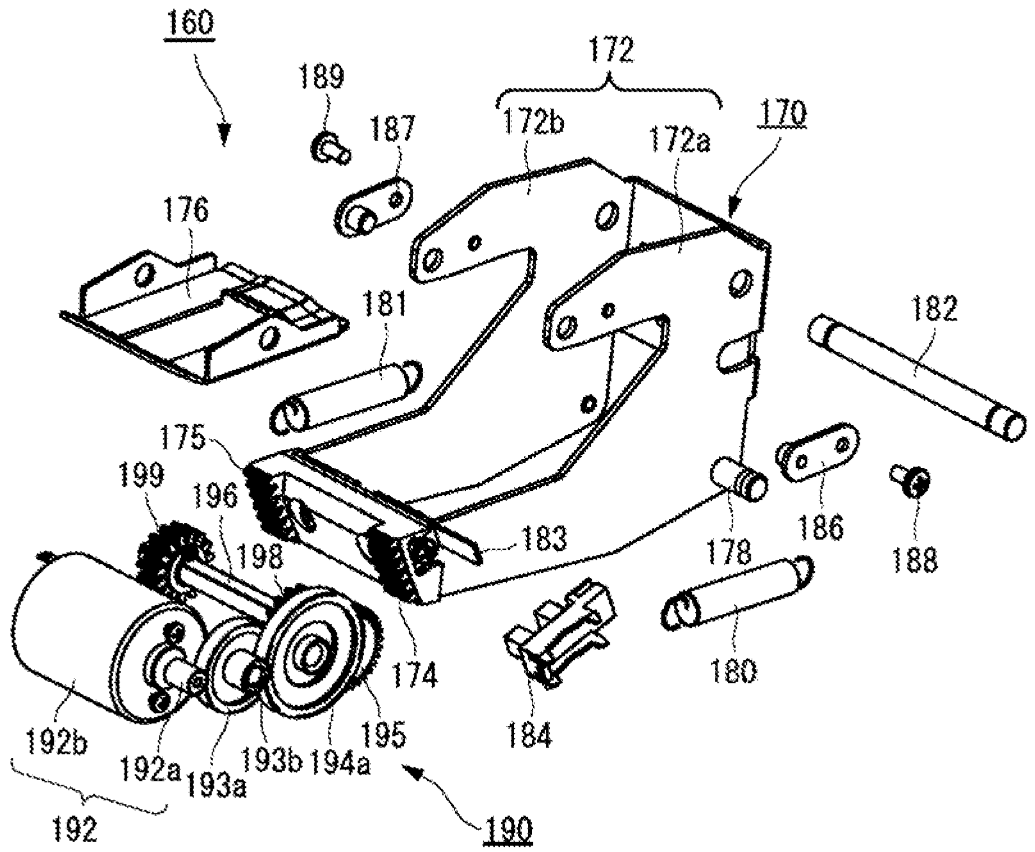
FIG. 6 is an exploded perspective view of a sheet pressing mechanism according to the first embodiment.

An internal configuration of the staple removing device 1A is described. FIG. 2A is a right front perspective view of an inside of the staple removing device 1A when the removing part 120 is at a standby position, FIG. 2B is a left front perspective view of the inside of the staple removing device 1A when the removing part 120 is at the standby position, FIG. 2C is a plan view of the inside of the staple removing device 1A when the removing part 120 is at the standby position, FIG. 2D is a plan view of a first drive unit 150 and the like in the staple removing device 1A, and FIG. 2E is a side view of the inside of the staple removing device 1A when the removing part 120 is at the standby position. FIG. 3 is a side cross-sectional view of the inside of the staple removing device 1A when the removing part 120 is at the standby position. FIG. 4 is an exploded perspective view of a staple pullout mechanism 110. FIG. 5A is a plan view of the removing part 120, FIG. 5B is a side view of the removing part 120, and FIG. 5C is a cross-sectional view taken along an A-A line of the removing part 120. FIG. 6 is an exploded perspective view of a sheet pressing mechanism 160.

The staple removing device 1A includes a staple pullout mechanism 110 configured to remove the staple S from the sheet bundle P, a sheet pressing mechanism 160 configured to press against the sheet bundle P placed on the placing table 102, and the above-described accommodation part 200.

Configuration Example of Staple Pullout Mechanism 110

As shown in FIG. 3 and the like, the staple pullout mechanism 110 includes the removing part 120 arranged inside the housing 100 below the placing surface 102*a* of the placing table 102 and configured to remove the staple S from the sheet bundle P by being inserted between the sheet bundle P and the staple, a pressing portion 140 (restriction portion), and the first drive unit 150 configured to drive the removing part 120.

Figure 9A:
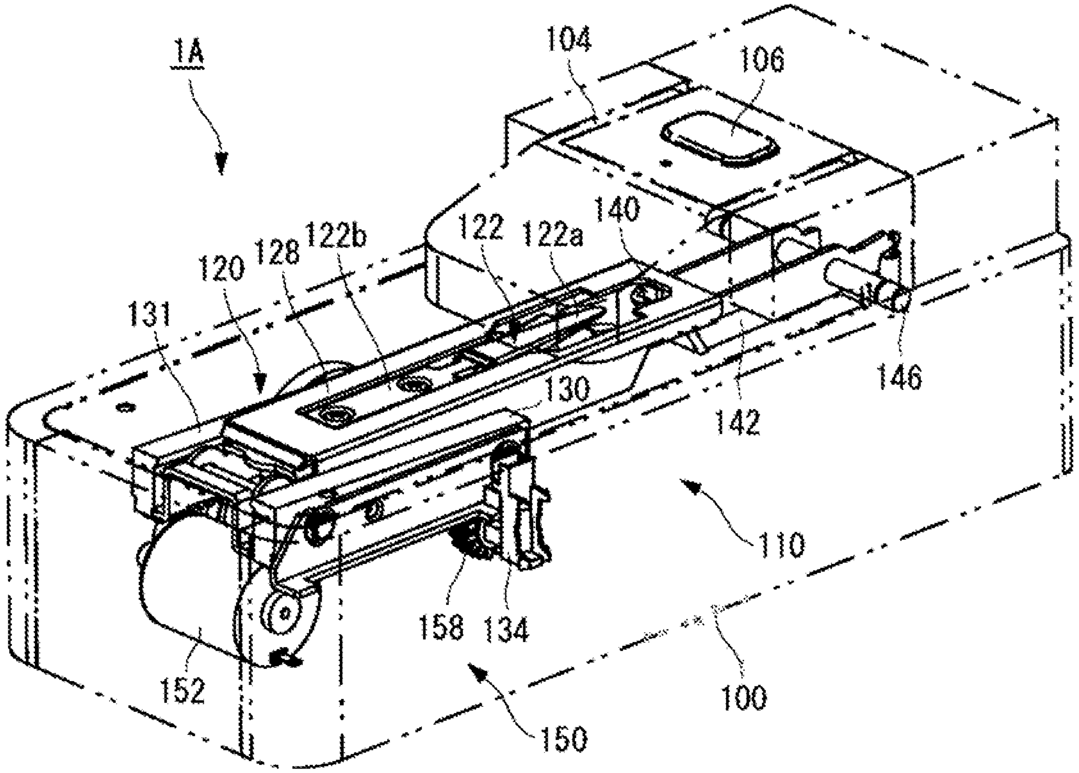
FIG. 9A is a perspective view showing an operation of the staple pullout mechanism located at the standby position according to the first embodiment.
Figure 9B:
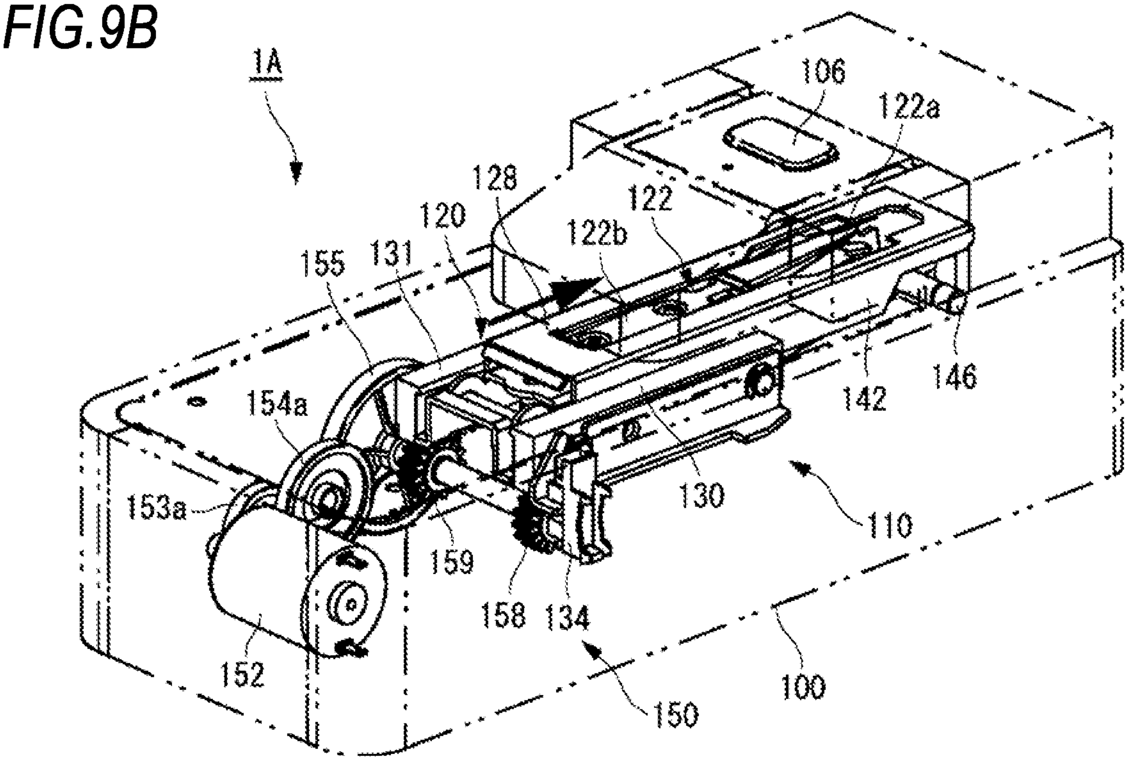
FIG. 9B is a perspective view showing an operation of the staple pullout mechanism moving to a removal position according to the first embodiment.

As shown in FIGS. 5 and 9A to 9B and the like, the removing part 120 has the wedge plate 122 configured to be inserted between the crown portion Sa of the staple S and the sheet bundle P, and the racks 130 and 131 configured to move the wedge plate 122 between the crown portion Sa and the sheet bundle P.

In the present embodiment, as an example of the configuration of the removing part 120, the removing part includes the blade holder 124 to which the wedge plate 122 is attached, a crown holder 126 configured to support the crown portion Sa of the staple S, and a holder 128 configured to restrict a position of the wedge plate 122.

As shown in FIGS. 4 and 5A to 5C, and the like, the wedge plate 122 is constituted by an elongated plate-shaped member, and includes the wedge plate main body 122*a*, the attaching portion 122*b*, and the narrowed portion 122*c*. The tip end portion 122*s* is configured to be movable along a plane of the placing table 102 between a standby position L1 and a removal position L2, and when the tip end portion 122*s* moves to the removal position L2, the tip end portion 122*s* is inserted between the sheet bundle P and the staple.

In the present embodiment, the standby position L1 of the removing part 120 means a position where the tip end portion 122*s* of the removing part 120 is stopped before a removing operation is started. The removal position L2 of the removing part 120 means a position where the removing part 120 starts a removing operation, the removing part 120 is inserted between the crown portion Sa of the staple S and the sheet bundle P, and the staple S is started to be removed from the sheet bundle P. The removal position L2 is a position spaced at least in a horizontal direction from the standby position L1.

The attaching portion 122*b* is integrally formed on the base end portion 122*k*-side of the wedge plate main body 122*a*, and is attached to an upper surface of the blade holder 124. The narrowed portion 122*c* is a substantially central portion in a longitudinal direction of the wedge plate 122, and is formed between the wedge plate main body 122*a* and the attaching portion 122*b*. As shown in FIG. 5A, a width dimension D1 of at least a part of the narrowed portion 122*c* is narrower than a width dimension D2 of the base end portion 122*k* of the wedge plate main body 122*a*, and is also configured to be narrower than a width dimension D3 (refer to FIG. 17E) between the leg portions Sb and Sb of the staple S by springback that the leg portions Sb and Sb of the staple S try to return to the inwardly bent state when the staple S separates from the wedge plate 122. Here, the 'width dimension' means a dimension in a width direction of the wedge plate. The 'width direction' is, in the present embodiment, a right and left direction, and may also be a direction perpendicular to a thickness direction (height direction) and a longitudinal direction (moving direction of the wedge plate) of the wedge plate.

As shown in FIG. 4 and the like, the blade holder 124 is constituted by a flat plate having a substantially U-shaped section, has an upper surface to which the attaching portion 122*b* is attached, and is arranged overlapped over the crown holder 126.

As shown in FIG. 4 and the like, the crown holder 126 is arranged below the wedge plate 122 with the blade holder 124 interposed therebetween, and is configured to support the crown portion Sa of the staple S removed from the sheet bundle P. The crown holder 126 has a groove portion 126*a* for preventing contact with the pressing portion 140 when the wedge plate 122 moves rearward from the front, and an opening portion 126*b* for dropping the staple S removed from the sheet bundle P into the accommodation part 200. The opening portion 126*b* of the crown holder 126 and the narrowed portion 122*c* of the wedge plate 122 attached to the blade holder 124 are arranged to be at the same position, in plan view. The groove portion 126*a* is cut out from a tip end portion to a substantially central portion of the crown holder 126, and has a width slightly wider than a width of the pressing portion 140. The opening portion 126*b* is formed at a substantially central portion in the longitudinal direction of the crown holder 126 and continuously on a base end-side of the groove portion 126*a*, and has a width wider than at least a length of the crown portion Sa of the staple S.

A spring 125 is arranged between a lower surface on the other end-side of the blade holder 124 and an upper surface on the other end-side of the crown holder 126, and one end-side of the wedge plate 122 and one end-side of the crown holder 126 are urged in a direction of coming close to each other by an elastic force of the spring 125. In the present embodiment, one end-side indicates the rear of the staple removing device 1A, and the other end-side indicates the front of the staple removing device 1A.

As shown in FIGS. 4 and 5C, restriction portions 127*a* and 127*b* are formed integrally on each of both end portions in the width direction on the base end-side upper surface of the crown holder 126, and protrude from the upper surface toward the blade holder 124. The restriction portions 127*a* and 127*b* come into contact with a lower surface 124*c* of the blade holder 124 when the tip end-side of the crown holder 126 is opened to a preset opening amount (hereinafter, referred to as a setting value) with respect to the wedge plate 122, thereby restricting the tip end-side of the crown holder 126 from opening by the setting value or more. Note that, the restriction portions 127*a* and 127*b* may also be formed by members separate from the crown holder 126. Further, a shape of each of the restriction portions 127*a* and 127*b* is, for example, a rectangular shape having a curved upper end, but is not limited to such shape as long as the restriction portion can come into contact with the crown holder 126.

The spring 125 for urging the tip end portion 122*s* of the wedge plate 122 and the tip end-side of the crown holder 126 in a direction of coming close to each other is arranged between an upper surface 126*d* of the base end portion of the crown holder 126 and the lower surface 124*c* on the base end-side of the blade holder 124. In the present embodiment, a load of the spring 125 is set according to the staple S having a small wire diameter among the staples S to be used. This is because when the load of the spring 125 is large, the staple S is sandwiched between the crown holder 126 and the wedge plate 122 with a strong load and is dragged as the wedge plate 122 moves rearward from the front, whereby the sheet may be torn and a staple through-hole may be enlarged. Note that, when removing the staple S having a large wire diameter, the pressing load by the crown holder 126 may be insufficient. However, the opening amount of the crown holder 126 is adjusted to the staple S having a large wire diameter by the restriction portions 127*a* and 127*b*, so that it is possible to obtain the optimum pressing load.

The holder 128 is constituted by a flat plate having a substantially U-shaped section, and is arranged overlapped on the upper surface of the blade holder 124. The holder 128 includes an opening portion 128*a* for exposing the wedge plate 122, and a support portion 128*b* configured to regulate the pressing portion 140 to be located below the placing table 102 at least when the removing part 120 is stopped at the standby position L1.

On the left side of the blade holder 124, as shown in FIGS. 2B and 4, a plate-shaped rack 130 having substantially the same length as the longitudinal direction of the blade holder 124 is arranged. The rack 130 is configured to receive a drive force of the first motor 152. A lower surface of the rack 130 is formed with a plurality of teeth in mesh with a pinion 158, which will be described later.

On the right side of the blade holder 124, as shown in FIGS. 2A and 4, a plate-shaped rack 131 having substantially the same length as the longitudinal direction of the blade holder 124 is arranged. The rack 131 is configured to receive a drive force of the first motor 152. A lower surface of the rack 131 is formed with a plurality of teeth in mesh with a pinion 159, which will be described later.

As shown in FIG. 4, on the left side of the rack 130, a sensor 134 configured to detect a position of the removing part 120 is provided and a flag attaching plate 132 for detecting a position of the removing part 120 in a front and rear direction is provided. A rear end portion of the flag attaching plate 132 is provided with a first flag 132*a* for detecting movement of the wedge plate 122 from the standby position L1 to the removal position L2. A front end portion of the flag attaching plate 132 is provided with a second flag 132*b* for detecting arrival of the wedge plate 122 at the removal position L2. The sensor 134 is constituted by a transmission-type sensor and is configured to detect the first flag 132*a* and the second flag 132*b* of the rack 130 moving in the front and rear direction. A detection signal detected by the sensor 134 is supplied to a control unit (not shown), and the control unit is configured to control operations of the first motor 152 and a second motor 192, based on the detection signal supplied from the sensor 134.

A first drive shaft 136 is located substantially in the middle between the tip end-side and the base end-side of the removing part 120, and is engaged with a guide groove 113 of a left frame 112 and a guide groove 115 of a right frame 114, respectively. The first drive shaft 136 is inserted into opening portions formed in each of the flag attaching plate 132, the rack 130, the blade holder 124, the crown holder 126 and the rack 131 from the left side toward the right side of the housing 100. The spring 125 and the restriction portions 127*a* and 127*b* are arranged on the base end-side of the crown holder 126 with respect to the first drive shaft 136.

A second drive shaft 138 is located at the base end portion of the removing part 120, and is engaged with the guide groove 113 of the left frame 112 and the guide groove 115 of the right frame 114, respectively. The second drive shaft 138 is inserted into the opening portions formed in each of the flag attaching plate 132, the rack 130, the blade holder 126 and the rack 131 from the left side toward the right side of the housing 100.

In this way, the wedge plate 122, the blade holder 124, the crown holder 126, the holder 128, the racks 130, 131, and the flag attaching plate 132 are attached by the first drive shaft 136 and the second drive shaft 138, so that they constitute the removing part 120 and can integrally move forward and rearward as the removing part 120.

As shown in FIGS. 3 and 4, the pressing portion 140 configured to restrict movement of the sheet bundle P and the staple S in an insertion direction is arranged behind the crown portion Sa located at the removal position L2 and is configured to be able to come into contact with the crown portion Sa pushed by the wedge plate 122. A width of the pressing portion 140 is selected to be, for example, a length in which it can support the crown portion Sa moving rearward from the front by a pushing force of the wedge plate 122 and can be inserted into the groove portion 126*a* of the crown holder 126.

The pressing holder 142 configured to support the pressing portion 140 is constituted by a flat plate processed into a substantial U-shape in plan view, and a rear end-side of the pressing holder 142 is rotatably supported by a shaft 146. One end portion of a tension spring 144 is attached to the further rear of the pressing holder 142 than the shaft 146. The other end portion of the tension spring 144 is attached to the left frame 112. An upper end portion on the front side of the holding holder 142 is provided with a convex portion 142*a* capable of coming into contact with the support portion 128*b* of the holder 128.

As shown in FIGS. 2A, 2D and 4, the first drive unit 150 includes the first motor 152, a gear 153*a* and the like connected to an output shaft 152*a* of the first motor 152, and a pair of pinions 158 and 159 respectively provided at both ends of a shaft 156, which are first pinion parts arranged at a predetermined interval in the width direction of the housing 100 and configured to mesh with the racks 130 and 131. Note that, a plurality of gears 153*a*, 153*b*, 154*a*, 154*b* and 155 constitutes a speed reduction mechanism.

The first motor 152 has the output shaft 152*a* and a motor main body 152*b*, and is constituted by, for example, a DC motor, a DC brushless motor or the like. The first motor 152 is configured to drive based on an instruction from the control unit (not shown), thereby transmitting a drive force of the first motor 152 to the removing part 120 via the speed reduction mechanism and moving the removing part 120 forward or rearward. As shown in FIGS. 2C, 2D, 3 and the like, the first motor 152 arranged below the removing part 120, in the present embodiment, a second part when the tip end portion 122*s* of the wedge plate main body 122*a* (first part) of the removing part 120 is at the standby position L1. Note that, the lower of the removing part 120 means that at least a part of the first motor 152 including the output shaft 152*a* is located directly under the removing part 120.

As shown in FIGS. 2D, 3 and the like, the first motor 152 is arranged so that the output shaft 152*a* is parallel to or substantially parallel to the placing surface 102*a* of the placing table 102.

In addition, the output shaft 152*a* of the first motor 152 is arranged to be orthogonal to a moving direction (a longitudinal direction of the housing 100) of the wedge plate 122 from the front to the rear.

In the present embodiment, the description 'the output shaft 152*a* is parallel to the placing surface 102*a* of the placing table 102' means perfect parallelism. In addition, the description 'substantially parallel' means to include a range slightly deviating from the perfect parallelism. The range may be, for example, within ±5°, but may also be within ±10° depending on the required accuracy.

As shown in FIGS. 2A, 2C, 2D and 2E, the gears 153*a* and 153*b* are two-stage drive gears, and a diameter of the gear 153*a* is larger than a diameter of the gear 153*b*. The gear 153*a* is connected to the output shaft 152*a* of the first motor 152. The gear 153*b* is in mesh with the gear 154*a*. The gears 154*a* and 154*b* are two-stage drive gears, and a diameter of the gear 154*a* is larger than a diameter of the gear 154*b*. The gear 154*a* is in mesh with the gear 153*b*, and the gear 154*b* is in mesh with the gear 155. A right end portion of the shaft 156 extending in the width direction of the housing 100 is attached to a center of the gear 155. The pinion 159 in mesh with the rack 131 is attached to a right end-side of the shaft 156 on the gear 155-side, and the pinion 158 in mesh with the rack 130 is attached to the left end-side on an opposite side.

Configuration Example of Sheet Pressing Mechanism 160

As shown in FIGS. 2A, 6 and the like, the sheet pressing mechanism 160 configured to press against the sheet bundle P placed on the placing table 102 includes a sheet pressing part 170 having at least a part located above the placing table 102 and configured to be movable, and a second motor 192 configured to drive the sheet pressing part 170.

The sheet pressing part 170 has a hold lever 172 to which components constituting the sheet pressing part are attached, a pair of sheet pressing racks 174 and 175 extending in a traveling direction at a predetermined interval in the width direction of the housing 100, and a sheet pressing plate 176 that is a pressing part for pressing the sheet bundle P placed on the placing table 102.

As shown in FIGS. 2A, 2E, 6 and the like, the hold lever 172 has a pair of flat plates 172*a* and 172*b* arranged on the rear side of the housing 100 and arranged at a predetermined interval in the width direction. Lower sides of the flat plates 172*a* and 172*b* are arranged in the housing 100, and upper sides thereof are arranged to be exposed from the placing table 102 and are covered with the cover part 104. A boss 178 protruding outward is attached to an outer surface of the flat plate 172*a*. One end portion of a return spring 180 constituted by a tension spring is attached to the boss 178, and the other end portion of the return spring 180 is attached to the left frame 112. Similarly, a boss (not shown) is attached to an outer surface of the flat plate 172*b*, and one end portion of a return spring 181 is attached to the boss, and the other end portion of the return spring 181 is attached to the right frame 114.

The sheet pressing rack 174 is provided at a lower front end portion of the flat plate 172*a* of the hold lever 172. The sheet pressing rack 174 has a substantial fan shape and is in mesh with a sheet pressing pinion 198. The sheet pressing rack 175 is provided at a lower front end portion of the flat plate 172*b* of the hold lever 172. The sheet pressing rack 175 has a substantial fan shape and is in mesh with a sheet pressing pinion 199 of the second drive unit 190. The sheet pressing racks 174 and 175 are configured to convert rotational motions of the sheet pressing pinions 198 and 199 into substantially linear motions.

The sheet pressing plate 176 is configured to move toward the placing surface 102*a* so that the sheet bundle P does not deviate from the removing position L2 of the placing table 102 during a removing operation of the staple S, thereby pressing the sheet bundle P placed on the placing table 102. The sheet pressing plate 176 is attached to the flat plates 172*a* and 172*b* so as to be parallel to or substantially parallel to the placing table 102. Specifically, a left side surface of the sheet pressing plate 176 is supported by a shaft 186, and a right side surface of the sheet pressing plate 176 is supported by a shaft 187.

As shown in FIGS. 2B, 2C, 2D and 6, the second drive unit 190 includes the second motor 192, a gear 193*a* and the like connected to an output shaft 192*a* of the second motor 192, and a pair of sheet pressing pinions 198 and 199 respectively provided at both ends of a shaft 196, which are second pinion parts arranged at a predetermined interval in the width direction of the housing 100 so as to mesh with the racks 174 and 175. Note that, a plurality of gears 193*a*, 193*b*, 194*a*, 194*b* and 195 constitutes a speed reduction mechanism. The second motor 192 is arranged below the removing part 120 when the removing part is located at the standby position L1.

The second motor 192 has the output shaft 192*a* and a motor main body 192*b*, and is constituted by, for example, a DC motor, a DC brushless motor or the like. The second motor 192 is configured to drive based on an instruction from the control unit (not shown), thereby transmitting a drive force of the second motor 192 to the sheet pressing part 170 via the speed reduction mechanism and operating the sheet pressing part 170. As shown in FIGS. 2C, 2D, 3 and the like, the second motor 192 is arranged behind the first motor 152 and below the removing part 120, in the present embodiment, the second part when the tip end portion 122*s* of the wedge plate 122 of the removing part 120 is at the standby position L1. Note that, the lower of the removing part 120 means that at least a part of the second motor 192 including the output shaft 192*a* is located directly under the removing part 120.

As shown in FIGS. 2D, 3 and the like, the output shaft 192*a* of the second motor 192 is arranged to be parallel to or substantially parallel to the placing surface 102*a* of the placing table 102.

In addition, the output shaft 192*a* of the motor 192 is arranged to be orthogonal to the moving direction (longitudinal direction of the housing 100) of the wedge plate 122 from the front to the rear.

Further, the output shaft 192*a* of the second motor 192 is arranged to face toward an opposite direction to the output shaft 152*a* of the first motor 152. Specifically, the output shaft 152*a* of the first motor 152 is arranged to face rightward, and the output shaft 192*a* of the second motor 192 is arranged to face leftward on the opposite side thereto. The opposite direction means not only a case where the output shafts 152*a* and 192*a* are oriented in the opposite directions of 180 degrees but also a case where the output shafts are oriented in a range slightly deviating from the opposite directions of 180 degrees. The range may be, for example, within ±5°, but may also be within ±10° depending on the required accuracy.

In the present embodiment, the description 'the output shaft 192*a* is parallel to the placing surface 102*a* of the placing table 102' means perfect parallelism. In addition, the description 'substantially parallel' means a range slightly deviating from the perfect parallelism. The range may be, for example, within ±5°, but may also be within ±10° depending on the required accuracy.

As shown in FIGS. 2B, 2C, 2D, 2E and 6, the gears 193*a* and 193*b* are two-stage drive gears, and a diameter of the gear 193*a* is larger than a diameter of the gear 193*b*. The gear 193*a* is connected to the output shaft 192*a* of the second motor 192. The gear 193*b* is in mesh with the gear 194*a*. The gears 194*a* and 194*b* are two-stage drive gears, and a diameter of the gear 194*a* is larger than a diameter of the gear 194*b*. The gear 194*a* is in mesh with the gear 193*b*, and the gear 194*b* is in mesh with the gear 195. A left end portion of the shaft 196 extending in the width direction of the housing 100 is attached to a center of the gear 195. The sheet pressing pinion 198 in mesh with the sheet pressing rack 174 is attached to a left end-side of the shaft 196 on the gear 195-side, and the sheet pressing pinion 199 in mesh with the sheet pressing rack 175 is attached to a right end-side on an opposite side.

Configuration Example of Accommodation Part 200

As shown in FIGS. 2A, 2B, 3 and the like, the accommodation part 200 is located below the removing part 120 when the tip end portion 122*s* of the wedge plate 122 constituting the removing part 120 is at the removal position L2, so as to be able to accommodate the staple S dropping from the sheet bundle P. In addition, the accommodation part 200 is arranged in an empty space part between the flat plates 172*a* and 172*b* of the hold lever 172 constituting the sheet pressing mechanism 160 and below the pressing holder 142 constituting the staple pullout mechanism 110.

Configuration Example of Left Frame 112 and the Like

Figure 7:
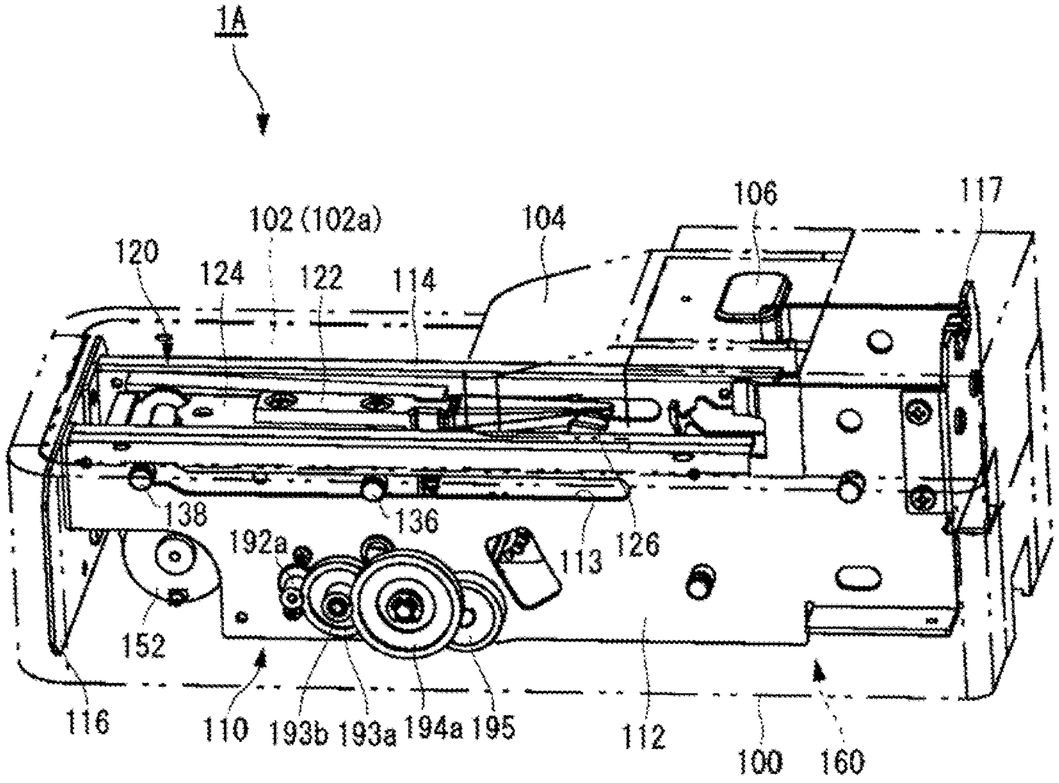
FIG. 7 is a perspective view of the inside of the staple removing device having a frame according to the first embodiment.
Figure 8:
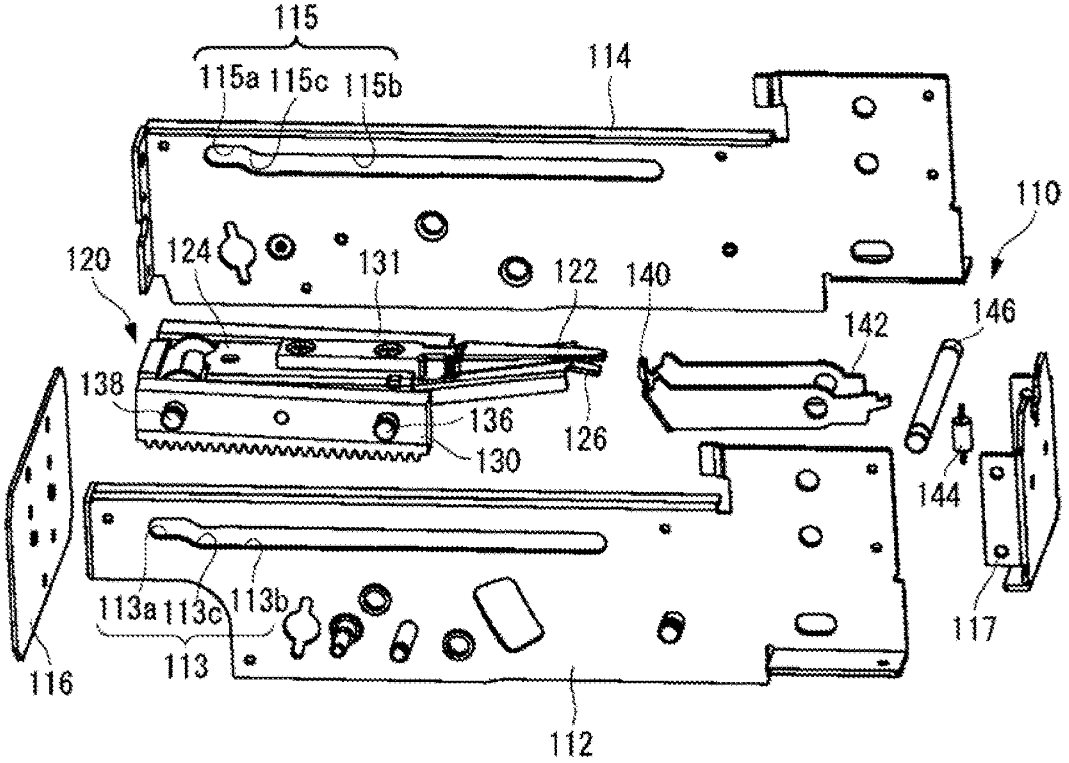
FIG. 8 is an exploded perspective view of the staple removing device having the frame according to the first embodiment.

FIG. 7 shows an internal configuration of the staple removing device 1A including a left frame 112, a right frame 114, a front frame 116 and a rear frame 117. FIG. 8 is an exploded perspective view of the staple removing device 1A shown in FIG. 7.

The left frame 112, the right frame 114, the front frame 116 and the rear frame 117 are erected on outer peripheral parts of the staple pulling mechanism 110 and the sheet pressing mechanism 160 so as to surround the same.

The left frame 112 is erected on a left side of the staple pullout mechanism 110. A guide groove 113 extending along the moving direction (longitudinal direction of the housing 100) ahead of or behind the removing part 120 is formed in an upper portion of the left frame 112. The guide groove 113 includes a first groove 113*a* for locating, below the placing table 102, the tip end portion 122*s* of the wedge plate 122 of the removing part 120 standing by at the standby position L1, and a second groove 113*b* for moving the tip end portion 122*s* of the wedge plate 122 of the removing part 120 in a state of protruding from the placing table 102 until passing through the removal position L2 from a front of the removal position L2. Note that, the front of the removal position L2 includes a position between the standby position L1 and the removal position L2.

The first groove 113*a* is formed in such a shape that the second drive shaft 138 is closer to the placing table 102 than the first drive shaft 136 when the tip end portion 122*s* of the removing part 120 is at least at the standby position L1. The first groove 113*a* extends in parallel so as to follow the placing surface 102*a* of the placing table 102 by a predetermined distance from a start end of a moving section of the removing part 120. The second groove 113*b* is formed at a position slightly lower than the first groove 113*a* via a step portion 113*c*. That is, the step portion 113*c* connects the first groove 113*a* and the second groove 113*b*. The second groove 113*b* extends in parallel so as to follow the placing surface 102*a* of the placing table 102 from the step portion 113*c* to an end of the moving section of the wedge plate 122. Left end portions of the first drive shaft 136 and the second drive shaft 138 of the removing part 120 are inserted in the guide groove 113. Thereby, the removing part 120 can move along the guide groove 113, and can move from the front and rearward along the placing table 102.

The right frame 114 is erected on a right side of the staple pullout mechanism 110. A guide groove 115 extending along the moving direction (longitudinal direction of the housing 100) ahead of or behind the removing part 120 is formed in an upper portion of the right frame 114. The guide groove 115 includes a first groove 115*a* for locating, below the placing table 102, the tip end portion 122*s* of the wedge plate 122 of the removing part 120 standing by at the standby position L1, and a second groove 115*b* for moving the tip end portion 122*s* of the wedge plate 122 of the removing part 120 in a state of protruding from the placing table 102 until passing through the removal position L2 from a front of the removal position L2.

The second groove 115*b* is formed in such a shape that the second drive shaft 138 is closer to the placing table 102 than the first drive shaft 136 when the tip end portion 122*s* of the removing part 120 is at least at the standby position L1. The second groove 115*b* extends in parallel so as to follow the placing surface 102*a* of the placing table 102 by a predetermined distance from the start end of the moving section of the removing part 120. The second groove 115*b* is formed at a position slightly lower than the first groove 115*a* via a step portion 115*c*. The second groove 115*b* extends in parallel so as to follow the placing surface 102*a* of the placing table 102 from the step portion 115*c* to the end of the moving section of the wedge plate 122. Right end portions of the first drive shaft 136 and the second drive shaft 138 of the removing part 120 are inserted in the guide groove 115. Thereby, the removing part 120 can move along the guide groove 115, and can move forward and rearward along the placing table 102. That is, the guide grooves (guide portions) 115 formed in the frames 112 and 114 (support members) are configured to movably guide the removing part 120.

The front frame 116 is erected on a front side of the staple pulling mechanism 110, and the rear frame 117 is erected on a rear side of the sheet pressing mechanism 160.

Operation Example of Staple Pullout Mechanism 110

Next, an example of an operation of the staple pullout mechanism 110 that is performed when removing the staple S from the sheet bundle P is described.

Figure 10A:
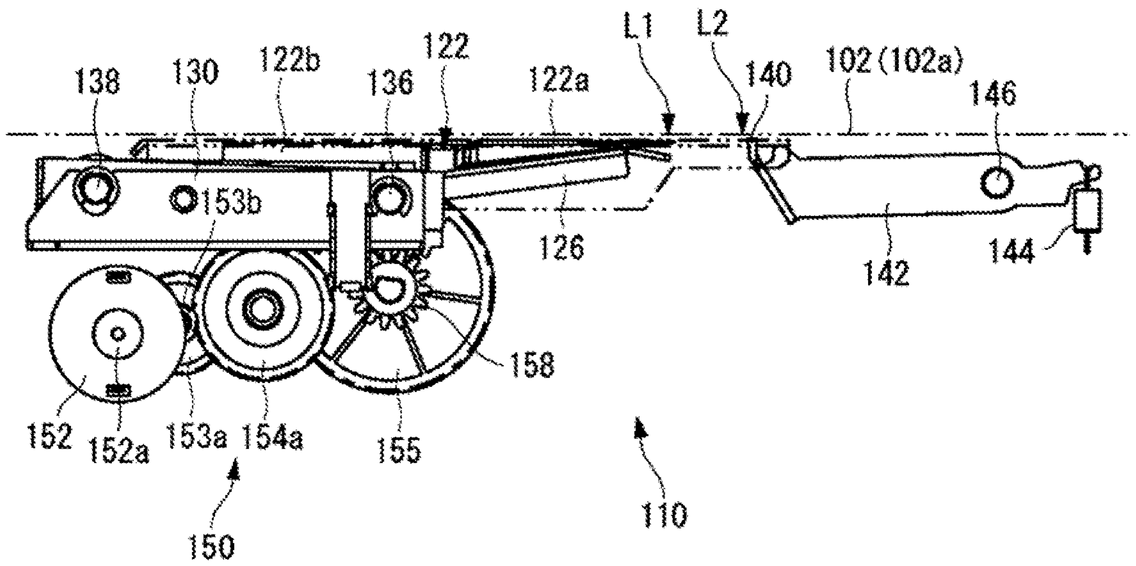
FIG. 10A is a side view of main parts showing the operation of the staple pullout mechanism located at the standby position according to the first embodiment.
Figure 10B:
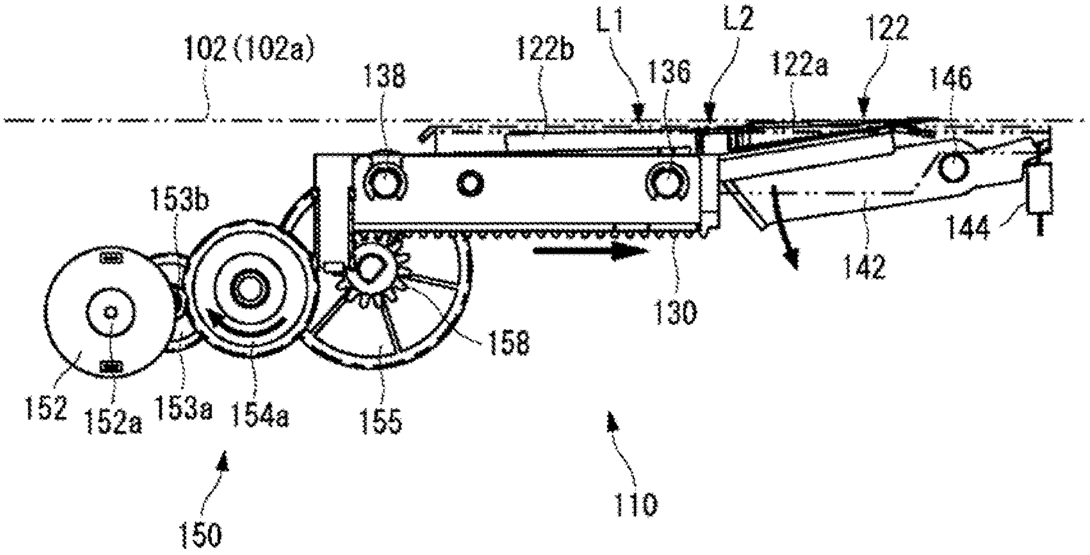
FIG. 10B is a side view of main parts showing the operation of the staple pullout mechanism moving to the removal position according to the first embodiment.
Figure 11A:
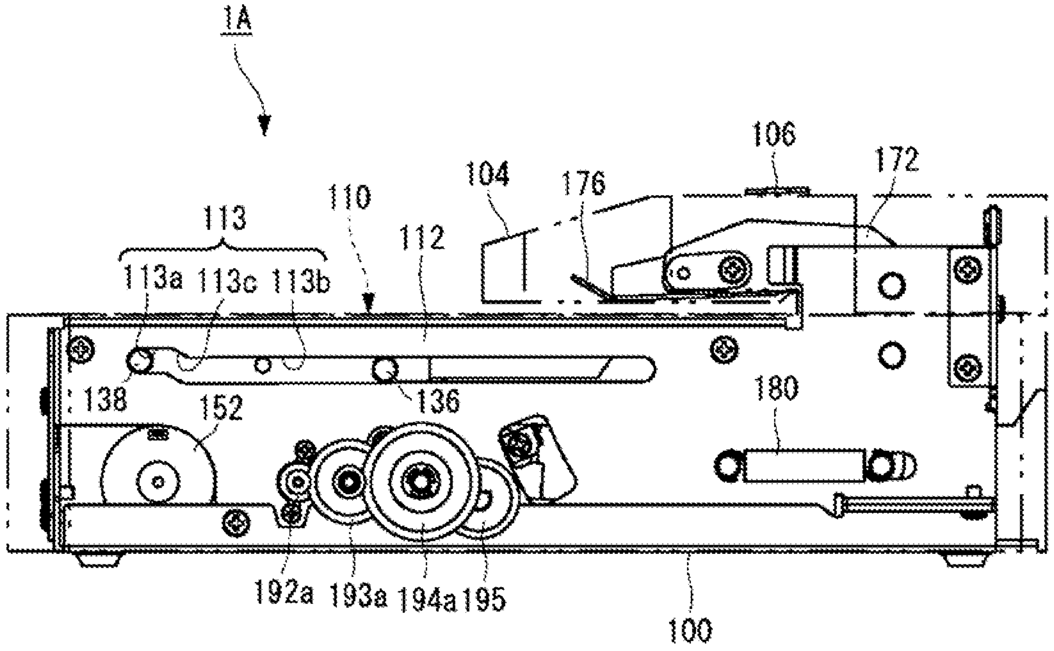
FIG. 11A is a side view showing the operation of the staple pullout mechanism located at the standby position according to the first embodiment.
Figure 11B:
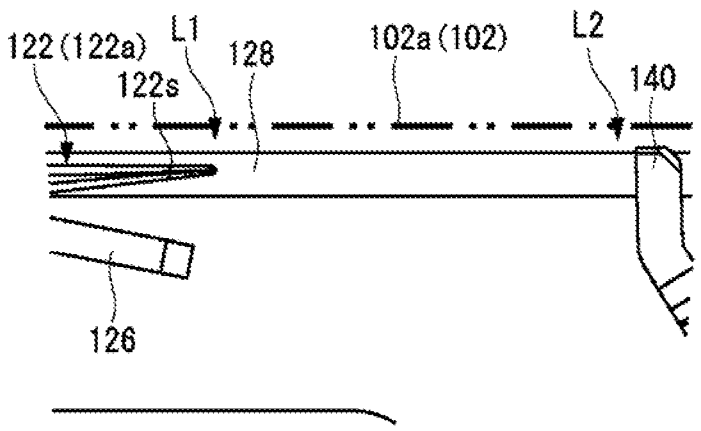
FIG. 11B is a side view of main parts showing the operation of the staple pullout mechanism shown in FIG. 11A.
Figure 12A:
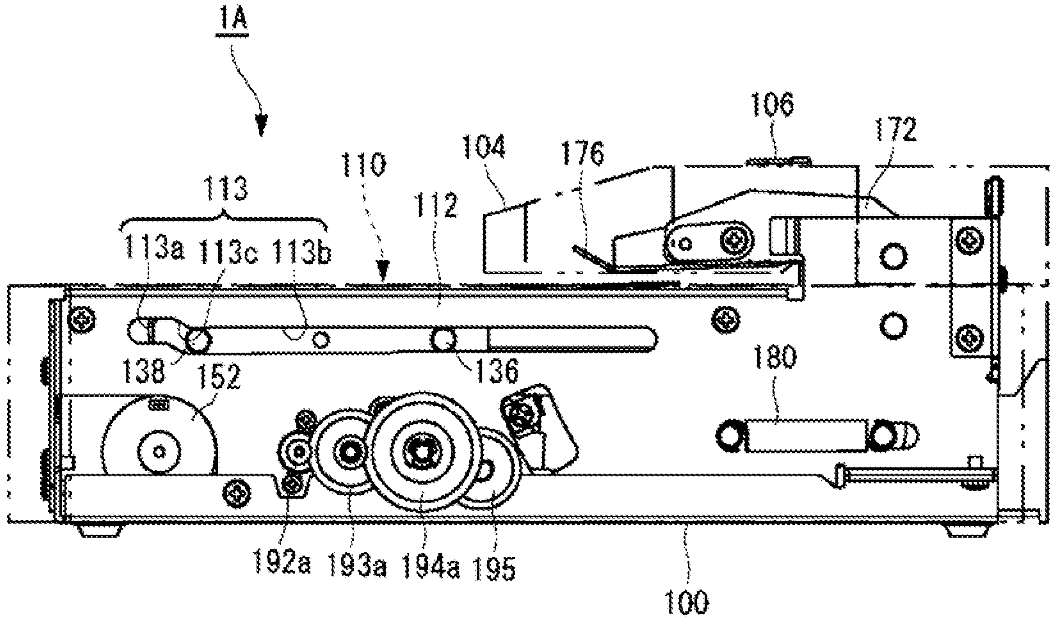
FIG. 12A is a side view showing the operation of the staple pullout mechanism moving to the removal position according to the first embodiment.
Figure 12B:
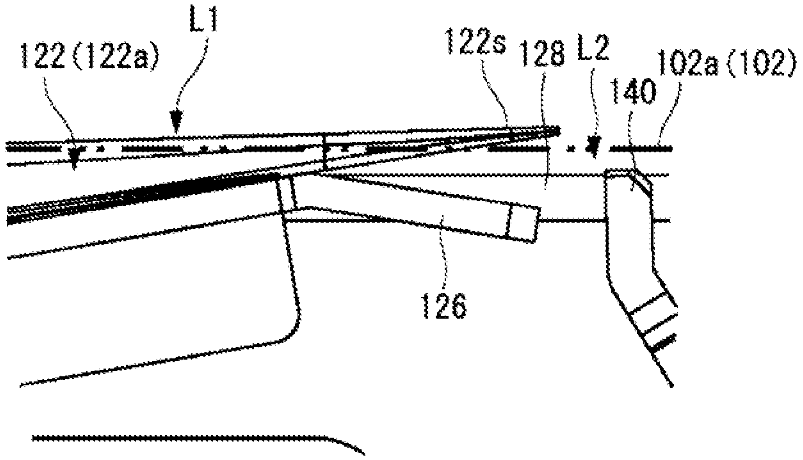
FIG. 12B is a side view of main parts showing the operation of the staple pullout mechanism shown in FIG. 12A.

FIG. 9A is a perspective view showing an operation of the staple pullout mechanism 110 located at the standby position L1, and FIG. 9B is a perspective view showing an operation of the staple pullout mechanism 110 moving to the removal position L2. FIG. 10A is a side view of main parts showing the operation of the staple pullout mechanism 110 located at the standby position L1, and FIG. 10B is a side view of main parts showing the operation of the staple pullout mechanism moving to the removal position L2. FIG. 11A is a side view showing the operation of the staple pullout mechanism 110 located at the standby position L1, and FIG. 11B is a side view of main parts showing the operation of the staple pullout mechanism 110 shown in FIG. 11A. FIG. 12A is a side view showing the operation of the staple pullout mechanism 110 moving to the removal position L2, and FIG. 12B is a side view of main parts showing the operation of the staple pullout mechanism 110 shown in FIG. 12A. Note that, for convenience, in FIGS. 11A to 11B and 12A to 12B, only the left frame 112-side is described. However, it is assumed that the right frame 114-side on the opposite side can also adopt the similar operations to the left frame 112-side.

When the staple removing device 1A is in a standby state, the wedge plate 122 is stopped at the standby position L1 of the housing 100, as shown in FIGS. 9A, 10A and 11A. At this time, the second drive shaft 138 is located in the first groove 113*a* of the guide groove 113 of the left frame 112, and the first drive shaft 136 is located in the second groove 113*b* of the guide groove 113 of the left frame 112. For this reason, the attaching portion 122*b*-side of the wedge plate 122 is in a lifted state, and the wedge plate main body 122*a*-side including the tip end portion 122*s* of the wedge plate 122 is at a position lower than the attaching portion 122*b*-side. Thereby, as shown in FIG. 11B, when the tip end portion 122*s* of the removing part 120 is at the standby position L1, the wedge plate main body 122*a* including the tip end portion 122*s* of the wedge plate 122 is located below the placing surface 102*a* of the placing table 102. Thereby, when placing the sheet bundle P on the placing table 102, it is possible to prevent a malfunction that the wedge plate 122 collides with the sheet bundle P, and therefore, is separated from the placing table.

When the start switch 106 of the staple removing device 1A is operated, as shown in FIGS. 9B and 10B, the first motor 152 is driven, and the drive force of the first motor 152 is transmitted to the pinions 158 and 159 via the plurality of gears 153*a*, 153*b*, 154*a*, 154*b* and 155. Along with this, the pinions 158 and 159 rotate in a clockwise direction in FIG. 10B, and the racks 130 and 131 in mesh with the pinions 158 and 159 move rearward from the front along the placing table 102, so that the wedge plate 122 moves rearward from the front.

At this time, as shown in FIG. 12A, the second drive shaft 138 moves from the first groove 113*a* of the guide groove 113 of the left frame 112 to the second groove 113*b*. The second drive shaft 138 is parallel to and flush with the first drive shaft 136 with respect to the placing surface 102*a* of the placing table 102. For this reason, the position of the wedge plate 122 on the attaching portion 122*b*-side is lowered, so that the wedge plate main body 122*a*-side of the wedge plate 122 is lifted (rotated) with the first drive shaft 136 as a fulcrum. Here, since the upper surface of the wedge plate main body 122*a* has a structure slightly protruding further than the upper surface of the attaching portion 122*b*, as shown in FIG. 12B, the tip end portion 122*s* of the wedge plate 122 is located above the placing surface 102*a* of the placing table 102. In other words, the tip end portion 122*s* of the wedge plate 122 rotates with the drive shaft 136 as a fulcrum. In the present embodiment, the wedge plate 122 moves while maintaining the state of protruding from the placing surface 102*a* of the placing table 102 via the opening portion 102*b* of the placing table 102 until passing through the removal position L2 from the front of the removal position L2. Thereby, the tip end portion 122*s* of the wedge plate main body 122*a* is surely pushed between the sheet bundle P and the crown portion Sa.

Operation Example of Sheet Pressing Mechanism 160

Next, an example of an operation of the staple pressing mechanism 160 that is performed when removing the staple S from the sheet bundle P is described.

Figure 13A:
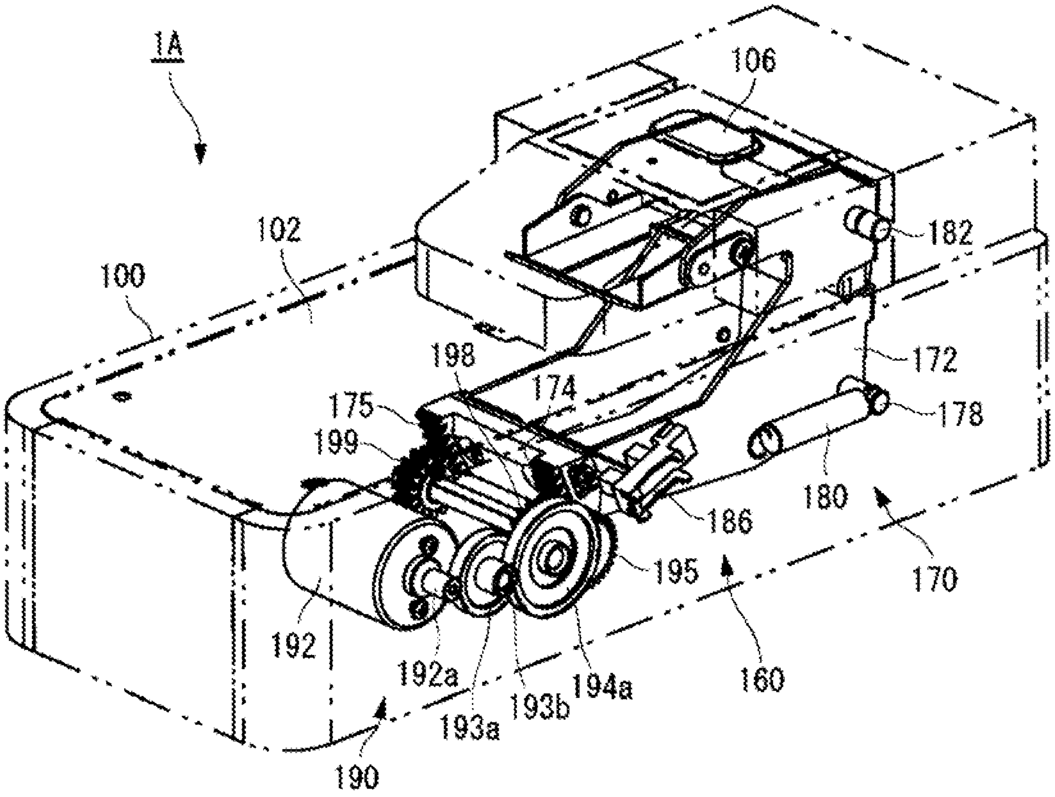
FIG. 13A is a perspective view showing an operation of the sheet pressing mechanism located at the standby position according to the first embodiment.
Figure 13B:
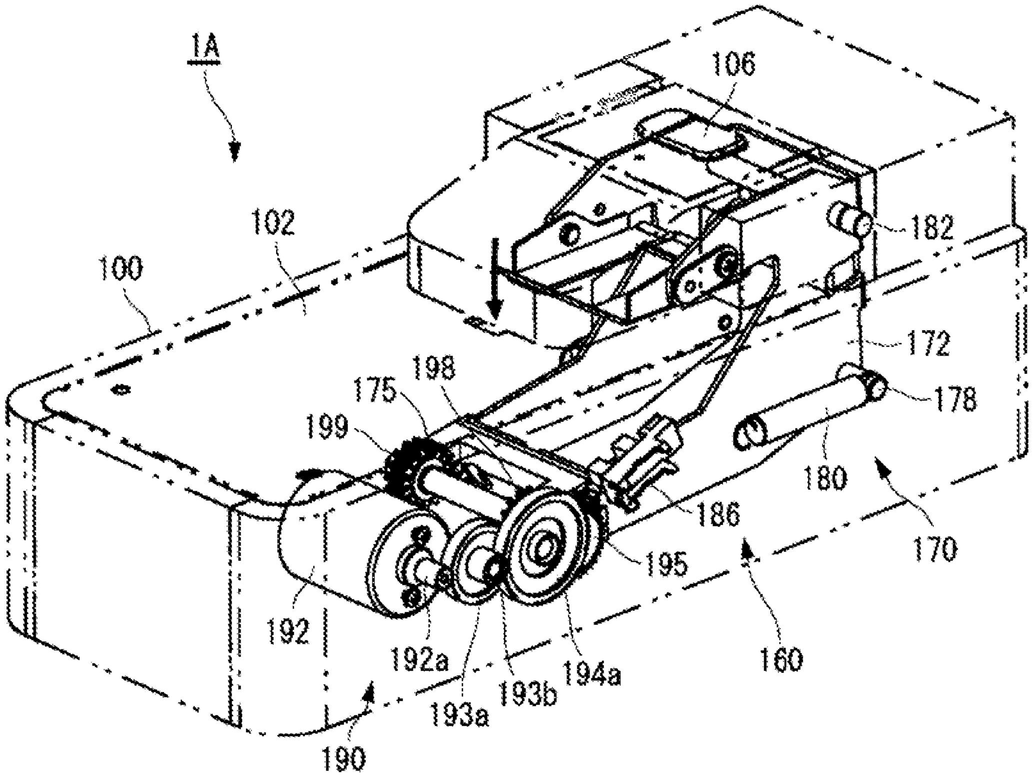
FIG. 13B is a perspective view showing an operation of the sheet pressing mechanism moving to a pressing position according to the first embodiment.
Figure 14A:
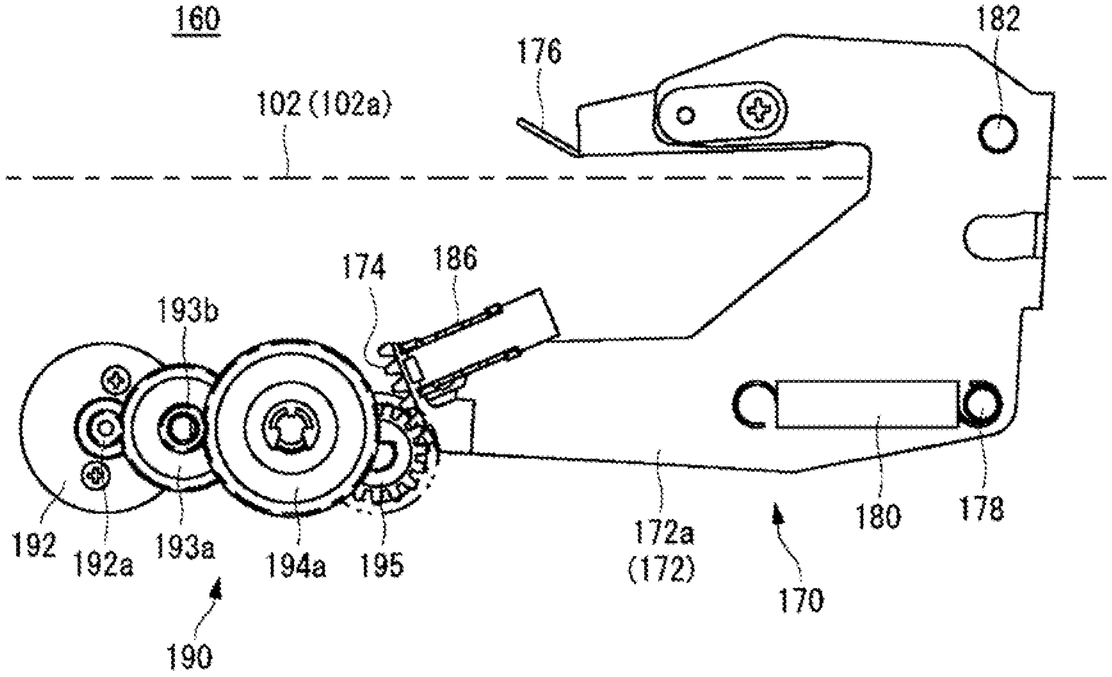
FIG. 14A is a side view of main parts showing the operation of the sheet pressing mechanism located at the standby position according to the first embodiment.
Figure 14B:
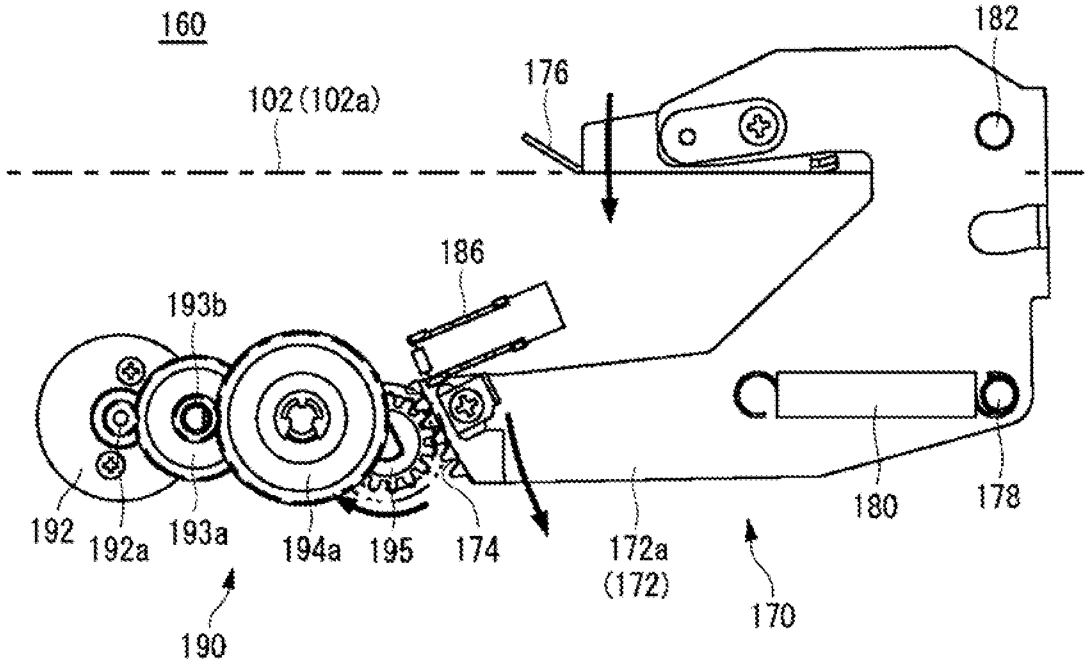
FIG. 14B is a side view of main parts showing the operation of the sheet pressing mechanism moving to the pressing position according to the first embodiment.

FIG. 13A is a perspective view showing an operation of the sheet pressing mechanism 160 located at the standby position, and FIG. 13B is a perspective view showing an operation of the sheet pressing mechanism 160 moving to a pressing position. FIG. 14A is a side view of main parts showing the operation of the sheet pressing mechanism 160 located at the standby position, and FIG. 14B is a side view of main parts showing the operation of the sheet pressing mechanism 160 moving to the pressing position.

As shown in FIGS. 13A and 14A, when the staple removing device 1A is at the standby position, the sheet pressing plate 176 is stopped at a position at a certain interval from the placing surface 102*a* of the placing table 102. The certain interval is an interval at which the lower surface of the sheet pressing plate 176 does not come into contact with the uppermost sheet of the sheet bundle P placed on the placing table 102.

When the start switch of the staple removing device 1A becomes on, the second motor 192 is driven. The drive force of the second motor 192 is transmitted to the sheet pressing pinions 198 and 199 via the gears 193*a*, 193*b*, 194*a*, 194*b* and 195. Along with this, as shown in FIGS. 13B and 14B, the sheet pressing pinions 198 and 199 rotate in the clockwise direction, and the sheet pressing racks 174 and 175 in mesh with the sheet pressing pinions 198 and 199 move substantially downward. When the sheet pressing racks 174 and 175 move substantially downward, the hold lever 172 rotates in a counterclockwise direction with the hold lever shaft 182 as a fulcrum against the elastic force of the return spring 180, and the sheet pressing plate 176 moves (descends) in a direction toward the placing table 102. Thereby, the sheet bundle P placed on the placing table 102 is pressed with a certain pressing force by the sheet pressing plate 176.

When the operation of removing the staple S from the sheet bundle P is over, the second motor 192 is driven in reverse rotation. Thereby, the sheet pressing plate 176 moves (ascends) in a direction away from the sheet bundle P and returns to the standby position shown in FIG. 14A and the like.

Operation Example of Staple Removing Device 1A

Next, an operation and the like of the staple removing device 1A that is performed when pulling out the staple S from the sheet bundle P are described. Note that, since the operations of the staple pullout mechanism 110 and the sheet pressing mechanism 160 are similar to those in FIGS. 9A, 13A and the like, the detailed descriptions thereof are omitted.

FIGS. 15A to 15G are side views showing an example of an operation of the staple removing device 1A that is performed when pulling out the staple S from the sheet bundle P are described. FIGS. 16A to 16E are enlarged views of main parts showing an example of an operation of the wedge plate 122 when pulling out the staple S from the sheet bundle P. FIGS. 17A to 17E show states of the wedge plate 122 and the staple S when pulling out the staple S from the sheet bundle P. Note that, in the descriptions of FIG. 15A and the like, for convenience, only an operation on the right side of the staple removing device 1A is described. However, it is assumed that the left side on an opposite side can also adopt the similar operation to that of the right side.

Figure 15A:
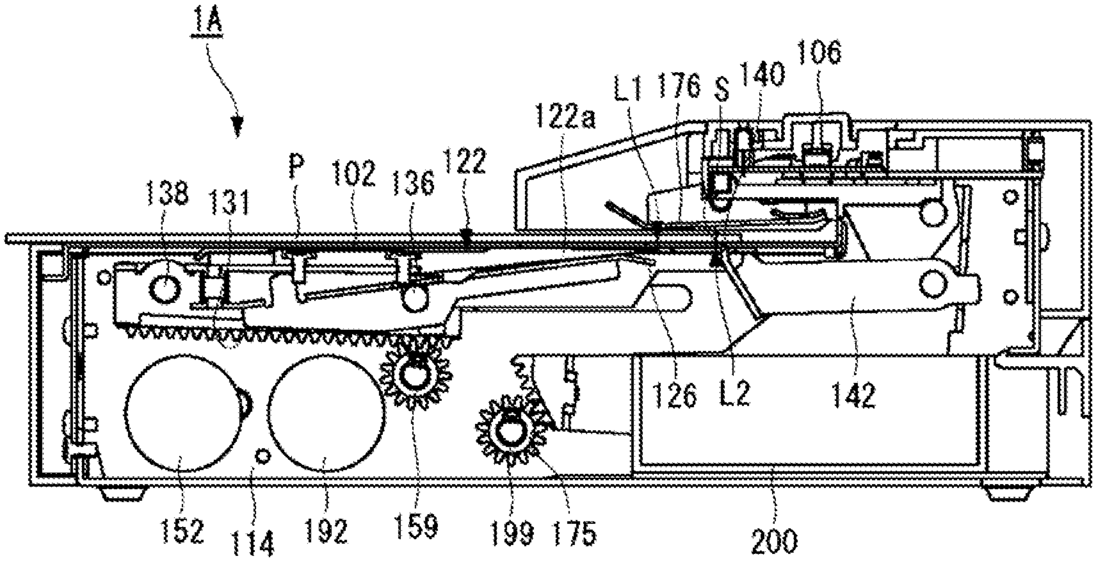
FIG. 15A is a side view showing an operation of the staple removing device when removing a staple from a sheet bundle according to the first embodiment.

As shown in FIG. 15A, when removing the staple S from the sheet bundle P, the sheet bundle P bound by the staple S is first placed on the placing table 102. A user aligns the sheet bundle P with a mark indicating the removal position L2 provided on the placing table 102, and places the crown portion Sa-side of the staple S toward the placing table. As shown in FIG. 17A, the sheet bundle P is bound by the staple S. The leg portions Sb and Sb of the staple S penetrate the sheet bundle P in the thickness direction of the sheet, are bent inwardly, and are bitten into the sheet surface.

Figure 15B:
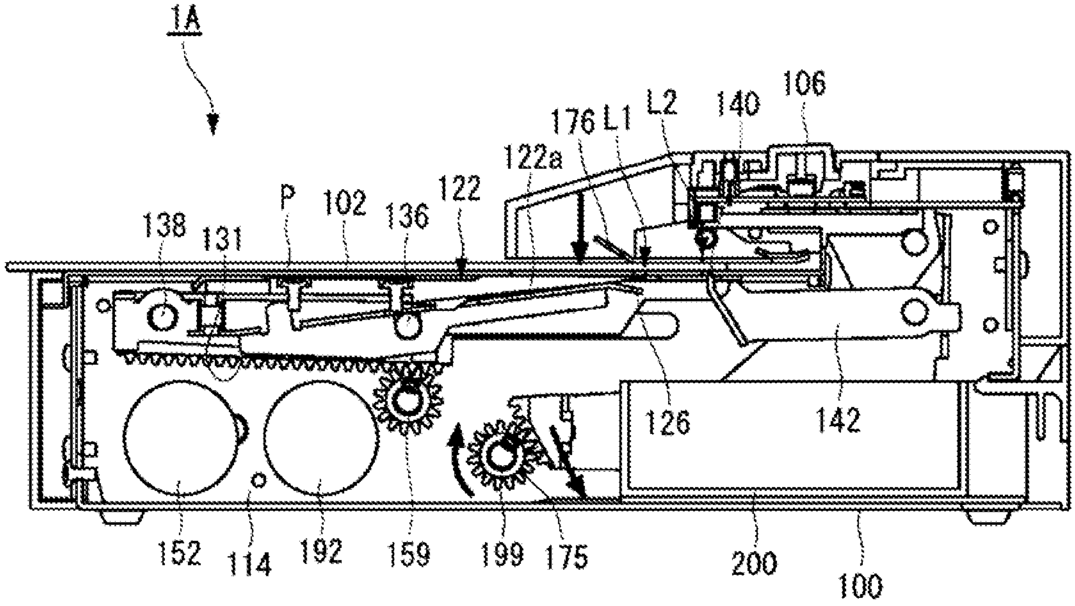
FIG. 15B is a side view showing the operation of the staple removing device when removing the staple from the sheet bundle according to the first embodiment.

Next, when the start switch 106 of the staple removing device 1A is pushed by the user, the second motor 192 is started to drive. Thereby, as shown in FIG. 15B, the sheet pressing plate 176 moves (descends) in the direction toward the placing table 102, and the sheet bundle P is pressed with a certain pressing force by the sheet pressing plate 176.

Figure 16A:
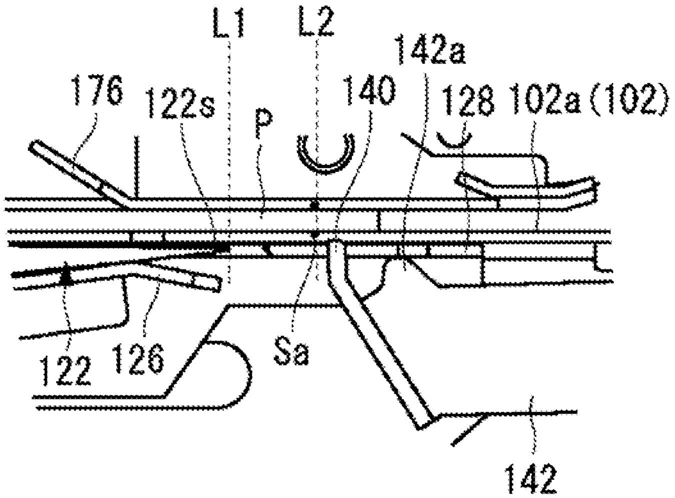
FIG. 16A is an enlarged view of main parts showing an operation of a wedge plate when removing the staple from the sheet bundle according to the first embodiment.

Subsequently, after a predetermined time has elapsed from the start of driving of the second motor 192, the first motor 152 is driven. Thereby, the pinion 159 rotates in the clockwise direction, so that the removing part 120 including the rack 131 and the wedge plate 122 moves rearward from the front. At the start of movement of the removing part 120 from the front to the rear, the tip end portion 122*s* of the wedge plate main body 122*a* is located below the placing surface 102*a* of the placing table 102, as shown in FIG. 16A, similar to the standby position L1.

Figure 16B:
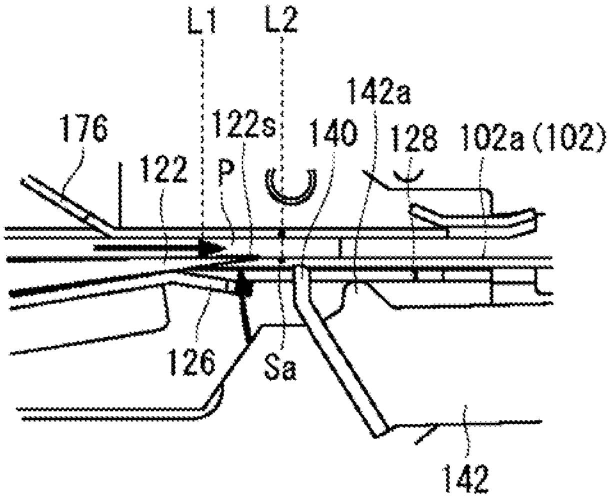
FIG. 16B is an enlarged view of main parts showing the operation of the wedge plate when removing the staple from the sheet bundle according to the first embodiment.

When the tip end-side of the removing part 120 moves rearward from the front ahead of the removal position L2, the second drive shaft 138 of the removing part 120 moves to the second groove 115*b* of the guide groove 115. Therefore, as shown in FIG. 16B, the tip end portion 122*s* of the wedge plate 122 protrudes from the placing surface 102*a* via the opening portion 102*b* of the placing table 102. The wedge plate 122 moves rearward from the front in a state where the upper surface of the wedge plate comes into contact with a back surface of the lowermost sheet of the sheet bundle P and presses the sheet bundle P. In this way, the guide groove 115 is formed such that the tip end portion of the removing part 120 standing by at the standby position L1 is located below the placing table 102 and the tip end portion of the removing part 120 is caused to protrude from the placing table 102 until passing through the removal position from the front of the removal position.

Figure 15C:
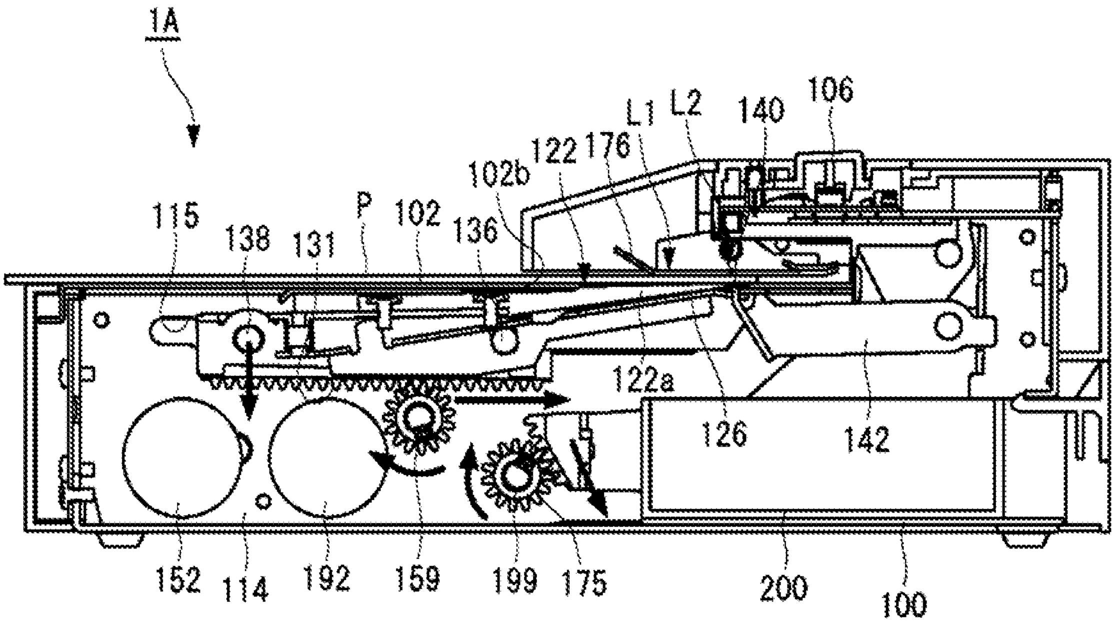
FIG. 15C is a side view showing the operation of the staple removing device when removing the staple from the sheet bundle according to the first embodiment.
Figure 16C:
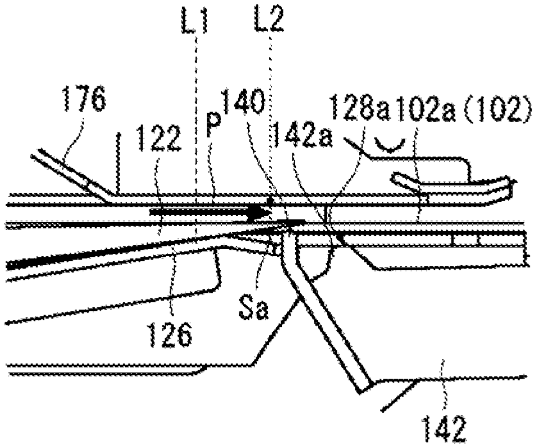
FIG. 16C is an enlarged view of main parts showing the operation of the wedge plate when removing the staple from the sheet bundle according to the first embodiment.
Figure 16D:
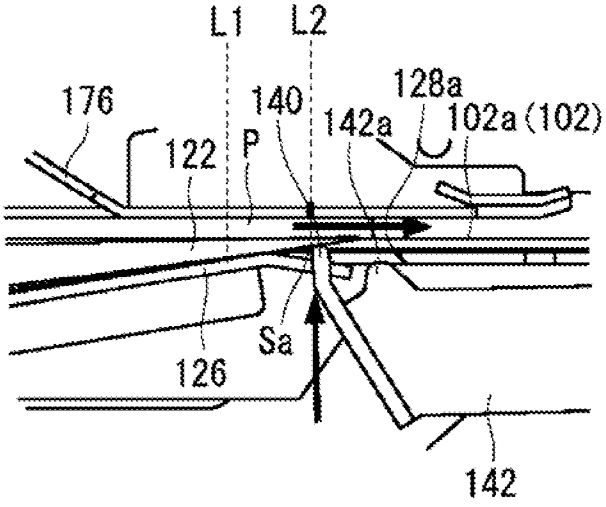
FIG. 16D is an enlarged view of main parts showing the operation of the wedge plate when removing the staple from the sheet bundle according to the first embodiment.
Figure 17B:
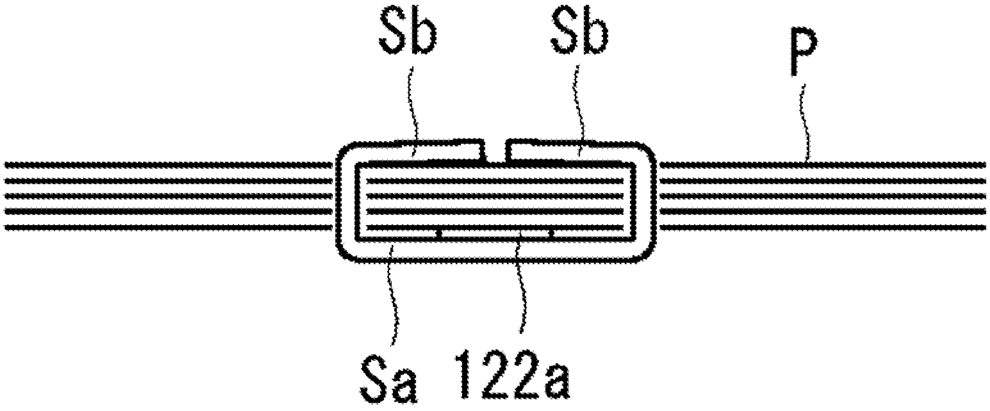
FIG. 17B shows states of the wedge plate and the staple when removing the staple from the sheet bundle according to the first embodiment.

When the tip end-side of the wedge plate 122 moves to the removal position L2, it is pushed between the crown portion Sa and the sheet bundle P, as shown in FIGS. 15C and 16C. At this time, as shown in FIG. 17B, the leg portions Sb and Sb of the staple S shift to a state substantially parallel to the sheet surface of the sheet bundle P from the state of being bitten into the sheet surface of the sheet bundle P. When the wedge plate 122 further moves rearward from the front in this state, the convex portion 142*a* of the pressing holder 142 separates from the support portion 128*b* of the holder 128, as shown in FIG. 16D. Thereby, the pressing portion 140 ascends due to the urging of the tension spring 144, and comes into contact with the crown portion Sa on the sheet bundle P moving rearward from the front by the pushing force of the wedge plate 122, thereby restricting the rearward movement of the staple S.

Figure 15D:
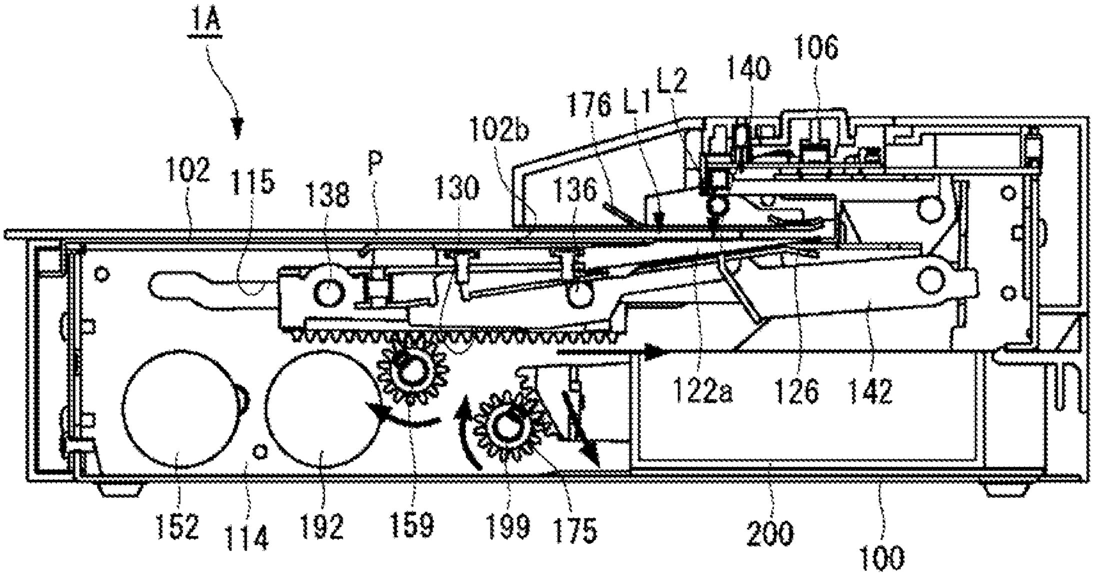
FIG. 15D is a side view showing the operation of the staple removing device when removing the staple from the sheet bundle according to the first embodiment.
Figure 15E:
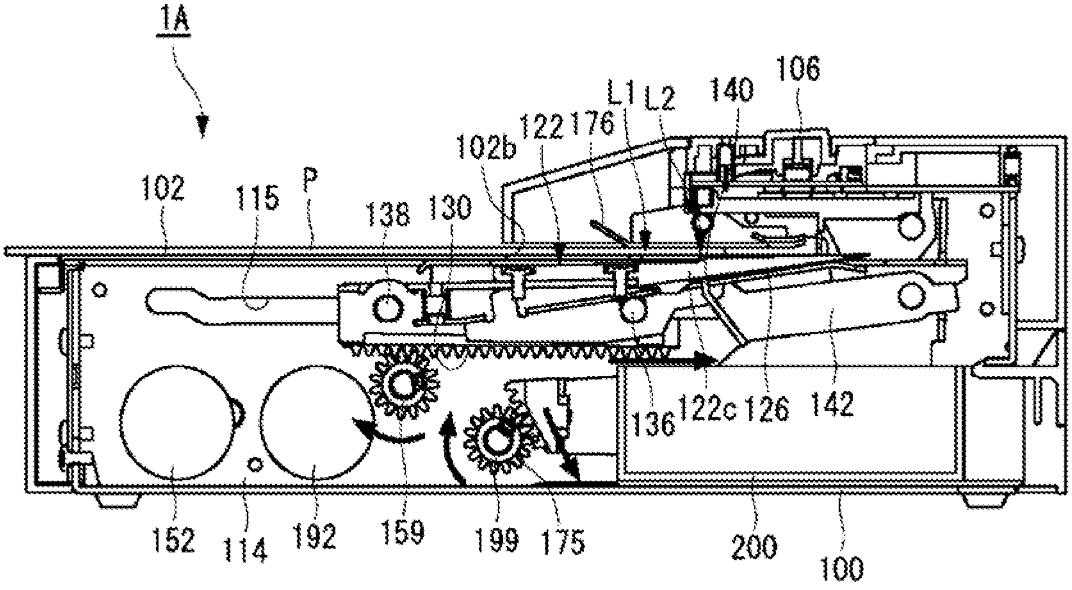
FIG. 15E is a side view showing the operation of the staple removing device when removing the staple from the sheet bundle according to the first embodiment.
Figure 16E:
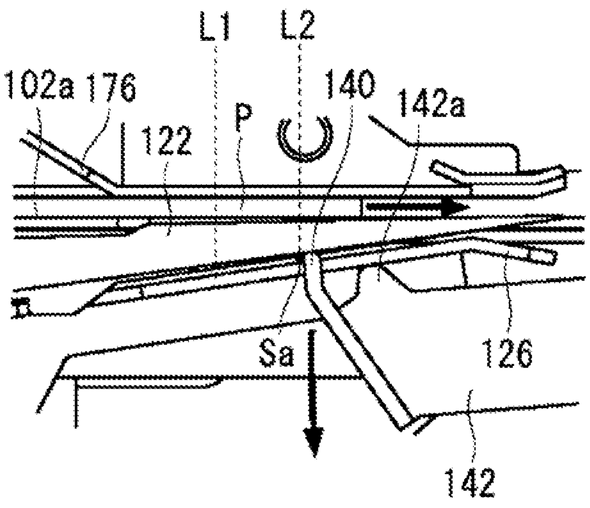
FIG. 16E is an enlarged view of main parts showing the operation of the wedge plate when removing the staple from the sheet bundle according to the first embodiment.
Figure 17C:
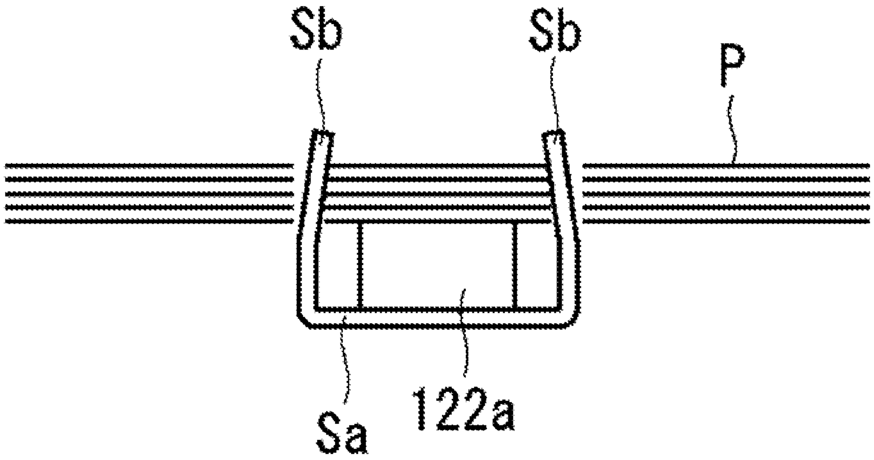
FIG. 17C shows states of the wedge plate and the staple when removing the staple from the sheet bundle according to the first embodiment.
Figure 17D:
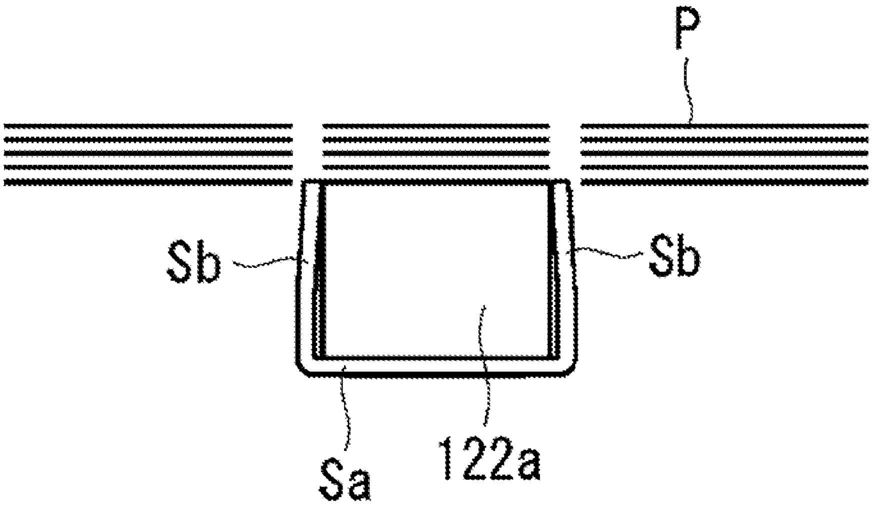
FIG. 17D shows states of the wedge plate and the staple when removing the staple from the sheet bundle according to the first embodiment.

When the tip end-side of the wedge plate 122 passes through the removal position L2, as shown in FIGS. 15D and 16E, the thickness of the wedge plate 122 pushed between the sheet bundle P and the crown portion Sa at the removal position is increased, in side view. The pressing portion 140 accordingly descends in the thickness direction of the wedge plate 122 in the state of being in contact with the wedge plate 122 and the crown portion Sa by the extension of the tension spring 144. Thereby, as shown in FIG. 17C, the crown portion Sa is pushed in a direction away from the sheet bundle P by the wedge plate 122, and the leg portions Sb and Sb of the staple S bent inwardly extend to be substantially orthogonal to the sheet surface of the sheet bundle P. As shown in FIG. 15E, when the thickness of the wedge plate 122 at the removal position L2 becomes thicker, in side view, the leg portions Sb and Sb of the staple S are pulled out from the sheet bundle P, as shown in FIG. 17D. However, since the leg portions Sb and Sb are caught on the side surface of the wedge plate 122 due to the springback of the staple S, the staple S does not drop at this stage.

Figure 15F:
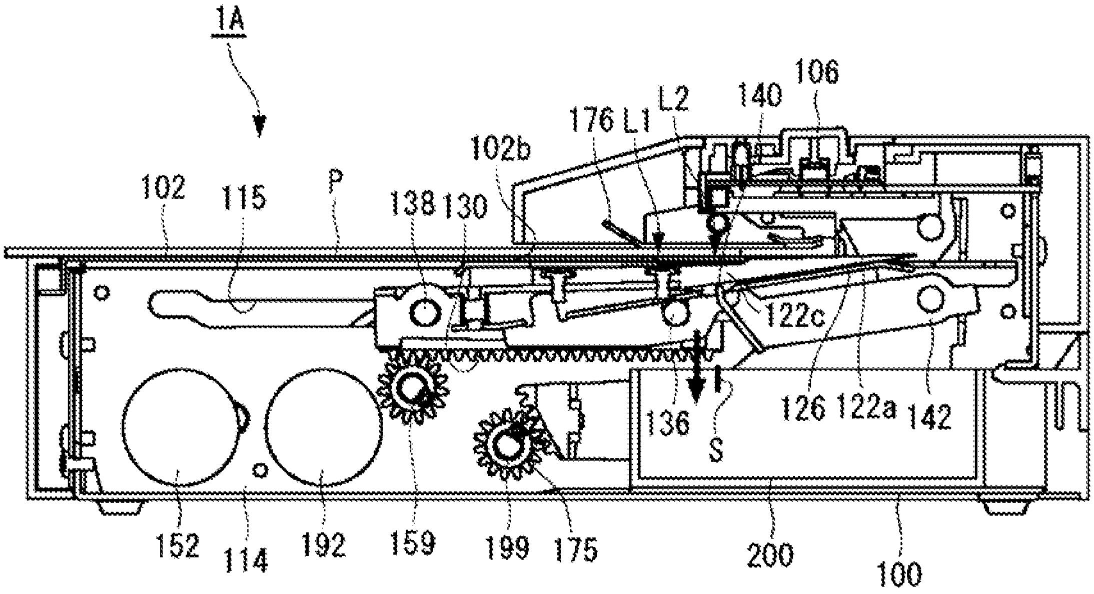
FIG. 15F is a side view showing the operation of the staple removing device when removing the staple from the sheet bundle according to the first embodiment.
Figure 17E:
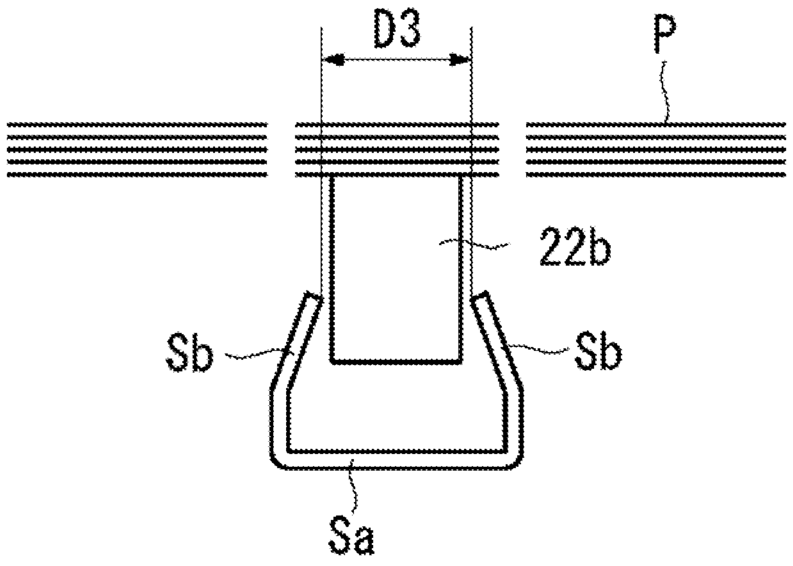
FIG. 17E shows states of the wedge plate and the staple when removing the staple from the sheet bundle according to the first embodiment.

As shown in FIG. 15F, when the wedge plate 122 moves rearward from the front to the end position of the movement range, the narrowed portion 122*c* of the wedge plate 122 is located at the removal position L2. Thereby, as shown in FIG. 17E, since the width dimension D1 of the narrowed portion 122*c* of the wedge plate 122 is narrower than the width dimension D3 between the leg portions Sb and Sb of the staple S that springs back, the leg portions Sb and Sb of the staple S are separated from the side surface of the wedge plate 122, and the staple S drops into the accommodation part 200.

Figure 15G:
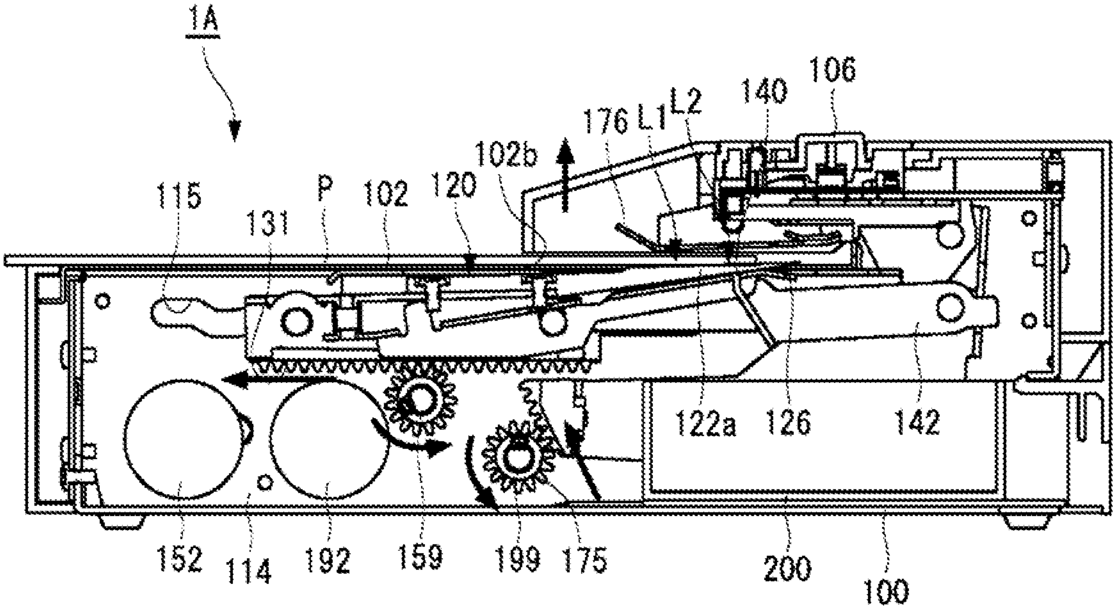
FIG. 15G is a side view showing the operation of the staple removing device when removing the staple from the sheet bundle according to the first embodiment.

As shown in FIG. 15G, when the removal of the staple S from the sheet bundle P is completed, the first motor 152 is driven in reverse rotation. Along with this, the pinion 159 reversely rotates in the counterclockwise direction, the removing part 120 including the rack 131 and the wedge plate 122 moves forward from the rear along the placing table 102, and the removing part 120 returns from the removal position L2 to the standby position L1. In addition, after a predetermined time has elapsed from the reverse rotation of the first motor 152, the second motor 192 is driven in reverse rotation. Along with this, the sheet pressing pinion 199 rotates in the counterclockwise direction and the sheet pressing rack 175 moves substantially upward, so that the sheet pressing plate 176 moves in the direction away from the placing table 102 via the hold lever 172 and returns to the standby position.

As described above, according to the present embodiment, the wedge plate 122 is configured to move linearly along the placing table 102, and the tip end portion 122*s* of the wedge plate 122 is moved in the state of protruding from the placing surface 102*a* of the placing table 102 until passing through the removal position L2 from the front of the removal position L2. That is, by providing a certain section in which the tip end portion 122*s* of the wedge plate 122 moves in the state of protruding from the placing surface 102*a*, the removing point for removing the staple S can be set as a plane, instead of a point. Thereby, since the staple S can be removed from the sheet bundle P by setting the staple S of the sheet bundle P in a certain range on the placing table 102, occurrence of a malfunction during the removing operation can be securely prevented. Further, since the staple S has only to be set in the certain range on the placing table 102, a burden on the user at the time of setting the sheet bundle P on the placing table 102 can be reduced.

Further, according to the present embodiment, since the tip end portion 122*s* of the wedge plate 122 is moved in the certain section in the state of protruding from the placing surface 102*a* of the placing table 102, the tip end portion 122*s* of the wedge plate 122 can be securely inserted between the sheet bundle P and the crown portion Sa.

Further, according to the present embodiment, when the tip end portion 122*s* of the wedge plate 122 is at the standby position L1 in a state where the staple removing device 1A is at the standby position, the tip end portion 122*s* of the wedge plate 122 is placed below the placing surface 102*a* of the placing table 102. Therefore, when setting the sheet bundle P on the placing table 102, it is possible to prevent the sheet or the crown portion Sa from being caught at the tip end portion 122*s* of the wedge plate 122. Thereby, it is possible to avoid the occurrence of the malfunction in the sheet bundle P due to damage to the sheet, and to improve the operability of the user when setting the sheet bundle P on the placing table 102.

Second Embodiment

In a second embodiment, the mechanism for adjusting the height of the wedge plate 122 during movement is different from that of the first embodiment. Note that, since the other configurations and operations of a staple removing device 1B are common to those of the staple removing device 1A of the first embodiment, the detailed descriptions of the common parts are omitted.

Configuration Example of Staple Removing Device 1B

Figure 18:
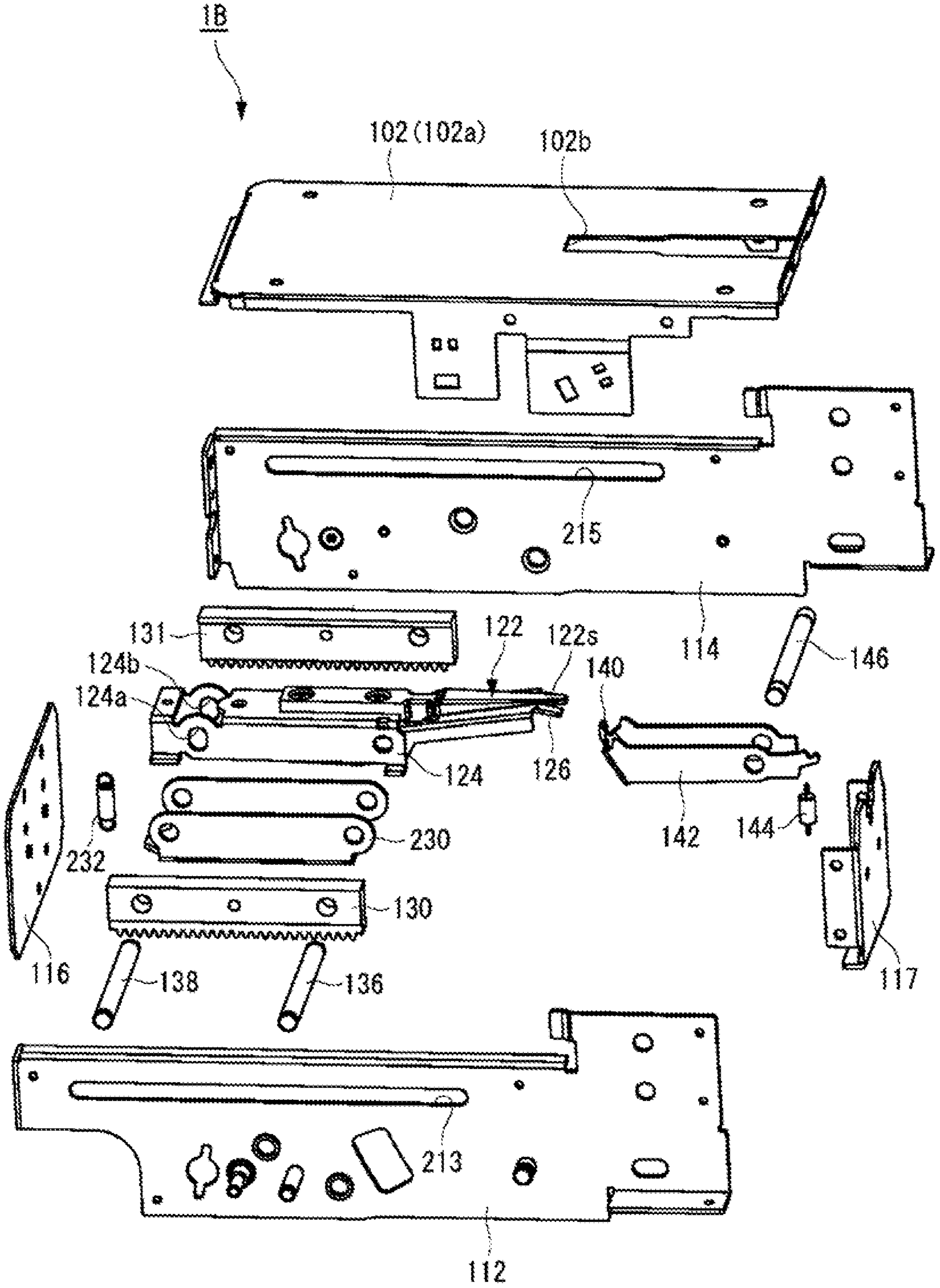
FIG. 18 is an exploded perspective view of a staple removing device according to a second embodiment.

FIG. 18 is an exploded perspective view of a staple removing device 1B according to the second embodiment.

A guide groove 213 extending along the placing surface 102*a* of the placing table 102 is formed in the upper portion of the left frame 112. The guide groove 213 is formed linearly and in parallel to the placing surface 102*a* from a start end to an end of a moving section including the standby position L1 and the removal position L2 (refer to FIG. 19B) of the wedge plate 122. The right end portions of the first drive shaft 136 and the second drive shaft 138 of the removing part 120 are inserted in the guide groove 213.

Similarly, a guide groove 215 extending along the placing surface 102*a* of the placing table 102 is formed in the upper portion of the right frame 114. The guide groove 215 is formed linearly and in parallel to the placing surface 102*a* from the start end to the end of the moving section including the standby position L1 and the removal position L2 of the wedge plate 122. The left end portions of the first drive shaft 136 and the second drive shaft 138 of the removing part 120 are inserted in the guide groove 215. With such a configuration, the removing part 120 can move forward and rearward along the guide grooves 213 and 215, in parallel to the placing surface 102*a* of the placing table 102.

As shown in FIG. 5B, a step portion 122*d* is provided between the wedge plate main body 122*a* and the narrowed portion 122*c*. The upper surface of the wedge plate main body 122*a* further protrudes than the upper surfaces of the attaching portion 122*b* and the narrowed portion 122*c* via the step portion 122*d*.

The front end portion of the blade holder 124 is formed with long holes 124*a* and 124*b* through which the second drive shaft 138 is inserted. The long holes 124*a* and 124*b* each have a long axis extending in the upper and lower direction. A length of the long axis defines a maximum amount of protrusion of the wedge plate 122 protruding from the placing surface 102*a* of the placing table 102. The front end portion of the blade holder 124 is supported by the second drive shaft 138, and is configured to be movable in the upper and lower direction along the long holes 124*a* and 124*b*. Thereby, the tip end portion 122*s* of the wedge plate 122 moves in the upper and lower direction with the first drive shaft 136 as a fulcrum as the rear end portion of the blade holder 124 moves up and down.

A wedge plate unit holder 230 is constituted by a flat plate bent in a substantial U-shape, and is arranged overlapped on the side surface the blade holder 124 from below. The rack 130 is arranged on a right side of the wedge plate unit holder 230, and the rack 131 is arranged on a left side thereof.

One end portion of a wedge plate spring 232 is attached to an attaching portion provided on the lower surface of the front end portion of the blade holder 124, and the other end portion of the wedge plate spring 232 is attached to an attaching portion provided on an upper surface of a front end portion of the wedge plate unit holder 230. The front end portion of the blade holder 124 and the front end portion of the wedge plate unit holder 230 are urged each other in a direction of coming close to each other by the wedge plate spring 232. A spring constant of the wedge plate spring 232 defines a pressing force of the wedge plate 122, which protrudes upward from the placing table 102, against the sheet bundle P.

Operation Example of Staple Removing Device 1B

Figure 19A:
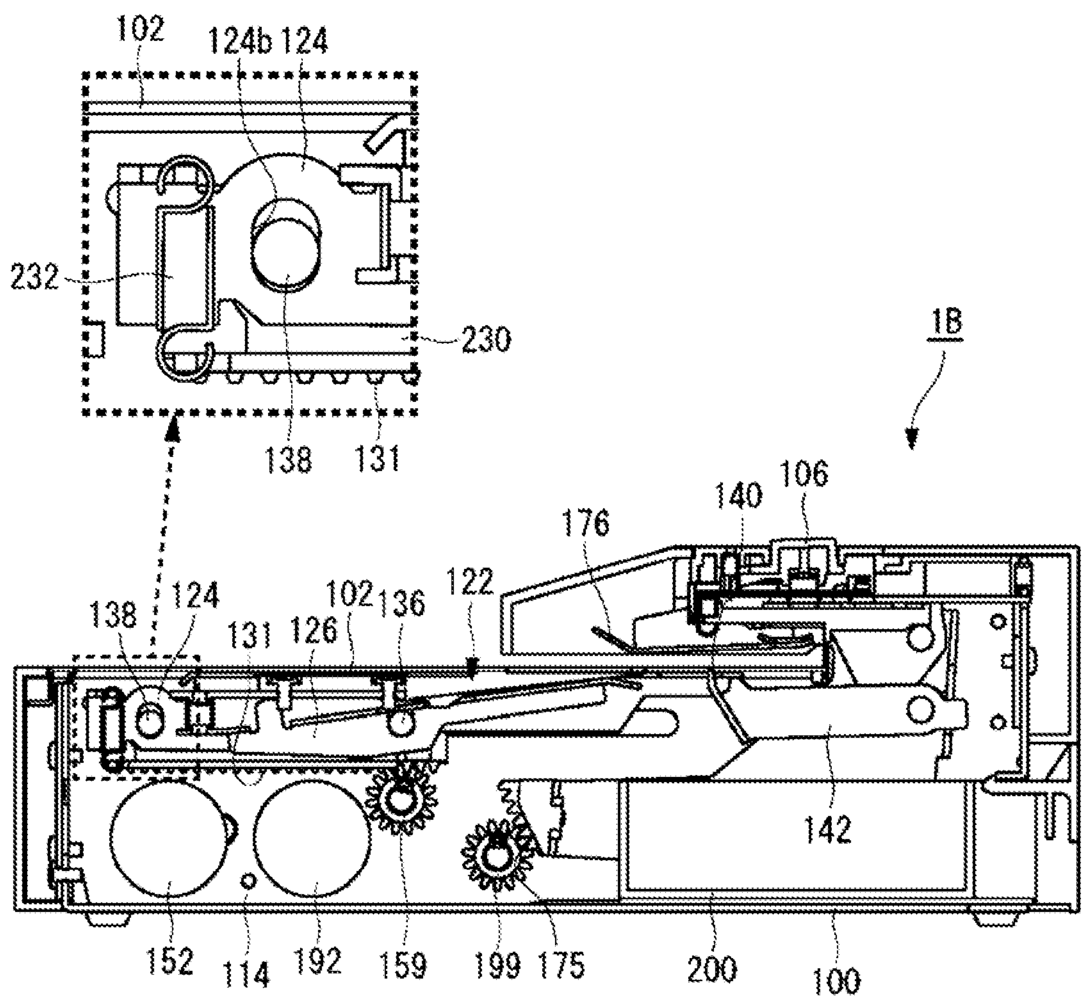
FIG. 19A illustrates an operation of the wedge plate of the staple removing device located at the standby position according to the second embodiment.
Figure 19B:
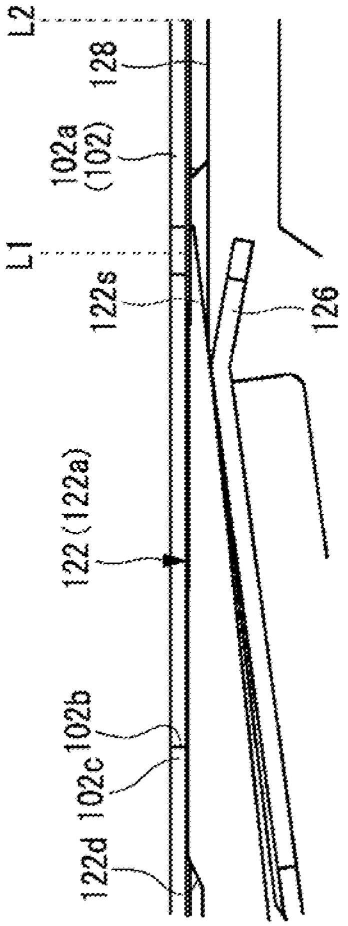
FIG. 19B is an enlarged view of main parts of the wedge plate and a placing table shown in FIG. 19A.
Figure 20A:
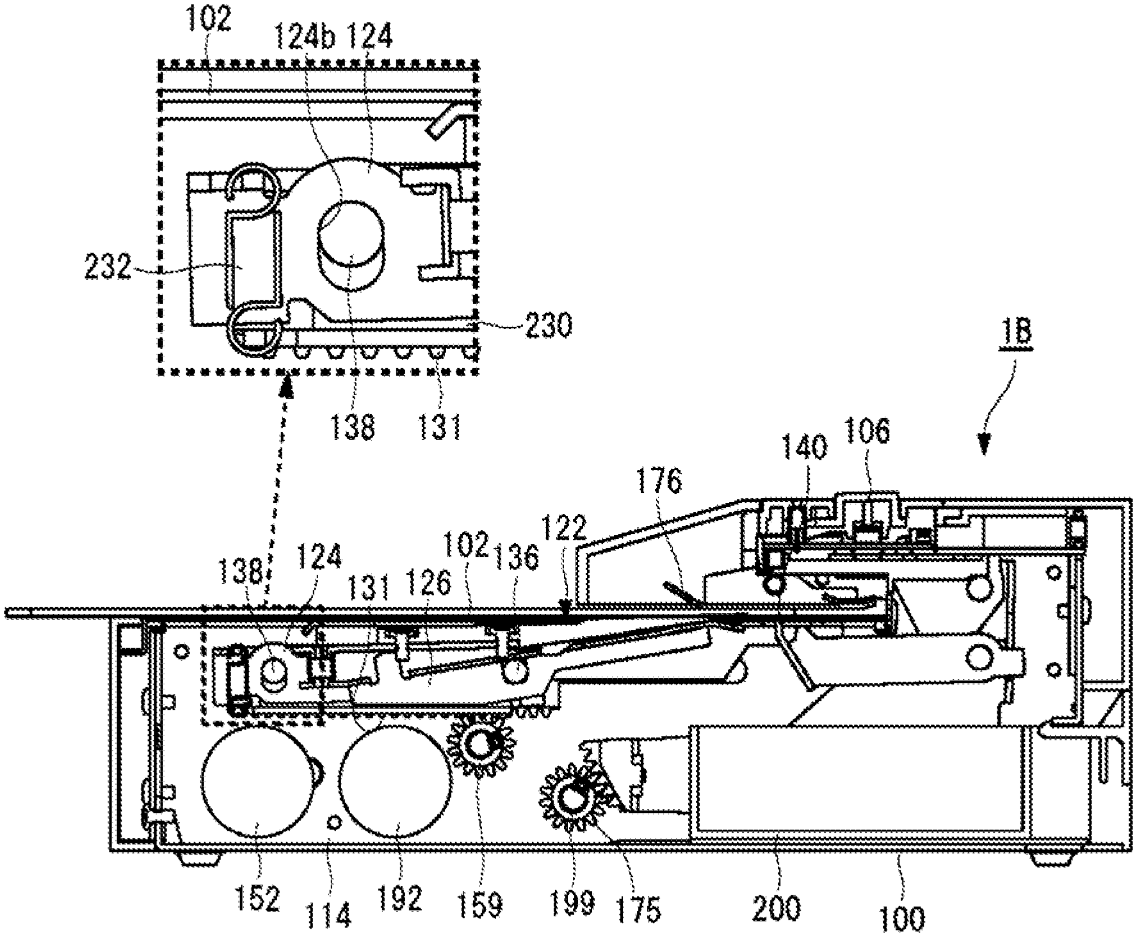
FIG. 20A illustrates an operation of the wedge plate of the staple removing device moving to the removal position according to the second embodiment.
Figure 20B:
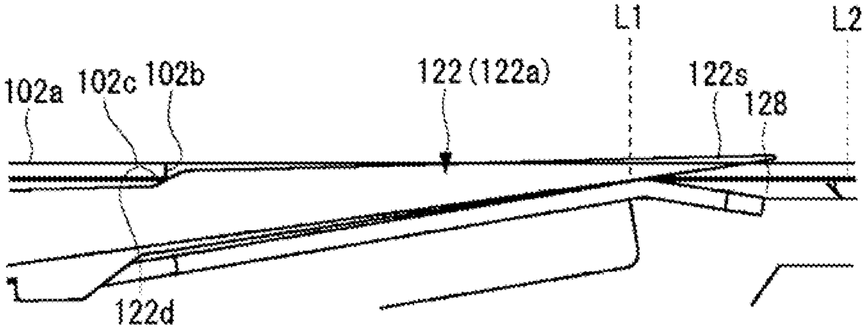
FIG. 20B is an enlarged view of main parts of the wedge plate and the placing table shown in FIG. 20A.

FIG. 19A illustrates an operation of the wedge plate 122 of the staple removing device 1B located at the standby position L1, and FIG. 19B is an enlarged view of main parts of the wedge plate 122 and the placing table 102 shown in FIG. 19A. FIG. 20A illustrates an operation of the wedge plate 122 of the staple removing device 1B moving to the removal position L2, and FIG. 20B is an enlarged view of main parts of the wedge plate 122 and the placing table 102 shown in FIG. 20A. Note that, in FIGS. 19A and 20A, only an operation on the left side of the staple removing device 1B is described. However, since an operation on the right side is also common to that on the left side, the detailed description thereof is omitted.

As shown in FIGS. 19A and 19B, when the staple removing device 1B is at the standby position, the tip end portion 122*s* of the wedge plate 122 is located at the standby position L1. In this case, the upper surface (the tip end-side of the wedge plate 122) of the wedge plate main body 122*a* is pushed down below the placing table 102 by colliding with the back surface of the placing table 102. Along with this, the rear end portion of the blade holder 124 is pushed up (rotated) along the long hole 124*b* with the first drive shaft 136 as a fulcrum.

When the staple removing device 1B is started, the first motor 152 is driven and the pinion 159 rotates via the plurality of gears 153*a* and the like. As shown in FIG. 20A, when the pinion 159 rotates, the removing part 120 including the rack 131 and the wedge plate 122 moves rearward from the front, and as shown in FIG. 20B, the step portion 122*d* of the wedge plate 122 separates from the back surface of the placing table 102 and moves into the opening portion 102*b*. Along with this, the front end portion of the blade holder 124 is pushed down along the long hole 124*b* by the urging of the wedge plate spring 232, whereas the tip end portion 122*s* of the wedge plate 122 is pushed up with the first drive shaft 136 as a fulcrum. Thereby, the tip end portion 122*s* of the wedge plate 122 protrudes from the placing surface 102*a* of the placing table 102. In other words, the tip end portion 122*s* of the wedge plate 122 rotates with the drive shaft 136 as a fulcrum. In the first embodiment, the tip end portion 122*s* of the wedge plate 122 moves in the state of protruding from the placing surface 102*a* of the placing table 102 until passing through the removal position L2 from the front of the removal position L2.

As described above, according to the second embodiment, as in the first embodiment, the tip end portion 122*s* of the wedge plate 122 is moved in the certain section in the state of protruding from the placing surface 102*a* of the placing table 102. Therefore, the tip end portion 122*s* of the wedge plate 122 can be securely inserted between the sheet bundle P and the crown portion Sa. Further, when the tip end portion 122*s* of the wedge plate 122 is at the standby position L1, the tip end portion 122*s* of the wedge plate 122 is located below the placing surface 102*a* of the placing table 102. Therefore, when setting the sheet bundle P on the placing table 102, it is possible to prevent the sheet or the crown portion Sa from being caught at the tip end portion 122*s* of the wedge plate 122.

Third Embodiment

In a third embodiment, the mechanism for adjusting the height of the wedge plate 122 during movement is different from the above-described embodiment. Note that, since the other configurations and operations of a staple removing device 1C are common to those of the staple removing device 1A of the first embodiment, the detailed descriptions of the common parts are omitted.

Configuration Example of Staple Removing Device 1C

Figure 21:
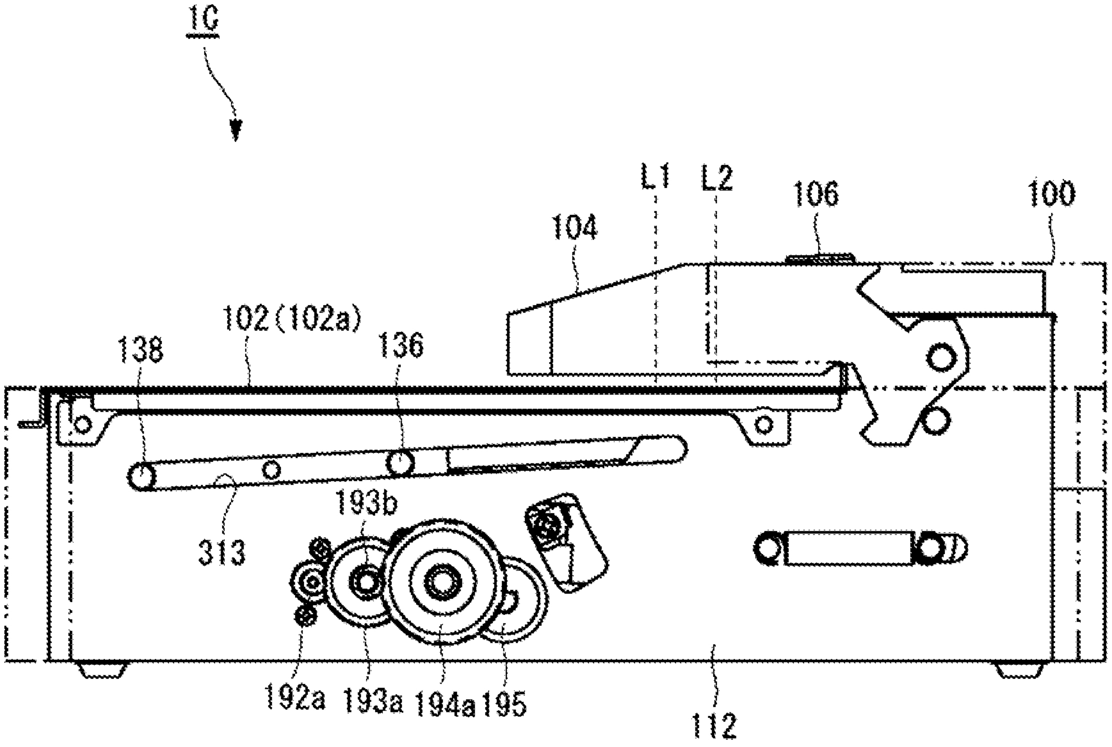
FIG. 21 is a side view of a staple removing device according to a third embodiment.

FIG. 21 is a side view of the staple removing device 1C according to the third embodiment.

A guide groove 313 extending along the placing surface 102*a* of the placing table 102 is formed in the upper portion of the left frame 112. The guide groove 313 is inclined at a certain angle so as to gradually come close to the placing table 102 from the start end toward the end of the moving section of the wedge plate 122. More specifically, the guide groove 313 is formed in such a groove shape that the tip end portion 122*s* of the wedge plate 122 is located below the placing surface 102*a* of the placing table 102 when the tip end portion 122*s* of the wedge plate 122 is stopped at the standby position L1 and the tip end portion 122*s* of the wedge plate 122 protrudes from the placing surface 102*a* of the placing table 102 when passing through the removal position L2 from the front of the removal position L2.

Similar to the left frame 112, the upper portion of the right frame 114 is formed with a guide groove inclined at a certain angle so as to gradually come close to the placing table 102 from the start end toward the end of the moving section of the wedge plate 122. Since the guide groove of the right frame 114 is symmetrical with the guide groove 313 of the left frame 112 and has the common configuration, the detailed description thereof is omitted. In this way, the guide groove 313 is formed such that the tip end portion of the removing part 120 standing by at the standby position L1 is located below the placing table 102 and the tip end portion of the removing part 120 is caused to protrude from the placing table 102 until passing through the removal position from the front of the removal position.

Operation Example of Staple Removing Device 1C

Figure 22A:
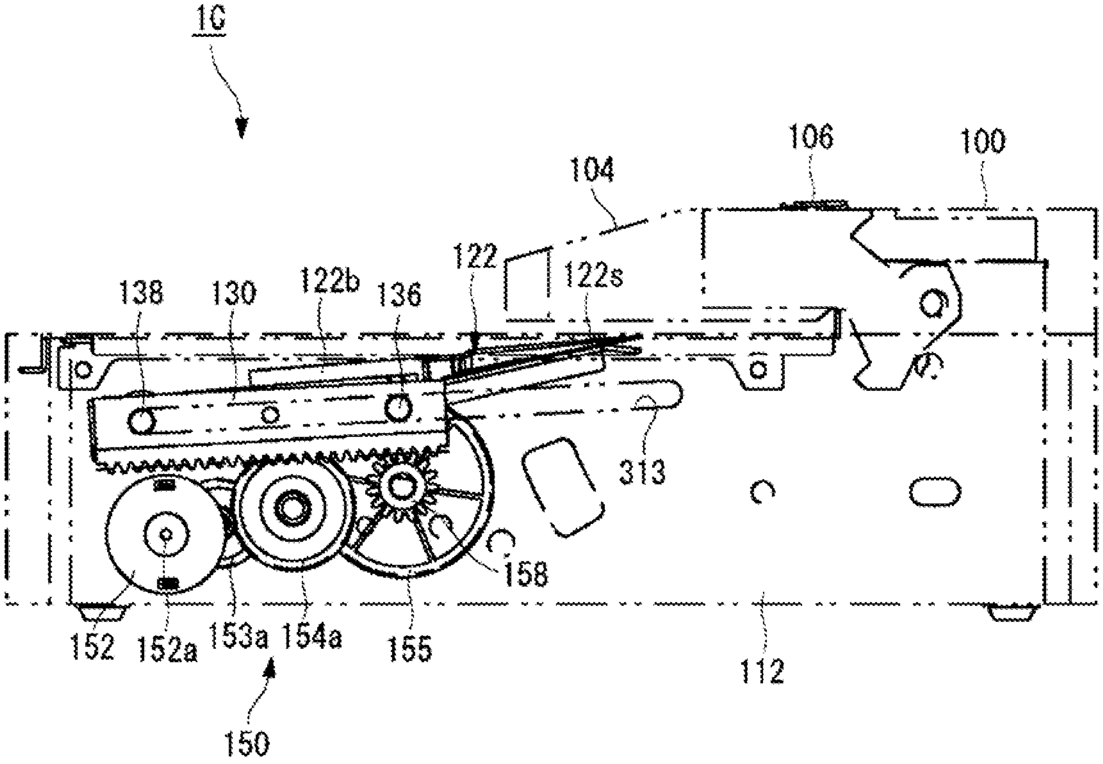
FIG. 22A illustrates an operation of the wedge plate of the staple removing device located at the standby position according to the third embodiment.
Figure 22B:
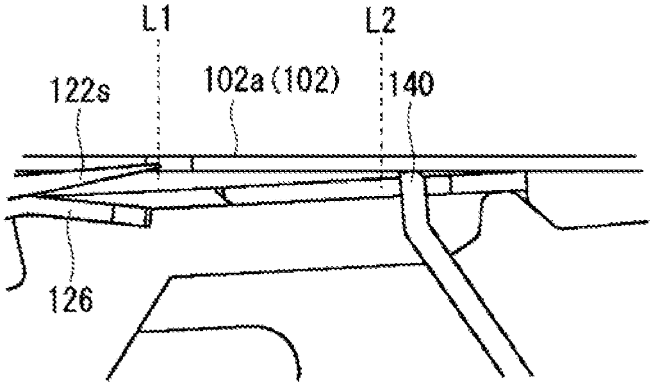
Figure 23A:
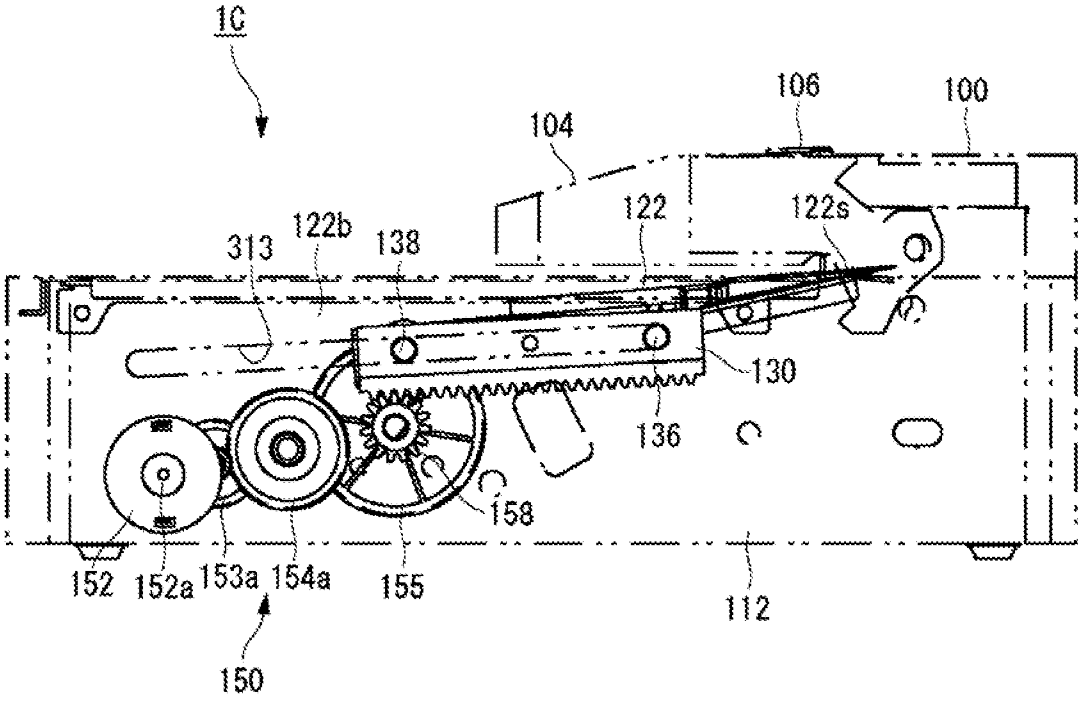
FIG. 23A illustrates an operation of the wedge plate of the staple removing device moving to the removal position according to the third embodiment.
Figure 23B:
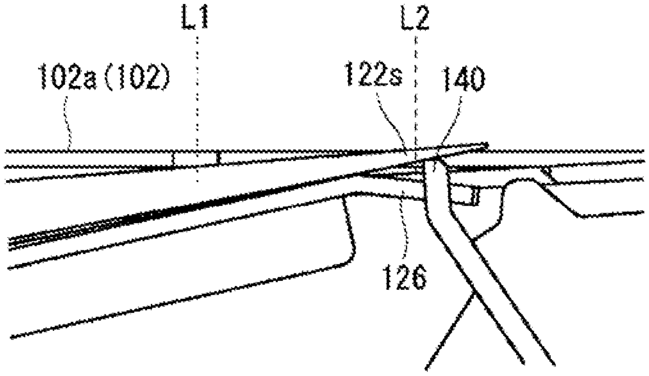
FIG. 23B is an enlarged view of main parts of the wedge plate and the placing table shown in FIG. 23A.

FIG. 22A illustrates an operation of the wedge plate 122 of the staple removing device 1C located at the standby position L1, and FIG. 22B is an enlarged view of main parts of the wedge plate 122 and the placing table 102 shown in FIG. 22A. FIG. 23A illustrates an operation of the wedge plate 122 of the staple removing device 1C moving to the removal position L2, and FIG. 23B is an enlarged view of main parts of the wedge plate 122 and the placing table 102 shown in FIG. 23A. Note that, in FIGS. 22A and 23A, only an operation on the right side of the staple removing device 1C is described. However, since an operation on the left side is also common to that on the right side, the detailed description thereof is omitted.

When the staple removing device 1C is at the standby position, as shown in FIGS. 22A and 22B, the tip end portion 122*s* of the wedge plate 122 is located at the standby position L1 and the second drive shaft 138 of the removing part 120 is located at a start end of the guide groove 113 of the left frame 112. In this case, the tip end portion 122*s* of the wedge plate 122 is located below the placing surface 102*a* of the placing table 102. Thereby, when placing the sheet bundle P on the placing table 102, it is possible to prevent a malfunction due to collision of the wedge plate 122 with the sheet bundle P.

When the staple removing device 1C is started, the first motor 152 is driven, as shown in FIGS. 23A and 23B. The drive force of the first motor 152 is transmitted to the pinion 158 via the gear 153*a* and the like. Along with this, the pinion 158 rotates in the clockwise direction, so that the rack 130 moves rearward from the front and the wedge plate 122 moves rearward from the front along the guide groove 313 of the left frame 112. The wedge plate 122 gradually moves in the direction toward the placing table 102 along the guide groove 313, and the tip end portion 122*s* protrudes from the placing table 102. In another embodiment 2, the tip end portion 122*s* of the wedge plate 122 protrudes from the placing surface 102*a* of the placing table 102 from the front of the removal position L2, and maintains the protruding state until passing through the removal position L2.

As described above, according to the third embodiment, as in the first embodiment, the tip end portion 122*s* of the wedge plate 122 is moved in the certain section in the state of protruding from the placing surface 102*a* of the placing table 102. Therefore, the tip end portion 122*s* of the wedge plate 122 can be securely inserted between the sheet bundle P and the crown portion Sa. Further, when the tip end portion 122*s* of the wedge plate 122 is at the standby position L1, the tip end portion 122*s* of the wedge plate 122 is located below the placing surface 102*a* of the placing table 102. Therefore, when setting the sheet bundle P on the placing table 102, it is possible to prevent the sheet or the crown portion Sa from being caught at the tip end portion 122*s* of the wedge plate 122.

Fourth Embodiment

Configuration Example of Staple Removing Device 1D

In a fourth embodiment, the mechanism for adjusting the height of the wedge plate 122 during movement is different from that of the first embodiment. Note that, since the other configurations and operations of a staple removing device 1D are common to those of the staple removing device 1A of the first embodiment, the detailed descriptions of the common parts are omitted.

Figure 24:
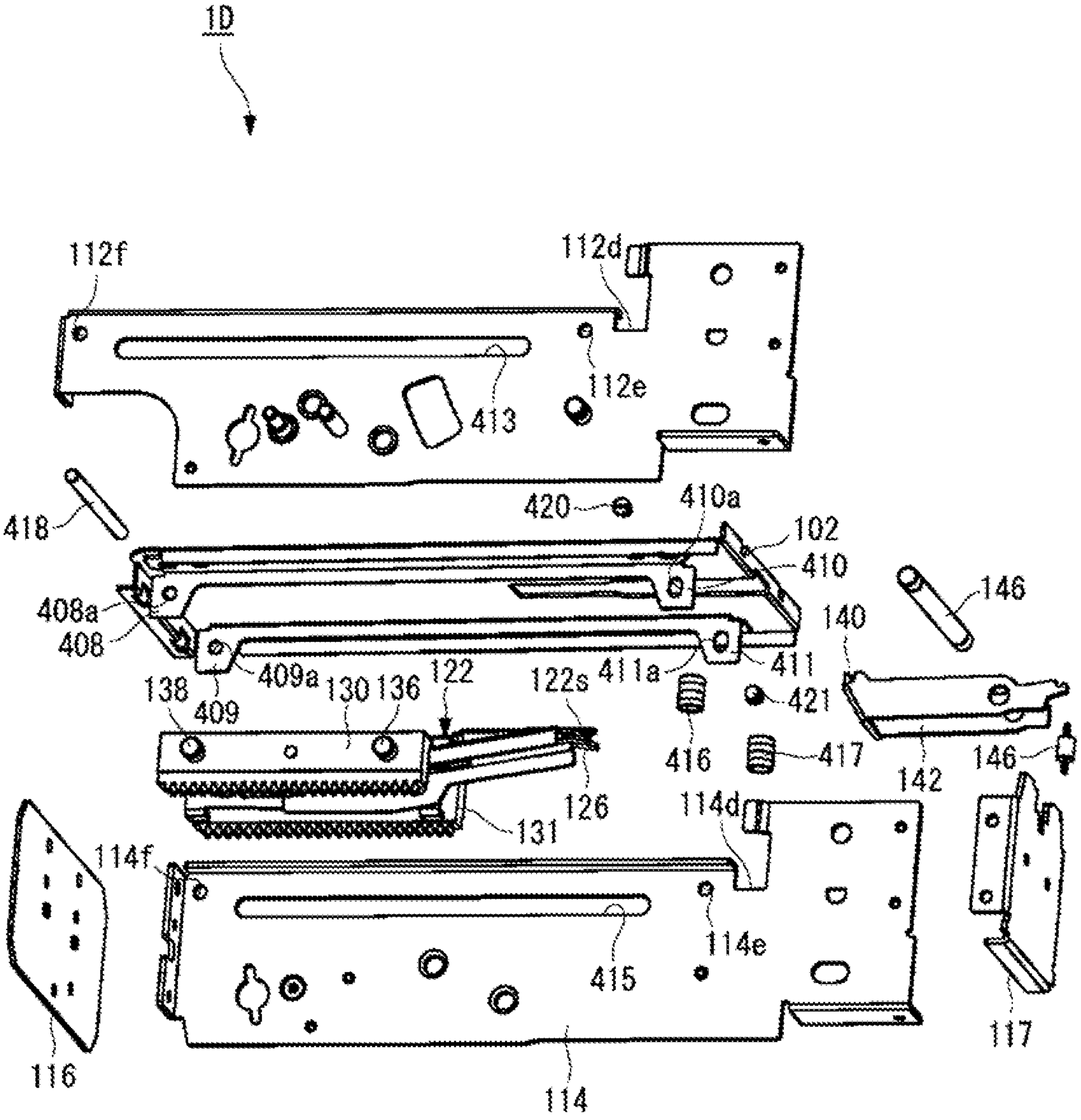
FIG. 24 is a side view of a staple removing device according to a fourth embodiment.

FIG. 24 is an exploded perspective view of the staple removing device 1D according to the fourth embodiment.

A lower surface on the rear end-side of the placing table 102 is provided with guide pin attaching portions 410 and 411 to which guide pins 420 and 421 are attached. The guide pin attaching portions 410 and 411 are arranged at a predetermined interval in the width direction, specifically, at substantially the same interval as that between the left frame 112 and the right frame 114. The guide pin attaching portion 410 is formed with an opening portion 410*a* for a pin, and the guide pin attaching portion 411 is formed with an opening portion 411*a* for a pin. The opening portions 410*a* and 411*a* for pins are configured by long holes each having a long axis extending in the upper and lower direction.

The lower surface on the rear end-side of the placing table 102 is provided with shaft attaching portions 408 and 409 through which a fulcrum shaft 418 is inserted. The shaft attaching portions 408 and 409 are arranged at a predetermined interval in the width direction, specifically, at substantially the same interval as that between the left frame 112 and the right frame 114. The shaft attaching portion 408 is formed with an opening portion 408*a* for a shaft, and the shaft attaching portion 409 is formed with an opening portion 409*a* for a shaft.

A concave portion 112*d* in which a placing table spring 416 is arranged is provided at a position facing the guide pin attaching portion 410 on the rear end-side of the left frame 112. A concave portion 114*d* in which a placing table spring 417 is arranged is provided at a position facing the guide pin attaching portion 411 on the rear end-side of the right frame 114. Note that, since the guide groove 413 formed in the left frame 112 and the guide groove 415 formed in the right frame 114 have the similar configurations and functions to the guide grooves 213 and 215 of the second embodiment, the detailed descriptions thereof are omitted.

The guide pin 420 is inserted from an outside into the opening portion 410*a* for a pin on the front end-side of the placing table 102, and is mounted to the opening portion 112*e* of the left frame 112 arranged inside the guide pin. The guide pin 421 is inserted from an outside into the opening portion 411*a* for a pin on the front end-side of the placing table 102, and is mounted to the opening portion 114*e* of the right frame 114 arranged inside the guide pin.

The placing table spring 416 is arranged between the concave portion 112*d* of the left frame 112 and the lower surface of the placing table 102. Similarly, the placing table spring 417 is arranged between the concave portion 114*d* of the right frame 114 and the lower surface of the placing table 102. Thereby, the placing table 102 is urged upward by the placing table springs 416 and 417, and is adapted to be movable in the upper and lower direction according to a pressing state of the sheet pressing plate 176.

The fulcrum shaft 418 is inserted in an opening portion 112*f* of the left frame 112, the opening portions 408*a* and 409*a* for shafts of the placing table 102, and an opening portion 114*f* of the right frame 114.

With such a configuration, the placing table 102 can move in the upper and lower direction along the opening portions 410*a* and 411*a* for pins on the rear end-side with the fulcrum shaft 418 on the front end-side as a fulcrum. That is, the placing table 102 relatively moves in the upper and lower direction relative to the tip end portion 122*s* of the wedge plate 122 with the fulcrum shaft 418 as a fulcrum within a range of the length of the long holes of the opening portions 410*a* and 411*a* for pins.

Operation Example of Staple Removing Device 1D

Figure 25A:
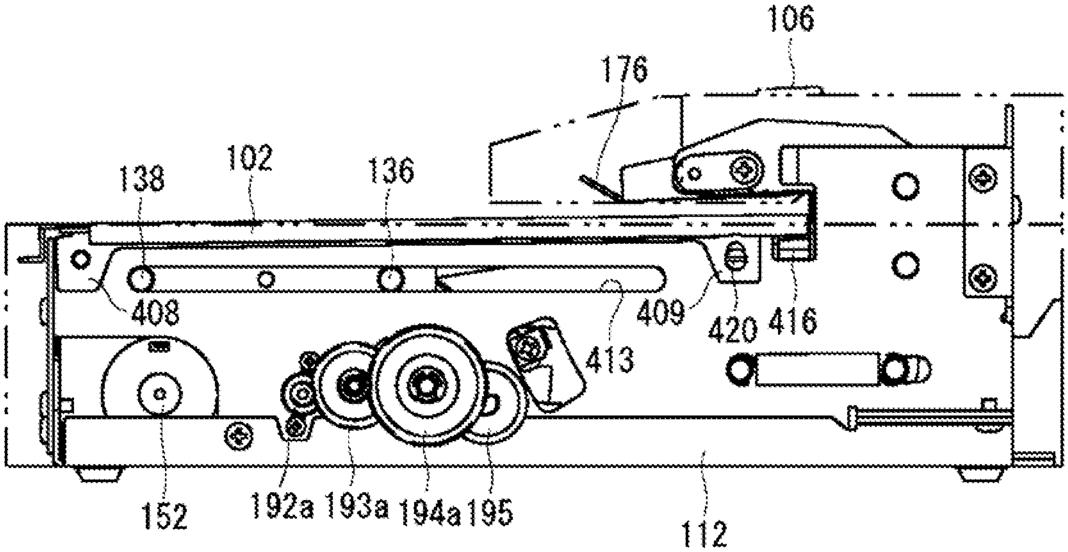
FIG. 25A illustrates an operation of the wedge plate of the staple removing device located at the standby position according to the fourth embodiment.
Figure 25B:
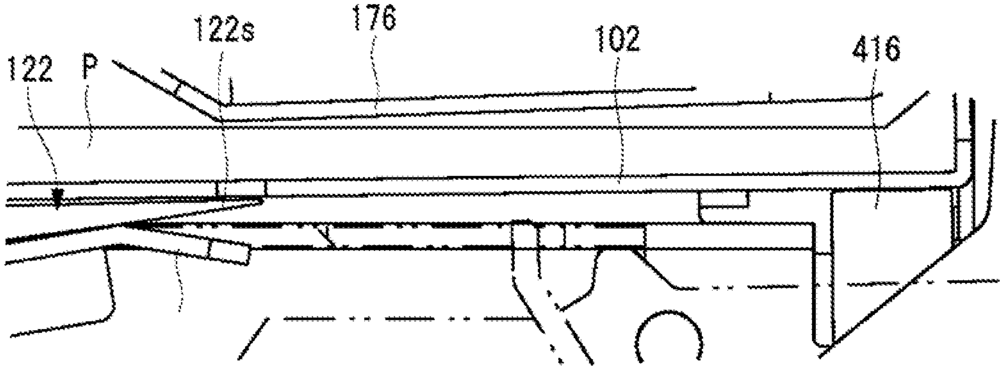
FIG. 25B is an enlarged view of main parts of the wedge plate and the placing table shown in FIG. 25A.
Figure 26A:
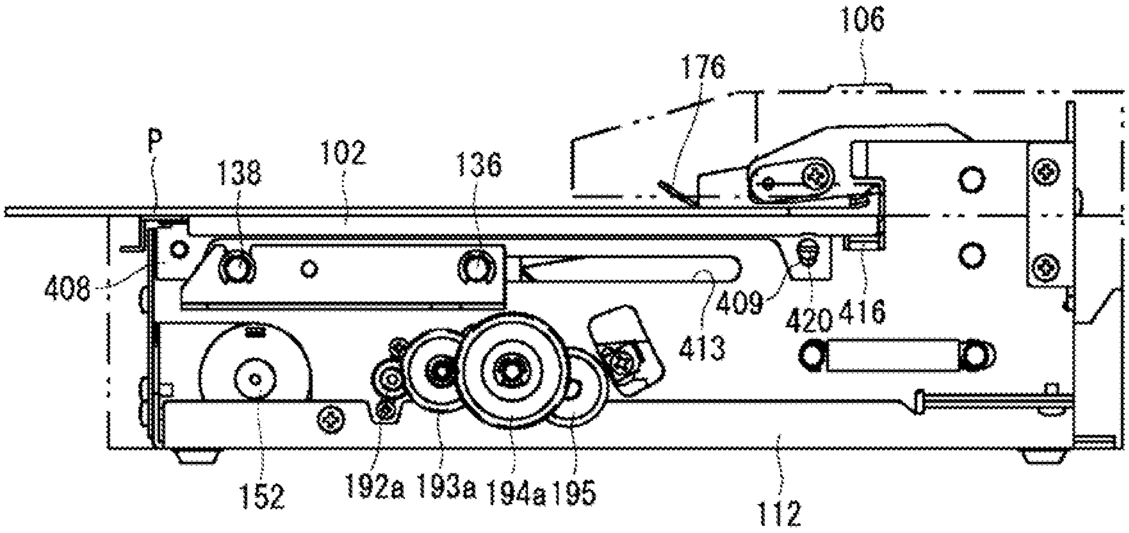
FIG. 26A illustrates an operation of the wedge plate of the staple removing device moving to the removal position according to the fourth embodiment.
Figure 26B:
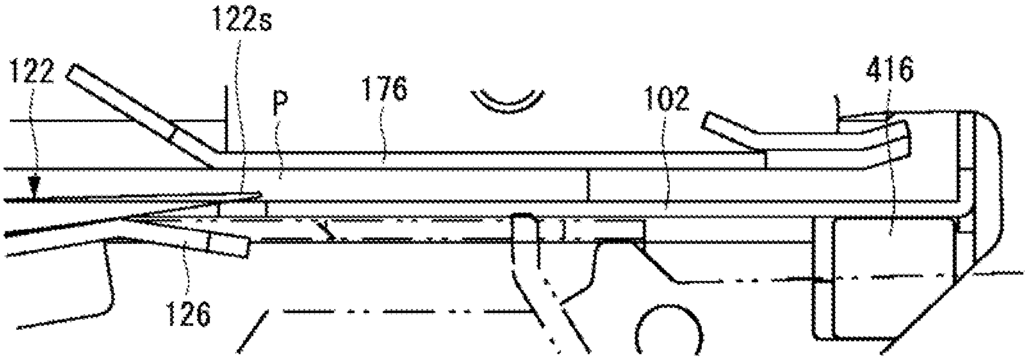
FIG. 26B is an enlarged view of main parts of the wedge plate and the placing table shown in FIG. 26A.

FIG. 25A illustrates an operation of the wedge plate 122 of the staple removing device 1D located at the standby position L1, and FIG. 25B is an enlarged view of main parts of the wedge plate 122 and the placing table 102 shown in FIG. 25A. FIG. 26A illustrates an operation of the wedge plate 122 of the staple removing device 1D moving to the removal position L2, and FIG. 26B is an enlarged view of main parts of the wedge plate 122 and the placing table 102 shown in FIG. 26A. In FIGS. 25A and 26A, only an operation on the right side of the staple removing device 1C is described. However, since an operation on the left side is also common to that on the right side, the detailed description thereof is omitted.

When the staple removing device 1D is at the standby position, as shown in FIG. 25A, the sheet pressing plate 176 of the sheet pressing mechanism 160 is stopped at the standby position at a certain interval from the placing table 102. As shown in FIG. 25B, since the placing table 102 is urged upward by the placing table spring 416, the tip end portion 122*s* of the wedge plate 122 is located below the placing table 102.

When the staple removing device 1D is started, as shown in FIG. 26A, the second motor 192 is driven, the sheet pressing plate 176 descends toward the placing table 102 via the gear 153*a* and the like, and the sheet bundle P on the pressing table 102 is pressed by the sheet pressing plate 176. Along with this, as shown in FIG. 26B, the placing table 102 is pressed by the sheet pressing plate 176 via the sheet bundle P, so that the placing table spring 416 is compressed and the placing table 102 is pushed down along the opening portion 410*a* for a pin (refer to FIG. 24), which is a long hole, and the like. Thereby, the tip end 122*s* of the wedge plate 122 protrudes from the placing surface 102*a* of the placing table 102. Note that, the placing table 102 comes into contact with flanges formed at the upper end portions of the left frame 112 and the right frame 114, and therefore, is restricted from moving downward. For this reason, it is possible to adjust the maximum amount of protrusion of the tip end portion 122*s* of the wedge plate 122 by adjusting the height of the flanges. In addition, spring coefficients and sizes of the placing table springs 416 and 417 may be adjusted.

As described above, according to the fourth embodiment, as in the first embodiment, the tip end portion 122*s* of the wedge plate 122 is moved in the certain section in the state of protruding from the placing surface 102*a* of the placing table 102. Therefore, the tip end portion 122*s* of the wedge plate 122 can be securely inserted between the sheet bundle P and the crown portion Sa. Further, when the tip end portion 122*s* of the wedge plate 122 is at the standby position L1, the tip end portion 122*s* of the wedge plate 122 is located below the placing surface 102*a* of the placing table 102. Therefore, when setting the sheet bundle P on the placing table 102, it is possible to prevent the sheet or the crown portion Sa from being caught at the tip end portion 122*s* of the wedge plate 122.

Modified Embodiment 1-1

A staple removing device 1E according to a modified embodiment 1-1 is different from the embodiments shown in FIG. 1A and the like, in that a crown support part 500 for supporting the crown portion Sa between the crown support part and a wedge plate 122E when removing the staple S is provided. Note that, the constitutional elements, which are substantially the same as those of the staple removing device 1A and the like, are denoted with the same reference signs, and the overlapping descriptions are omitted.

Configuration Example of Staple Removing Device 1E

Figure 27A:
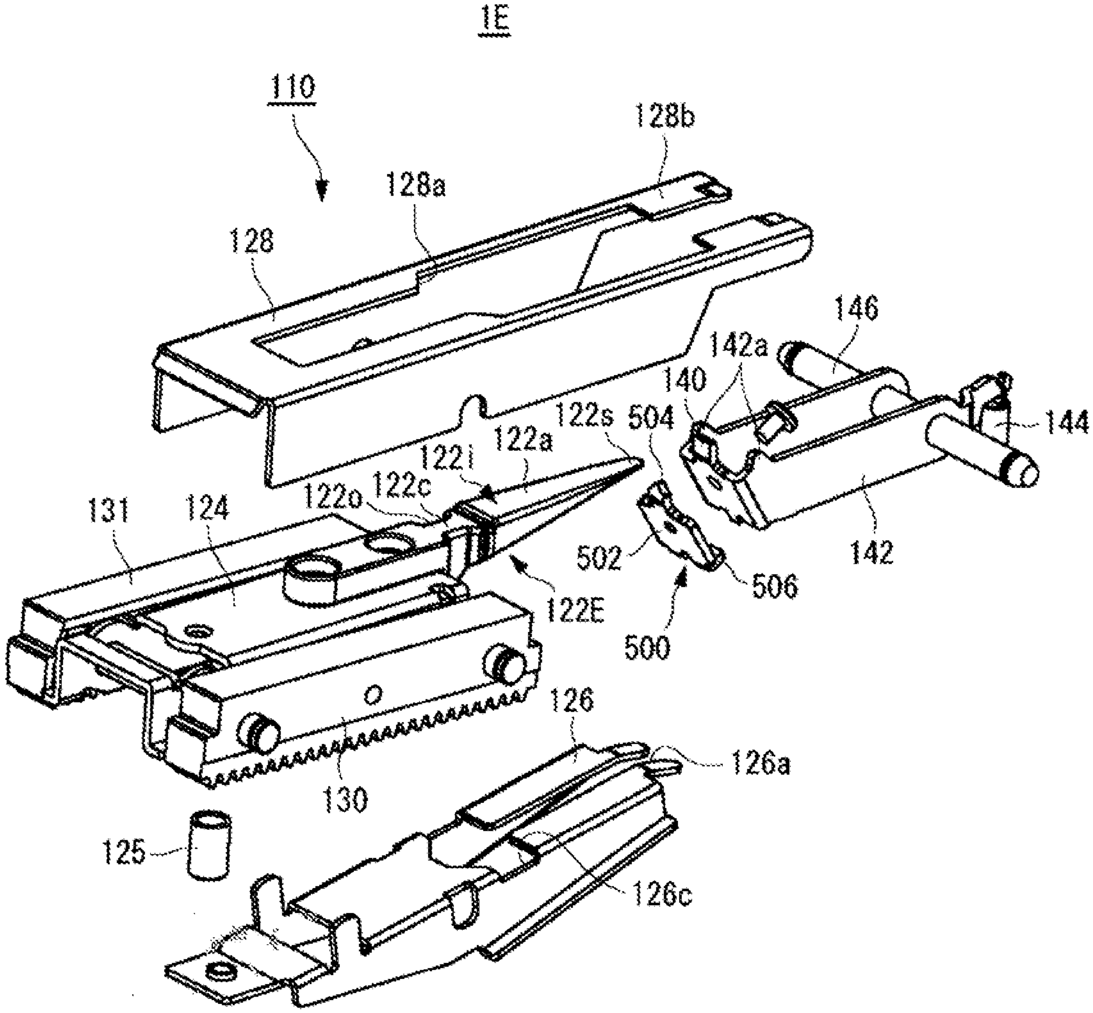
FIG. 27A is an exploded perspective view of a staple removing device according to a modified embodiment 1-1.
Figure 27B:
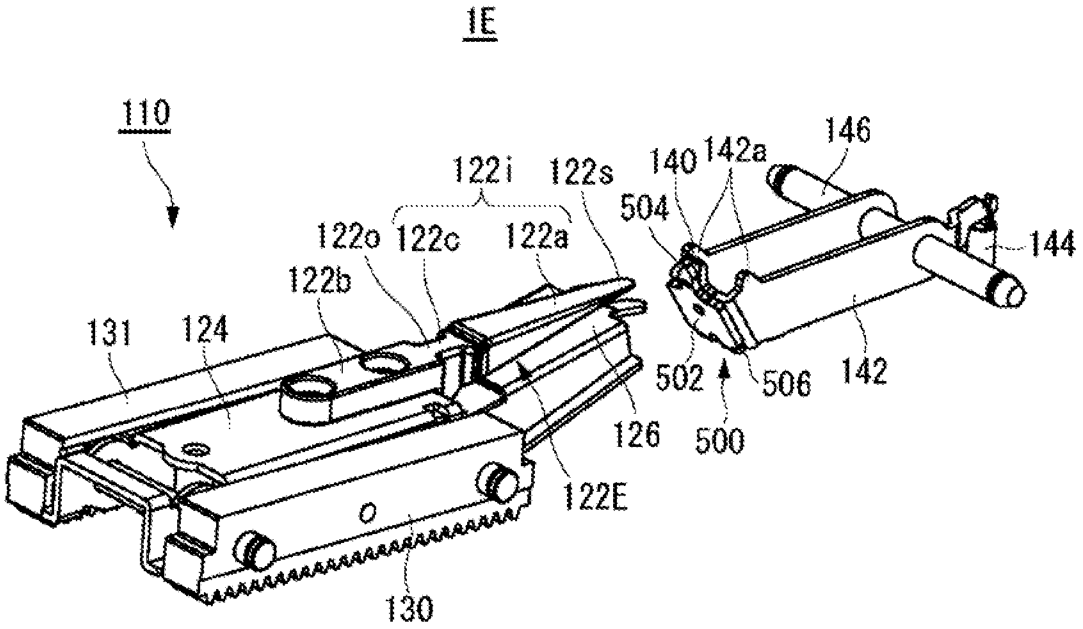
FIG. 27B is a perspective view of the staple removing device according to the modified embodiment 1-1.
Figure 28:
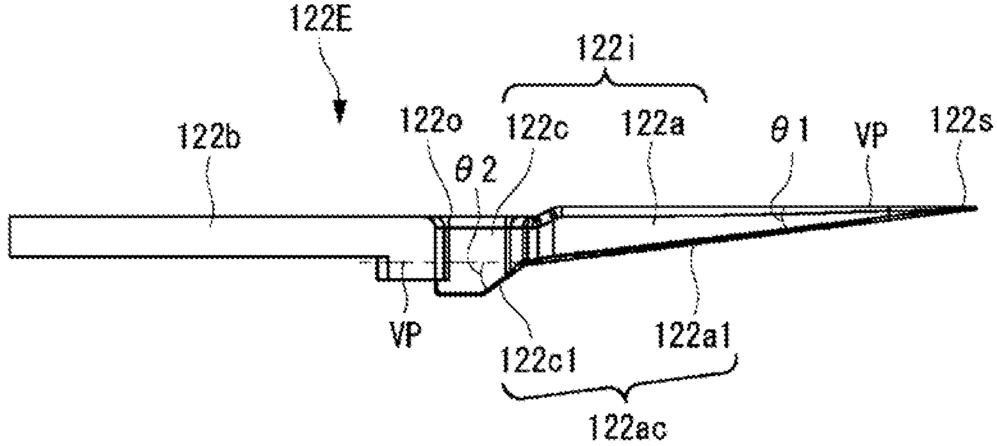
FIG. 28 is a side view of a wedge plate according to the modified embodiment 1-1.
Figure 29A:
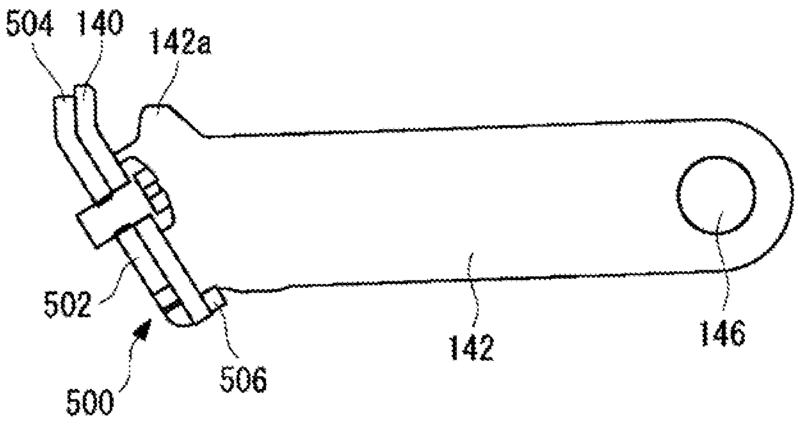
FIG. 29A is a side view of a crown support part and a pressing portion according to the modified embodiment 1-1.
Figure 29B:
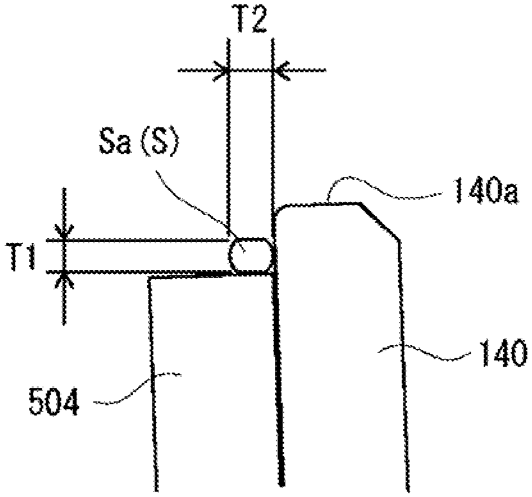
FIG. 29B illustrates a state of supporting the crown portion by the crown support part and the pressing portion according to the modified embodiment 1-1.

FIG. 27A is an exploded perspective view of the staple removing device 1E according to the modified embodiment 1-1, and FIG. 27B is a perspective view of the staple removing device 1E. FIG. 28 is a side view of a wedge plate 122E according to the modified embodiment 1-1. FIG. 29A is a side view of the crown support part 500 and the pressing portion 140 according to the modified embodiment 1-1, and FIG. 29B illustrates a state of supporting the crown portion Sa by the crown support part 500 and the pressing portion 140.

Figure 30A:
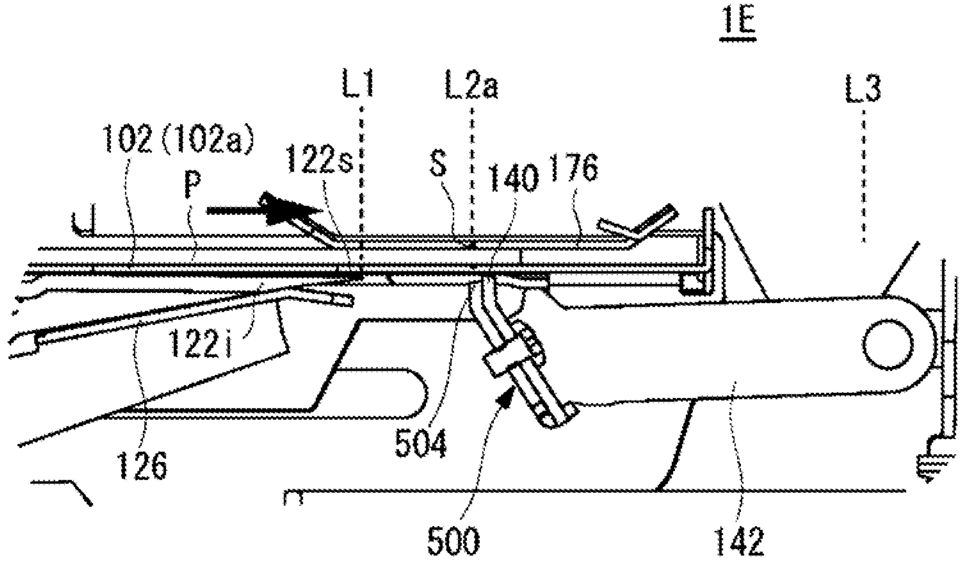
FIG. 30A is a side view showing an operation of the staple removing device when removing the staple from the sheet bundle according to the modified embodiment 1-1.

As shown in FIGS. 27A, 30A and the like, the staple removing device 1E includes the placing table 102 (refer to FIG. 1A) on which the sheet bundle P bound by the staple S including the crown portion Sa and the pair of leg portions Sb can be placed with the crown portion Sa facing downward; an inclined part 122*i* having the tip end portion 122*s* capable of moving from the standby position (first position) L1 to a removal completion position (third position) L3 via a removal start position (second position) L2*a* along the placing table 102, and configured to be inserted between the sheet bundle P and the staple S when the tip end portion moves from the standby position L1 to the removal start position L2*a*, and to start pullout of the staple S when the tip end portion further moves from the removal start position L2*a* toward the removal completion position L3; the pressing portion (restriction portion) 140 configured to restrict the staple S from moving toward the removal completion position L3 together with the inclined part 122*i* by contacting, from the removal completion position L3-side, the crown portion Sa of the staple S pulled out from the sheet bundle P by the inclined part 122*i* and engaged (caught, wound) to the inclined part 122*i*; and the crown support part 500 located below the crown portion Sa of the staple S while the pressing portion 140 restricts movement of the staple S.

In the modified embodiment 1-1, the standby position L1 is a position of the tip end portion 122*s* at an initial position where the inclined part 122*i* is stopped before starting a removing operation. The removal start position L2*a* is a position where the tip end portion 122*s* of the inclined part 122*i* is inserted between the sheet bundle P on the placing table 102 and the staple S (crown portion Sa), in other words, a position of the staple S (crown portion Sa) of the sheet bundle P placed on the placing table 102. The removal completion position L3 is a position of the tip end portion 122*s* of the inclined part 122*i* at a time when the staple S is completely removed from the sheet bundle P by the inclined part 122*i* (the staple S is completely separated from the sheet bundle P).

As shown in FIGS. 27A and 28, the wedge plate 122E has the inclined part 122*i* and the attaching portion 122*b*. The inclined part 122*i* has a wedge plate main body 122*a* and a narrowed portion 122*c*, includes a base end portion 122*o* and a tip end portion 122*s*, and has an inclined surface 122*ac* inclined so that a thickness becomes thinner from the base end portion 122*o* to the tip end portion 122*s*. The inclined surface 122*ac* has a first inclined surface 122*a*1 and a second inclined surface 122*c*1. The inclined part 122*i* is located between the removal start position L2*a* and the removal completion position L3, and is configured to face the inclined surface 122*ac* while the tip end portion 122*s* moves from the removal start position L2*a* to the removal completion position L3. The first inclined surface 122*a*1 is a surface inclined at an angle θ1 with respect to a virtual plane (horizontal plane) VP parallel to an upper surface of the wedge plate main body 122*a*. The second inclined surface 122*c*1 is a surface inclined at an angle θ2 with respect to the virtual plane (horizontal plane) VP parallel to the upper surface of the wedge plate main body 122*a*. Note that, the first inclined surface 122*a*1 and the second inclined surface 122*c*1 are each constituted by a continuous surface, but are not necessarily limited to the continuous surfaces. For example, the inclined surfaces may also be each constituted by an intermittent surface, specifically, a plurality of inclined surfaces having different angles.

Here, the second inclined surface 122*c*1 of the narrowed portion 122*c* with respect to the virtual plane VP is larger than the first inclined surface 122*a*1 of the wedge plate main body 122*a* with respect to the virtual plane VP. In other words, the angle θ2 formed between the virtual plane VP and the second inclined surface 122*c*1 is configured to be larger than the angle θ1 formed between the virtual plane VP and the first inclined surface 122*a*1 of the wedge plate main body 122*a*.

The reason is described, as follows. Since a large load is applied to the wedge plate main body 122*a* until the leg portions Sb of the staple S are raised and the staple S is pulled out from the sheet bundle P, the angle θ1 of the first inclined surface 122*a*1 of the wedge plate main body 122*a* is set small and long in the front and rear direction. On the other hand, in the narrowed portion 122*c*, the leg portions Sb of the staple S are in a state of being completely or almost pulled out from the sheet bundle P, and the load applied to the narrowed portion 122*c* is small. Therefore, the angle θ2 of the first inclined surface 122*a*1 of the narrowed portion 122*c* is set large and short in the front and rear direction.

In the meantime, in the inclined part 122*i* shown in FIG. 28, the first inclined surface 122*a*1 and the second inclined surface 122*c*1 are configured to have different inclination angles. Therefore, as shown in FIG. 27A, the first inclined surface 122*a*1 has such a configuration that the crown portion Sa is supported by the linear crown holder 126 arranged to follow the first inclined surface 122*a*1. However, since the second inclined surface 122*c*1 has an inclination angle different from the first inclined surface 122*a*1, the crown portion Sa cannot be supported by the crown holder 126 on the second inclined surface 122*c*1. That is, at a portion of the crown holder 126 corresponding to the second inclined surface 122*c*1, the second inclined surface 122*c*1 protrudes further downward than the first inclined surface 122*a*1, and therefore, it is necessary to provide an opening portion 126*c* for avoiding the same. For this reason, in the opening portion 126*c* where there is no support of the crown holder 126, a posture of the staple S pulled out from the sheet bundle P becomes unstable (for example, the staple may rotate), and the staple S may be scattered in the staple removing device 1E without dropping into the accommodation part 200. In addition, the staple S may remain in a state of being caught at the inclined part 122*i*. Therefore, in another embodiment 4, the crown support part 500 is provided so that the staple can maintain a stable posture on the inclined part 122*i* until the staple S pulled out from the sheet bundle P drops into the accommodation part 200.

As shown in FIGS. 27A, 27B and 29A, the crown support part 500 is arranged at a position adjacent to the removal start position L2*a*-side (a left side in FIG. 30A) with respect to the pressing portion 140, and is configured to be able to support the crown portion Sa of the staple S from the lower side. The crown support part 500 has an attaching portion 502 fixed to the pressing portion 140 and a support portion 504 capable of contacting the crown portion Sa of the staple S.

The attaching portion 502 is constituted by a flat plate having a substantially rectangular shape in plan view, and is attached to a front surface of the pressing portion 140 on the removal start position L2*a*-side by a screw or the like. Note that, in the present embodiment, the attaching portion 502 is attached in contact with the pressing portion 140. However, the present invention is not limited thereto. For example, the attaching portion 502 may be arranged spaced from the pressing portion 140 if a gap is less than the thickness of the crown portion Sa (a diameter of the staple S).

The support portion 504 protrudes in a convex shape from an upper end portion of the attaching portion 502 toward the wedge plate 122E, and a tip end-side thereof is configured to have a tapered shape. By forming the tip end-side of the support portion 504 into a tapered shape, the staple can be supported in a state where the tip end-side is butted against the crown portion Sa, so that the posture of the staple S can be stabilized. In addition to the tapered shape, as the shape of the tip end-side of the support portion 504, for example, a configuration where a plurality of tapered shapes is provided along the longitudinal direction of the crown portion Sa may be possible or an arc shape or a rectangular shape may also be possible. Further, the support portion 504 may be arranged at a predetermined interval from the crown portion Sa while the pressing portion 140 restricts the staple S from moving toward the removal completion position L3 as the inclined part 122*i* is advanced. That is, when the posture of the staple S during the removing operation is unstable, for example, when only one leg portion Sb of the staple S caught at the inclined part 122*i* comes off and the staple S rotates, the tip end-side of the support portion 504 may be configured to butt against the crown portion Sa, thereby stabilizing the posture of the staple S. Note that, the predetermined interval is an interval at which at least the tip end-side of the support portion 504 can contact and support the crown portion Sa even when the staple S caught at the inclined part 122*i* is in an unstable posture.

As shown in FIG. 29B, the tip end portion of the support portion 504 is formed at a position lower than a tip end surface 140*a* of the pressing portion 140 at least by a thickness T1 of the crown portion Sa so as to be able to support the crown portion Sa between the support portion and the inclined part 122*i* and to restrict the crown portion Sa, which tends to move toward the removal completion position L3, on the front surface of the pressing portion 140. In addition, a length of the support portion 504 in the front and rear direction is configured by the thickness T2 or greater of the crown portion Sa. With such a configuration, the crown portion Sa can be securely supported at the time of removing the staple S by the tip end-side of the support portion 504 of the crown support part 500, the front surface of the pressing portion 140, and the lower surface (first inclined surface 122*a*1) of the inclined part 122*i*. Note that, the length of the support portion 504 in the front and rear direction is not limited to the thickness T2 or greater of the crown portion Sa, and may also be less than the thickness T2 of the crown portion Sa as long as a part of the crown portion Sa can be supported.

A lower end portion of the attaching portion 502 is provided with a position restriction portion 506 protruding toward the pressing portion 140. The position restriction portion 506 is configured to engage with a lower end portion of the pressing portion 140, and to function as a positioning portion when attaching the attaching portion 502 and the support portion 504 to the pressing portion 140.

Figure 29C:
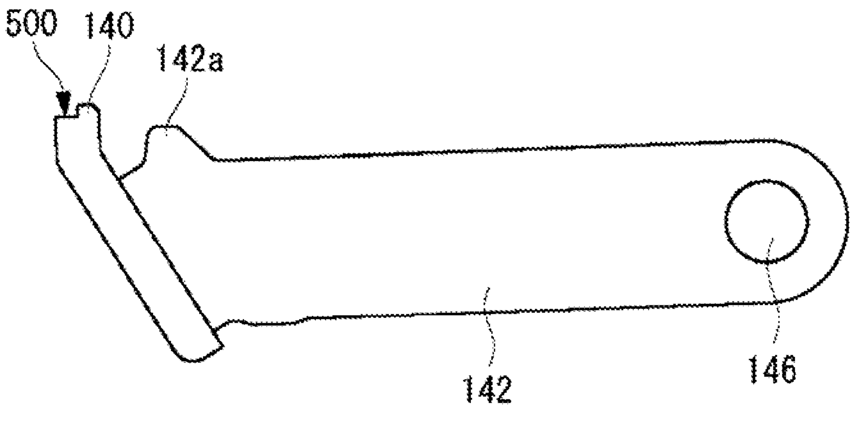
FIG. 29C is a side view in a case where the crown support part and the pressing portion according to the modified embodiment 1-1 are configured by one component.

Note that, in the present modified embodiment, the example in which the crown support part 500 and the pressing portion 140 are configured as separate members has been described. However, the present invention is not limited thereto. For example, the crown support part 500 and the pressing portion 140 may also be configured as one component (integral). FIG. 29C is a side view in a case where the crown support part 500 and the pressing portion 140 are configured by one component. As shown in FIG. 29C, the upper end-side of the pressing portion 140 is cut out so as to be a tapered shape shown in FIG. 27A, for example, and therefore, can be caused to function as the crown support part 500 for supporting the crown portion Sa.

Operation Example of Staple Removing Device 1E

Next, an operation of the staple removing device 1E that is performed when pulling out the staple S from the sheet bundle P is described. FIGS. 30A to 30F are side views showing the operation of the staple removing device 1E that is performed when pulling out the staple S from the sheet bundle P.

When the user places the sheet bundle P on the placing table 102 and pushes the start switch 106 (refer to FIG. 1A) of the staple removing device 1E, the sheet bundle P is pressed by the sheet pressing plate 176 and the sheet bundle P is pressed against the placing table 102, as shown in FIG. 30A.

Figure 30B:
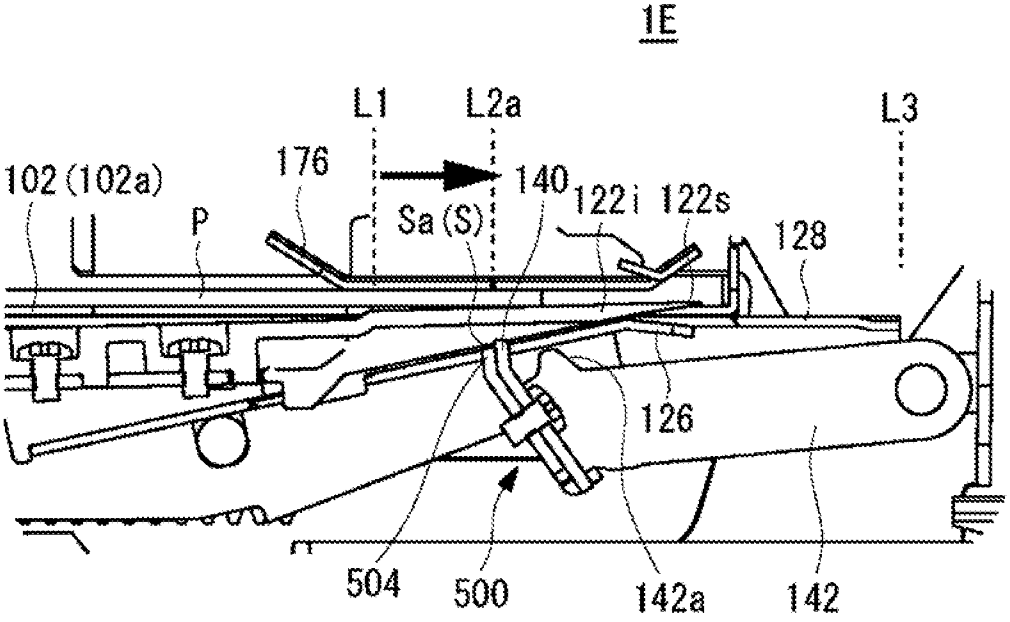
FIG. 30B is a side view showing the operation of the staple removing device when removing the staple from the sheet bundle according to the modified embodiment 1-1.

Subsequently, as shown in FIG. 30B, when the wedge plate 122E including the inclined part 122*i* moves from the standby position L1 toward the removal start position L2*a*, the upper surface of the tip end portion 122*s* comes into contact with the back surface of the lowermost sheet of the sheet bundle P and moves rearward from the front in a state of pressing against the sheet bundle P, so that the tip end portion 122*s* is pushed between the crown portion Sa and the sheet bundle P.

Further, when the inclined part 122*i* moves from the removal start position L2*a* toward the removal completion position L3, the pullout of the staple S from the sheet bundle P is started. Thereby, as the inclined part 122*i* advances, the leg portions Sb of the staple S gradually rise with respect to the uppermost surface of the sheet bundle P. Further, as shown in FIG. 30B, the convex portion 142*a* of the pressing holder 142 separates from the holder 128, and the pressing portion 140 and the crown support part 500 are urged toward the inclined part 122*i* (upper) by the tension spring 144 (refer to FIG. 27A). The pressing portion 140 comes into contact with a surface on the removal completion position L3-side of the crown portion Sa moving rearward from the front by the pushing force of the inclined part 122*i*, and restricts the staple S from moving toward the rear removal completion position L3 together with the wedge plate main body 122*a*. That is, during the removing operation, the pressing portion 140 presses the crown portion Sa from the removal completion position L3-side so that the staple S does not move from the removal start position L2*a* toward the removal completion position L3 by a sliding operation of the wedge plate main body 122*a* inserted between the staple S and the sheet bundle P. Further, in the present modified embodiment, the support portion 504 of the crown support part 500 butts against the lower surface of the crown portion Sa, so that the posture stability of the staple S is ensured.

Figure 30C:
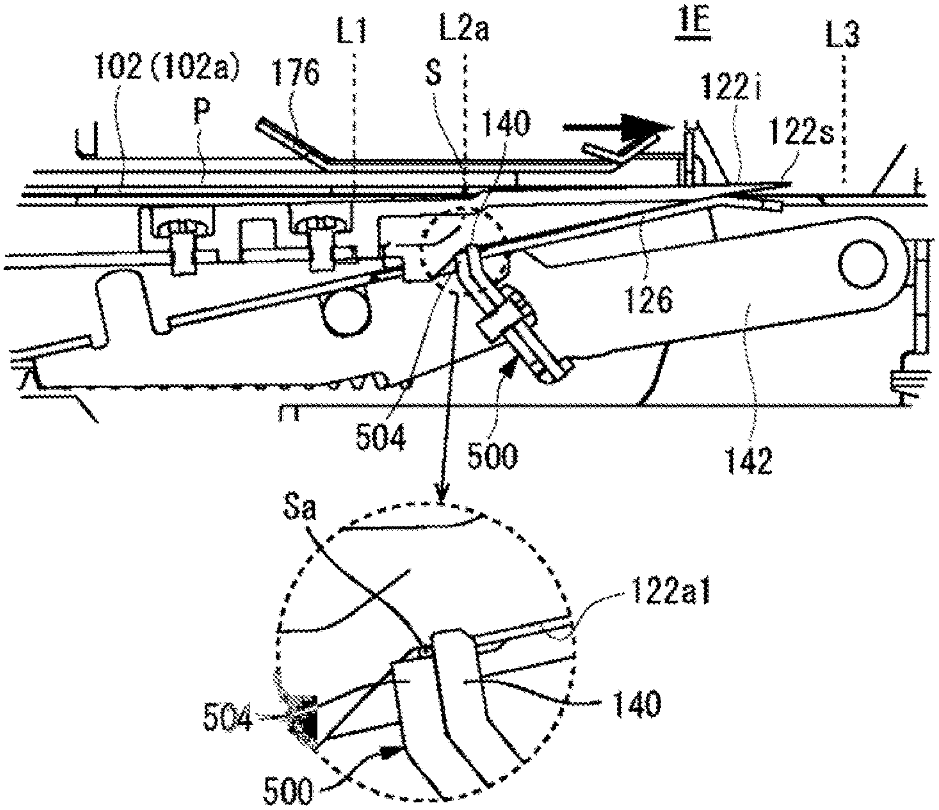
FIG. 30C is a side view showing the operation of the staple removing device when removing the staple from the sheet bundle according to the modified embodiment 1-1.

When the thickness of the inclined part 122*i* including the first inclined surface 122*a*1 inserted between the sheet bundle P and the crown portion Sa becomes thicker with the advance of the wedge plate 122E, the pressing portion 140 and the crown support part 500 are moved down by the tension spring 144, following the thickness direction of the inclined part 122*i* in a state of being in contact with the inclined part 122*i* and the crown portion Sa, as shown in FIG. 30C. In this case, the crown portion Sa is supported by the support portion 504 of the crown support part 500 and the pressing portion 140.

Figure 30D:
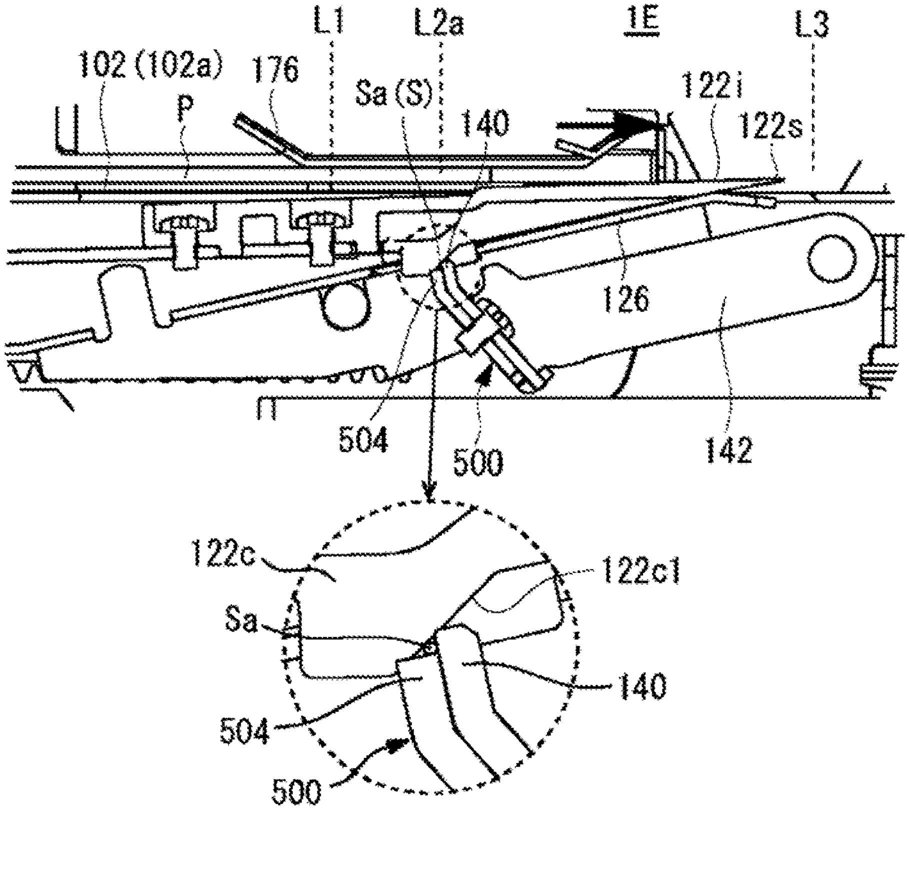
FIG. 30D is a side view showing the operation of the staple removing device when removing the staple from the sheet bundle according to the modified embodiment 1-1.

As shown in FIG. 30D, when the staple S is located on the second inclined surface 122*c*1 of the inclined part 122*i*, the staple S is not supported any more by the crown holder 126, but the supported state of the crown portion Sa by the support portion 504 of the crown support part 500 and the pressing portion 140 is maintained, and tilting, rotation and the like of the staple S are prevented.

Figure 30E:
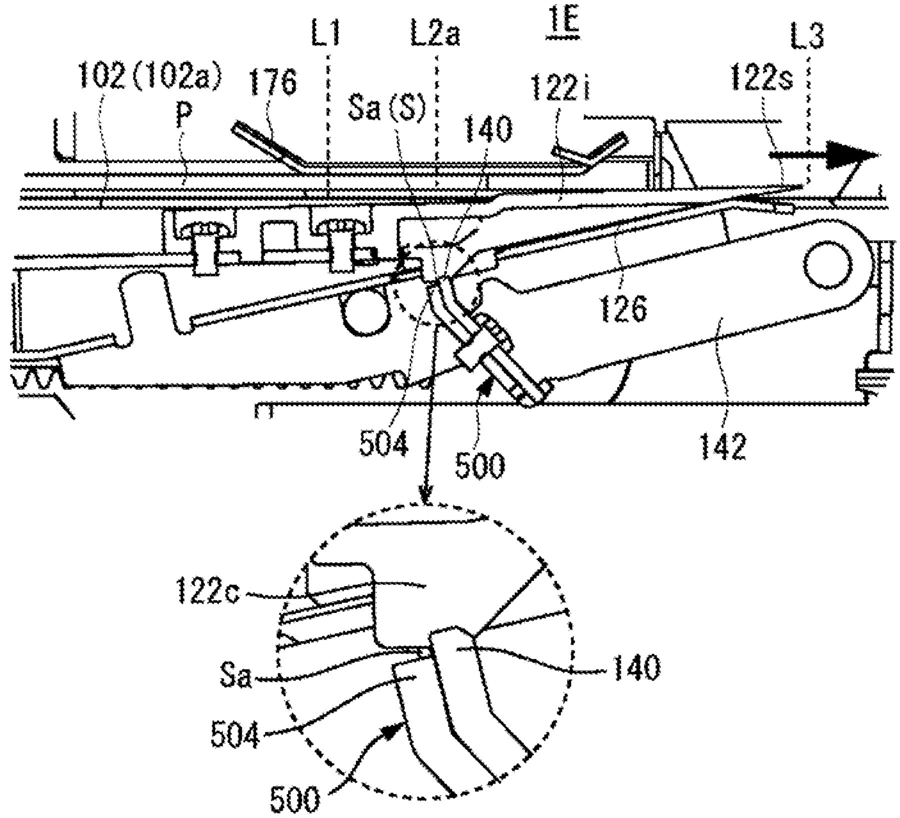
FIG. 30E is a side view showing the operation of the staple removing device when removing the staple from the sheet bundle according to the modified embodiment 1-1.

As shown in FIG. 30E, when the tip end portion 122*s* moves to the removal completion position L3 with the advance of the wedge plate 122E and the staple S is located at the narrowed portion 122*c*, which is the thickest portion of the inclined part 122*i*, the staple S is not supported any more by the crown holder 126, as in the inclined surface 122*c*1, but the crown portion Sa is supported by the support portion 504 of the crown support part 500 and the pressing portion 140 and the posture stability of the staple S is ensured.

Figure 30F:
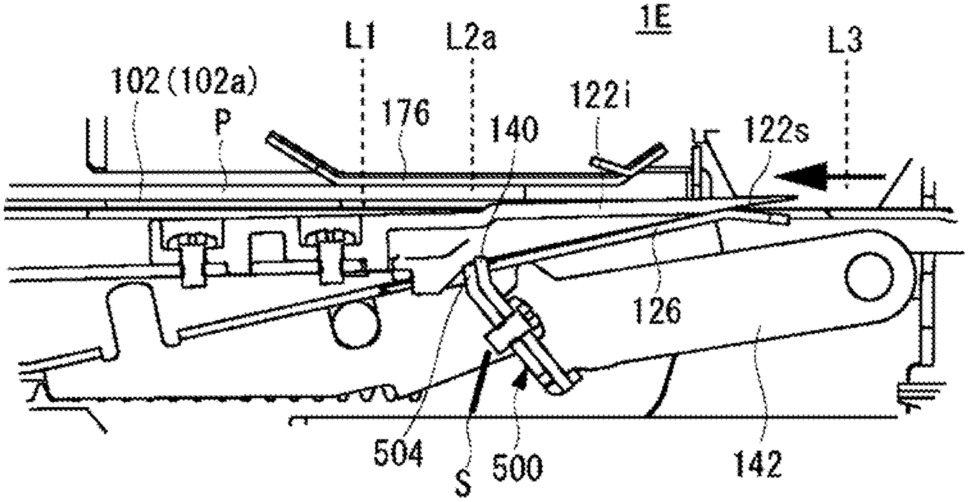
FIG. 30F is a side view showing the operation of the staple removing device when removing the staple from the sheet bundle according to the modified embodiment 1-1.

Finally, the wedge plate 122E including the inclined part 122*i* moves forward from the rear of the removal completion position L3 along the placing table 102 and returns to the standby position L1. As shown in FIG. 30F, the staple S moves forward with respect to the crown support part 500 with the retreat of the inclined part 122*i*, so that the crown portion Sa is released from the support of the support portion 504. Thereby, the staple S drops into the accommodation part 200.

According to the modification 1-1, since the crown portion Sa of the staple S can be supported by the crown support part 500 until just before the staple S drops, the posture stability of the staple S can be ensured until just before the staple S is dropped. Thereby, the staple S can be securely dropped into the accommodation part 200, so that the staple S can be prevented from being scattered into the staple removing device 1E.

Modified Embodiment 1-2

A staple removing device 1F according to a modified embodiment 1-2 is different from the embodiments shown in FIG. 1A and the like, in that a staple contact portion 600 for pulling and peeling off, from the inclined part 122*i*, the staple S remaining on the inclined part 122*i* of the wedge plate 122E when removing the staple S from the sheet bundle P is provided. Note that, the constitutional elements, which are substantially the same as those of the staple removing device 1A and the like, are denoted with the same reference signs, and the overlapping descriptions are omitted. In addition, in the modified embodiment 1-2, since the wedge plate 122E described in the modified embodiment 1-1 is used, the constitutional elements common to the modified embodiment 1-1 are denoted with the same reference signs and the overlapping descriptions thereof are omitted.

Configuration Example of Staple Removing Device 1F

Figure 31A:
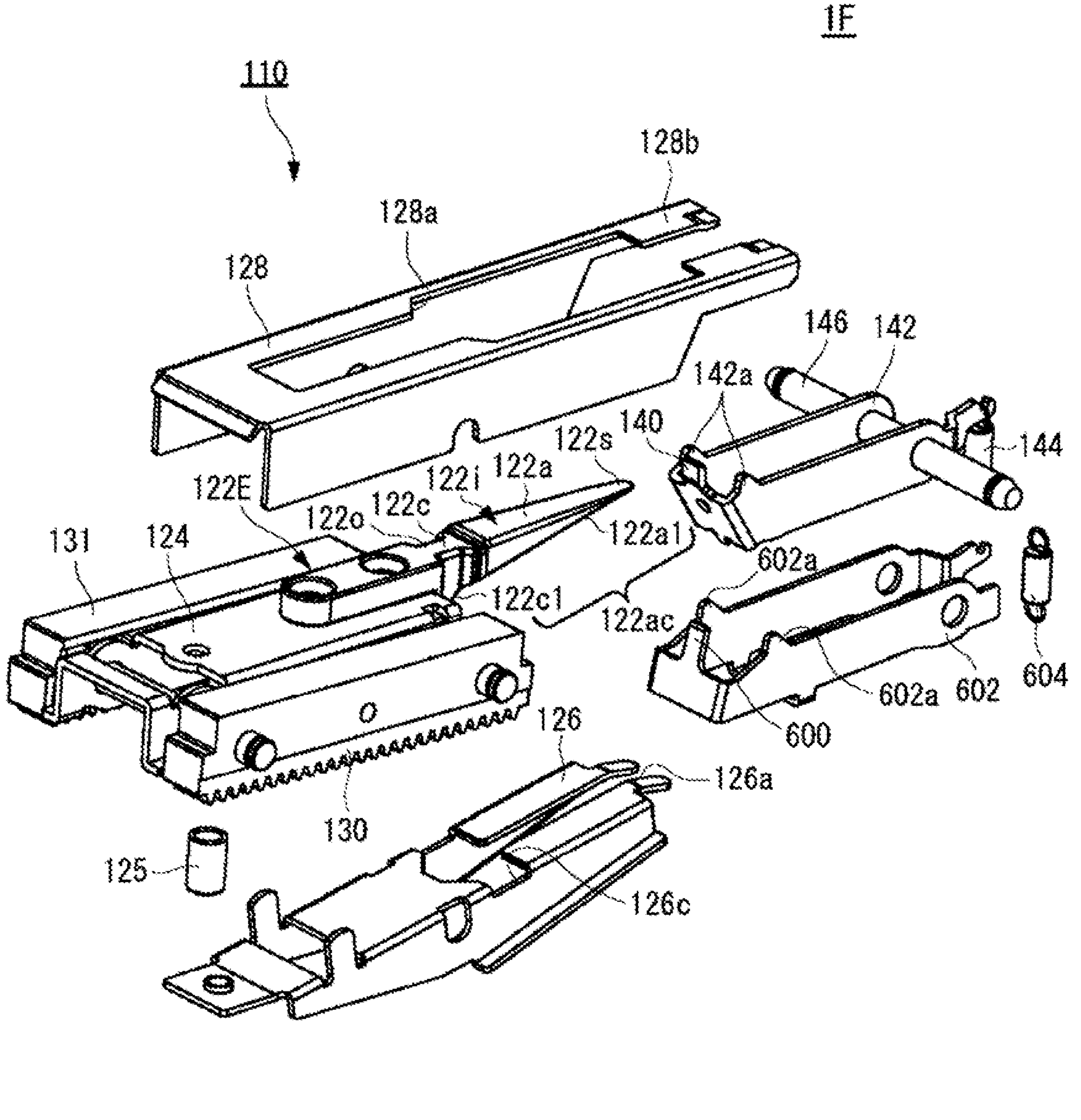
FIG. 31A is an exploded perspective view of a staple removing device according to a modified embodiment 1-2.
Figure 31B:
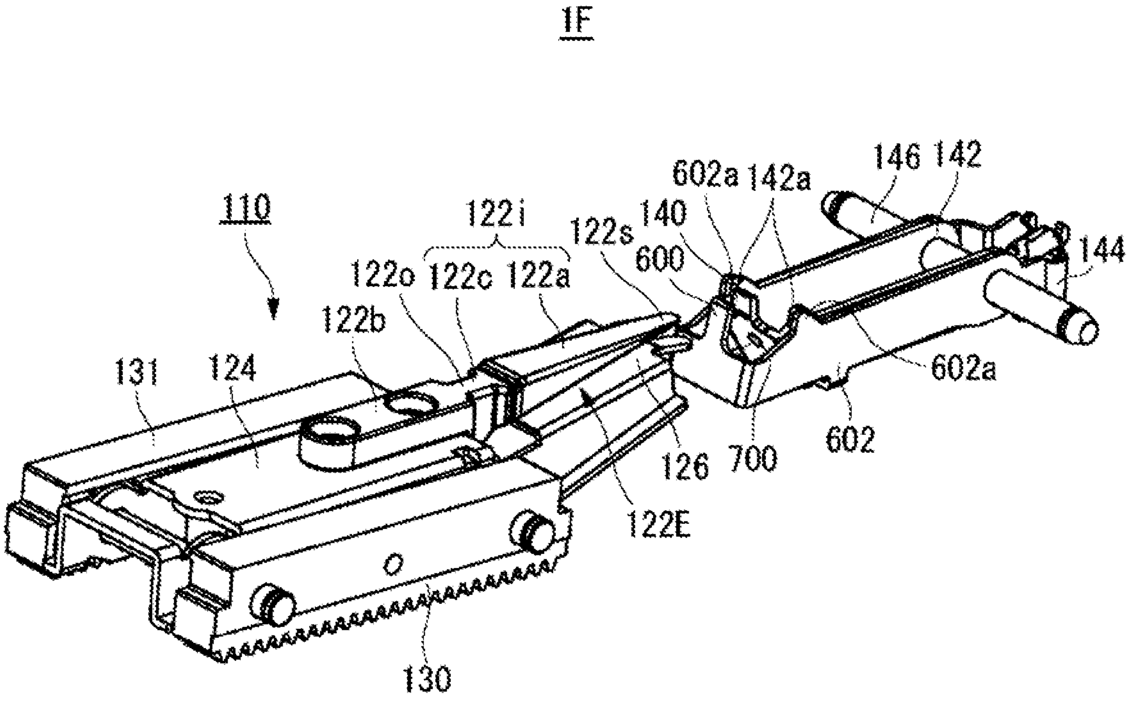
FIG. 31B is a perspective view of the staple removing device according to the modified embodiment 1-2.
Figure 32:
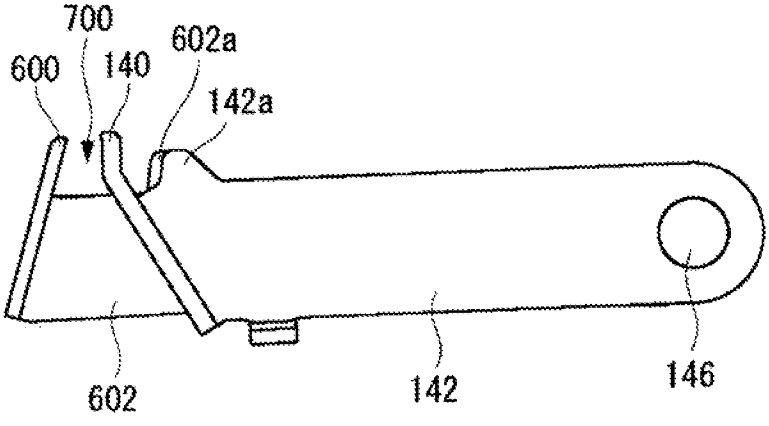
FIG. 32 is a side view of a pulling and peeling part and a pressing portion according to the modified embodiment 1-2.

FIG. 31A is an exploded perspective view of the staple removing device 1F according to the modified embodiment 1-2, and FIG. 31B is a perspective view of the staple removing device 1F. FIG. 32 is a side view of the staple contact portion 600 (contact portion) and the pressing portion 140 according to the modified embodiment 1-2.

Figure 33A:
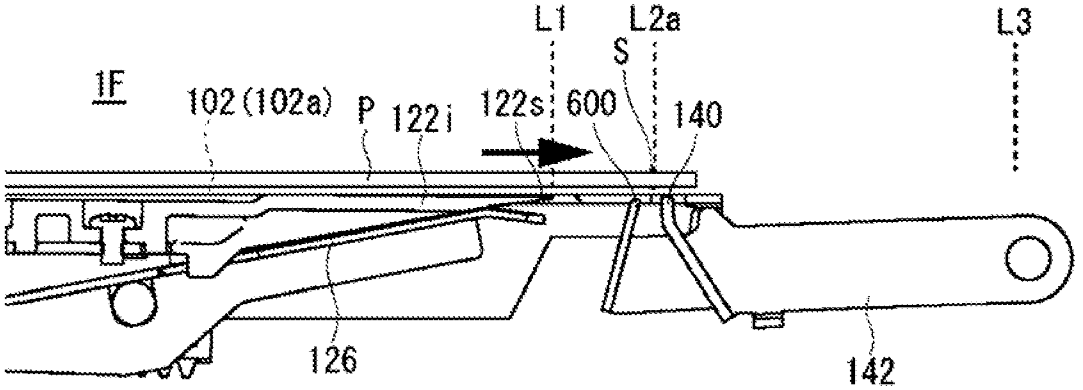
FIG. 33A is a side view showing an operation of the staple removing device when removing the staple from the sheet bundle according to the modified embodiment 1-2.

As shown in FIGS. 31A, 33A and the like, the staple removing device 1F includes the placing table 102 on which the sheet bundle P bound by the staple S including the crown portion Sa and the pair of leg portions Sb is placed; the inclined part 122*i* including the wedge plate main body 122*a* having the tip end portion 122*s* capable of moving between the standby position (first position) L1 and the removal completion position (third position) L3 via the removal start position (second position) L2*a* along the placing table 102, and configured to be inserted between the sheet bundle P and the staple S when the tip end portion 122*s* moves from the standby position L1 to the removal start position L2*a* and to start pullout of the staple S from the sheet bundle P when the tip end portion further moves from the removal start position L2*a* toward the removal completion position L3; and a staple contact portion 600 located between the standby position L1 and the removal start position L2*a*, and configured to face the first inclined surface 122*a*1 and to contact, from the standby position L1-side, the crown portion Sa of the staple S pulled out from the sheet bundle P by the inclined part 122*i* and engaged to the inclined part 122*i*, while the tip end portion 122*s* moves from the removal completion position L3 to the removal start position L2*a*.

In addition, the staple removing device 1F includes a holding member (holding part) 602 configured to movably support the staple contact portion 600 so as to keep the staple contact portion 600 at a distance within a predetermined value from the first inclined surface 122*a*1 and the second inclined surface 122*c*1, while the tip end portion 122*s* moves from the removal completion position L3 to the removal start position L2*a*. Further, the staple removing device 1F includes the pressing portion (restriction portion) 140 located between the removal start position L2*a* and the removal completion position L3, and configured to face the inclined surface 122*ac*, and to restrict the staple S from moving in the direction of the removal completion position L3 together with the inclined part 122*i* by contacting, from the removal completion position L3-side, the crown portion Sa of the staple S pulled out from the sheet bundle P by the inclined part 122*i* and engaged to the inclined part 122*i*, while the tip end portion 122*s* moves from the removal start position L2*a* to the removal completion position L3.

As shown in FIG. 31A and the like, the staple contact portion 600 is arranged facing the pressing portion 140 at a predetermined interval in front of the pressing portion 140 on the standby position L1-side, and protrudes in a convex shape from a front upper end portion of the holding member 602 toward the inclined part 122*i*-side. The staple contact portion 600 is urged toward the inclined part 122*i* by a tension spring 604 so as to be able to contact the lower surface of the inclined part 122*i* at the time when the wedge plate 122E moves rearward from the front and forward from the rear. As shown in FIG. 32, the staple contact portion 600 is inclined in a direction of coming close to the pressing portion 140-side toward the inclined part 122*i*-side (upper side), and is configured to be able to maintain an engaged state with the crown portion Sa until the staple S remaining engaged with the staple contact portion 600 at the time of retreating the wedge plate 122E separates from the inclined part 122*i*. Note that, the staple contact portion 600 is not necessarily required to be inclined, and may be formed to extend in the vertical (perpendicular) direction, for example.

A height of the staple contact portion 600 is set to a position slightly lower than the pressing portion 140, in consideration of the inclination angle of the first inclined surface 122*a*1 on the lower surface-side of the inclined part 122*i*, for example. A width of the staple contact portion 600 is selected to be, for example, a length in which it can contact the crown portion Sa moving forward from the rear with the retreat of the wedge plate 122E and can be inserted into the groove portion 126*a* of the crown holder 126.

As shown in FIG. 31A and the like, the holding member 602 is constituted by a flat plate processed into a substantial U-shape in plan view, and is arranged in a state of being butted against an outer side of the pressing holder 142. A rear end-side of the holding member 602 is rotatably supported by the shaft 146. One end portion of the tension spring 604 is attached to the further rear of the holding member 602 than the shaft 146. The other end portion of the tension spring 604 is attached to the left frame 112 (refer to FIG. 8), for example. An upper end portion on the front side of the holding member 602 is provided with a pair of convex portions 602*a* capable of coming into contact with the support portion 128*b* of the holder 128.

As shown in FIGS. 31A and 32, an area surrounded by the pressing portion 140, the staple contact portion 600, and the holding member 602 is formed as an opening portion 700 through which the staple S passes when the staple S pulled and peeled off from the inclined part 122*i* by the staple contact portion 600 drops. The opening portion 700 is located above the accommodation part 200 (refer to FIG. 3). Note that, in a case of a normal removing operation of the staple S, the staple S pulled out from the sheet bundle P by the advance of the wedge plate 122E drops into the accommodation part 200 via the opening portion 700 without being caught at the inclined part 122*i*. That is, the staple S drops into the accommodation part 200 without the staple contact portion 600 being used.

Operation Example of Staple Removing Device 1F

Next, an operation of the staple removing device 1F that is performed when pulling out the staple S from the sheet bundle P is described. FIGS. 33A to 33G are side views showing the operation of the staple removing device 1F that is performed when pulling out the staple S from the sheet bundle P.

As shown in FIG. 33A, when the user places the sheet bundle P on the placing table 102 and pushes the start switch 106 of the staple removing device 1F, the sheet bundle P is pressed by the sheet pressing plate 176 and the sheet bundle P is pressed against the placing table 102.

Figure 33B:
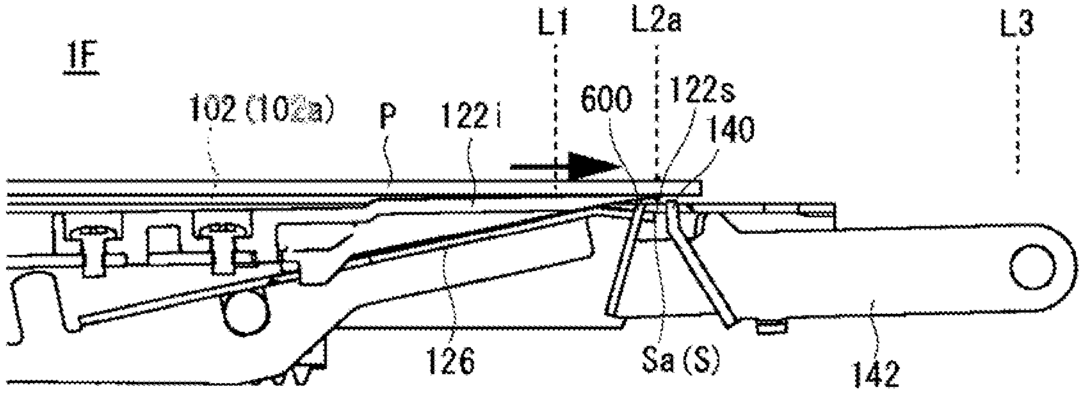
FIG. 33B is a side view showing the operation of the staple removing device when removing the staple from the sheet bundle according to the modified embodiment 1-2.

Subsequently, as shown in FIG. 33B, when the wedge plate 122E including the inclined part 122*i* moves from the standby position L1 toward the removal start position L2*a*, the upper surface of the tip end portion 122*s* comes into contact with the back surface of the lowermost sheet of the sheet bundle P and moves rearward from the front in a state of pressing against the sheet bundle P, so that the tip end portion 122*s* is pushed between the crown portion Sa and the sheet bundle P.

Figure 33C:
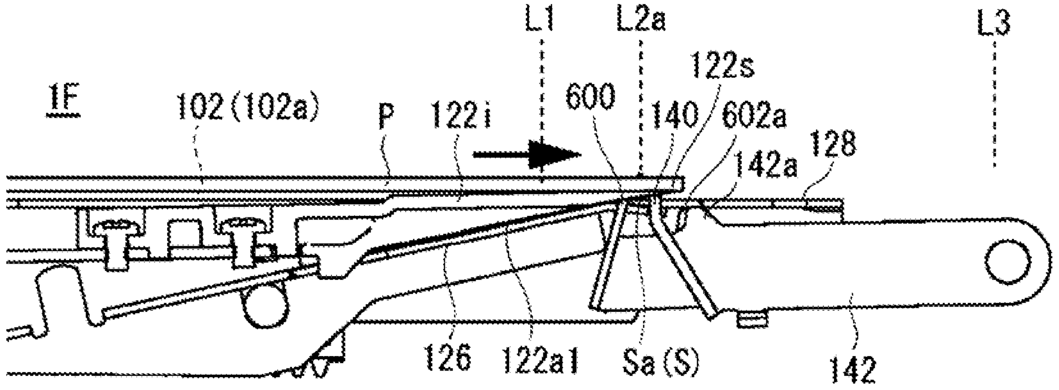
FIG. 33C is a side view showing the operation of the staple removing device when removing the staple from the sheet bundle according to the modified embodiment 1-2.

When the wedge plate 122E further moves rearward from the front, as shown in FIG. 33C, the convex portions 142*a* of the pressing holder 142 and the convex portions 602*a* of the holding member 602 separate from the holder 128, and the pressing portion 140 and the staple contact portion 600 are urged toward the upper inclined part 122*i*-side by the tension springs 144 and 604. Thereby, the pressing portion 140 comes into contact with a rear surface on the removal completion position L3-side of the crown portion Sa moving rearward from the front by the pushing force of the wedge plate 122E and restricts the staple S from moving toward the rear removal completion position L3 together with the wedge plate main body 122*a*. Further, the staple contact portion 600 comes into contact with the first inclined surface 122*a*1 on the lower surface-side of the inclined part 122*i*.

When the thickness of the inclined part 122*i* including the first inclined surface 122*a*1 inserted between the sheet bundle P and the crown portion Sa becomes thicker with the advance of the wedge plate 122E, the pressing portion 140 and the staple contact portion 600 are moved down by the tension springs 144 and 604, following the thickness direction of the inclined part 122*i* in a state of being in contact with the inclined part 122*i* and the crown portion Sa.

Figure 33D:
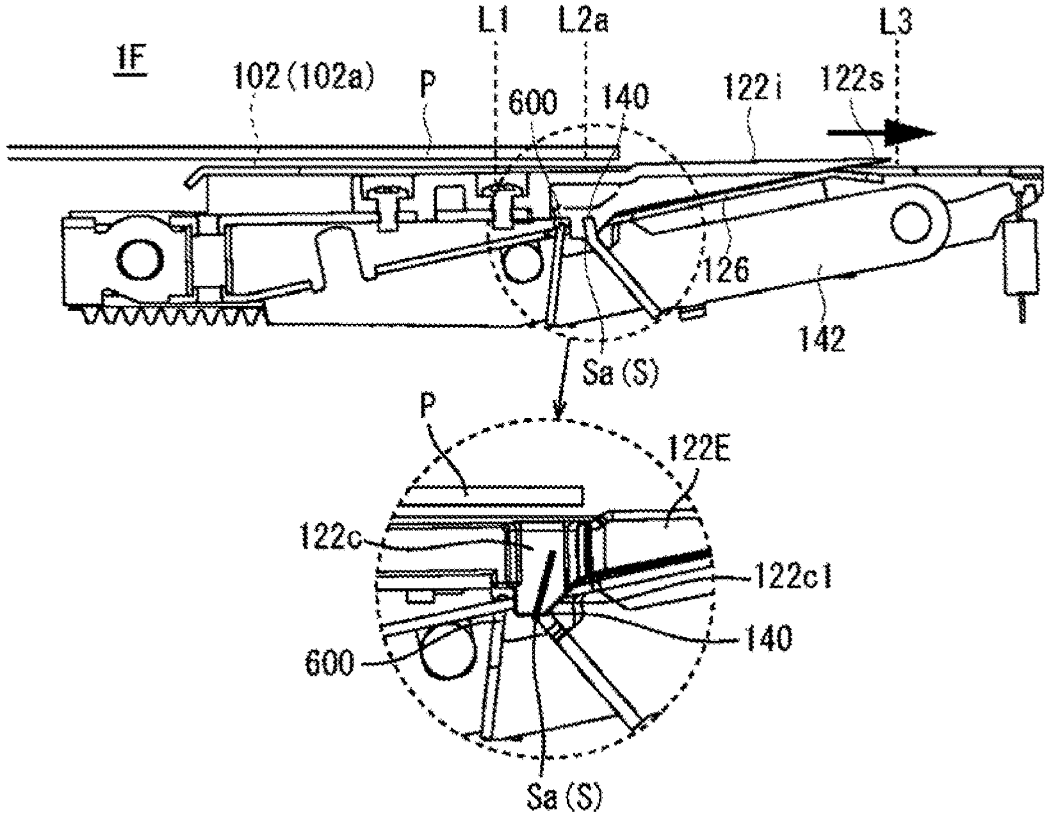
FIG. 33D is a side view showing the operation of the staple removing device when removing the staple from the sheet bundle according to the modified embodiment 1-2.

When the staple S is located on the second inclined surface 122*c*1 of the inclined part 122*i*, the leg portions Sb rise with respect to the sheet bundle P and are pulled out from the sheet bundle P, and as shown in FIG. 33D, when the tip end portion 122*s* of the inclined part 122*i* moves to the removal completion position L3 and the staple S is located at the narrowed portion 122*c*, which is the thickest portion of the inclined part 122*i*, the pullout of the staple S from the sheet bundle P is completed. However, in the present modified embodiment, the staple S remains caught on the side surface of the inclined part 122*i* due to the springback of the leg portions Sb, and does not drop into the accommodation part 200.

Figure 33E:
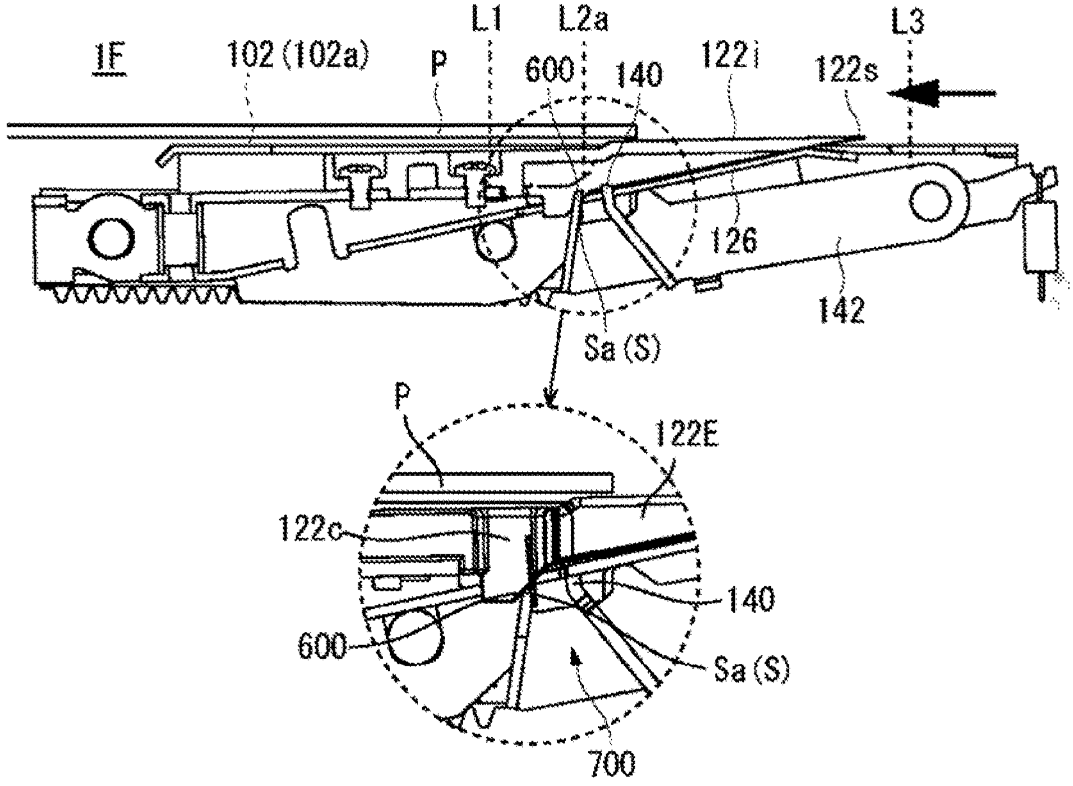
FIG. 33E is a side view showing the operation of the staple removing device when removing the staple from the sheet bundle according to the modified embodiment 1-2.

As shown in FIG. 33E, the wedge plate 122E including the inclined part 122*i* in the state where the staple S is caught moves from the rear removal completion position L3 toward the front standby position L1 along the placing table 102. At this time, the staple contact portion 600 located in front of the staple S contacts, from the standby position L1-side, the crown portion Sa of the staple S pulled out from the sheet bundle P by the wedge plate 122E and remaining engaged with the narrowed portion 122*c*, for example. When removing the staple S wound on the inclined part 122*i*, the staple S is not necessarily required to contact the staple contact portion 600 all the time while the removing part 120 moves from the removal completion position L3 to the removal start position L2*a*, and may also be configured to contact the staple contact portion in a part of the section between the removal completion position L3 and the removal start position L2*a*.

Figure 33F:
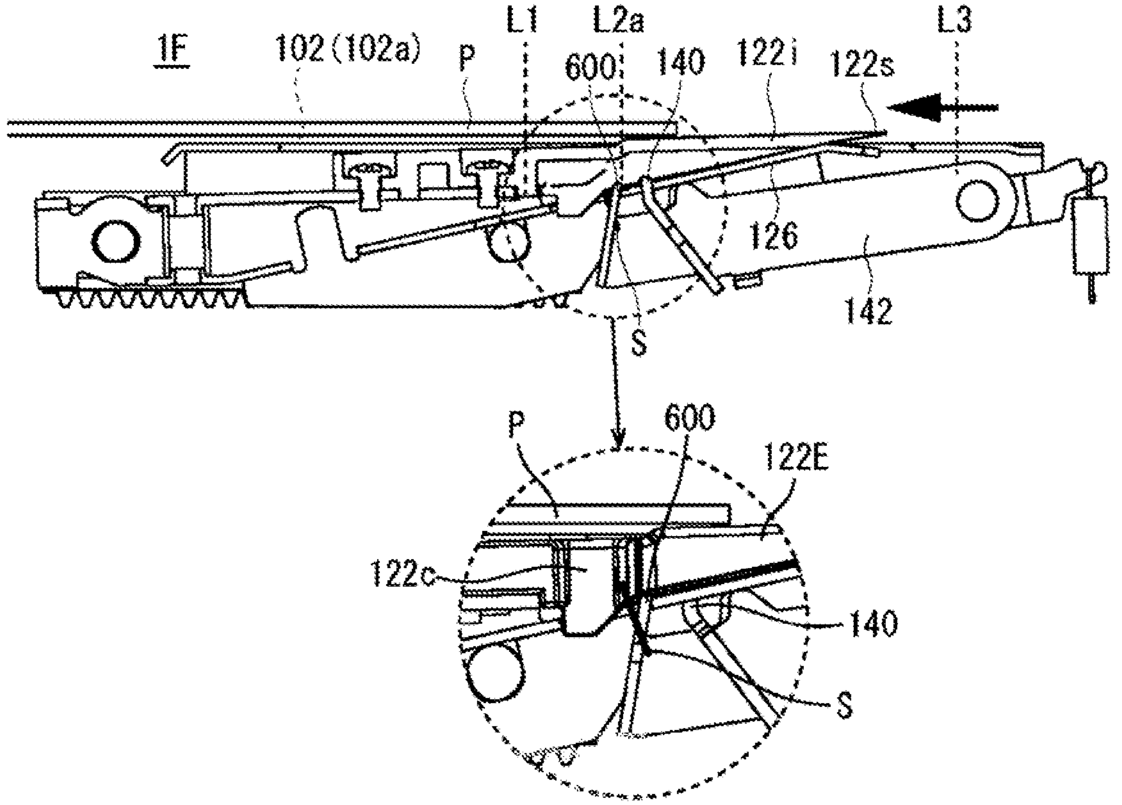
FIG. 33F is a side view showing the operation of the staple removing device when removing the staple from the sheet bundle according to the modified embodiment 1-2.
Figure 33G:
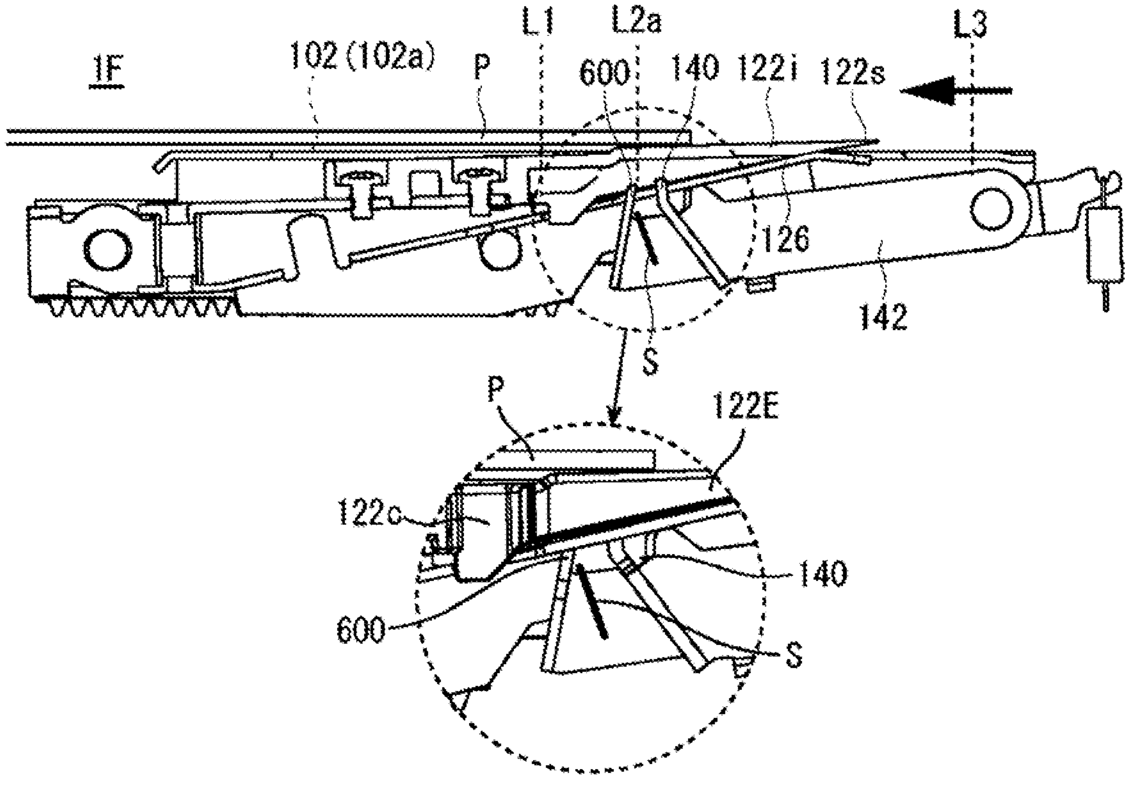
FIG. 33G is a side view showing the operation of the staple removing device when removing the staple from the sheet bundle according to the modified embodiment 1-2.

As shown in FIG. 33F, when the wedge plate 122E moves further forward, the staple S caught at the staple contact portion 600 is pulled and peeled off from the narrowed portion 122*c* of the inclined part 122*i*. When the wedge plate 122E further retracts, as shown in FIG. 33G, the staple S is completely separated from the narrowed portion 122*c* of the inclined part 122*i*, i.e., the engagement state of the staple S with the inclined part 122*i* is released, and the staple drops into the opening portion 700 and is accommodated in the accommodation part 200 (refer to FIG. 3) arranged below the opening portion.

In the related art, depending on combinations of a type of the staple S and a thickness of the sheet bundle P, the staple S is easily held and engaged by the narrowed portion 122*c* of the inclined part 122*i* due to the springback of the leg portions Sb and Sb of the staple S expanded as a result of the insertion of the wedge plate 122E, so that the staple S may not drop from the inclined part 122*i*. As a similar case, even when a center of the inclined part 122*i* in the right and left direction and a center of the crown portion Sa in the longitudinal direction are set to be offset from each other, the staple S is irregularly deformed, so that the staple S may not drop from the wedge plate 122E.

In contrast, according to the modified embodiment 1-2, even when the staple S pulled out from the sheet bundle P remains on the inclined part 122*i*, the crown portion Sa is caught at the staple contact portion 600 at the time of the retreat of the wedge plate 122E. Therefore, the staple S can be securely pulled, peeled off and removed from the inclined part 122*i*. Thereby, clogging of the staple S can be prevented, so that occurrence of a malfunction during the removing operation can be suppressed.

Note that, in the above-described example, the configuration in which the staple contact portion 600 is brought into contact with the lower surface of the inclined part 122*i* during the removing operation of the staple S has been described. However, the staple contact portion 600 is not necessarily required to be brought into contact with the lower surface of the inclined part 122*i*. For example, when the wedge plate 122E moves advances and retreats, the staple contact portion 600 may be arranged at a predetermined interval (predetermined value) with respect to the lower surface of the inclined part 122*i*. The predetermined interval is, for example, an interval at which the staple contact portion 600 can be hooked on the crown portion Sa of the staple S remaining on the inclined part 122*i* when the wedge plate 122E returns to the standby position L1.

Modified Embodiment 1-3

In a staple removing device 1G according to a modified embodiment 1-3, the crown support part 500 of the modified embodiment 1-1 and the staple contact portion 600 of the modified embodiment 1-2 are combined. Note that, the constitutional elements, which have substantially the same functional configurations as those of the staple removing device 1A according to the embodiment shown in FIG. 1A and the like, the staple removing device 1E according to the modified embodiment 1-1, the staple removing device 1F according to the modified embodiment 1-2 and the like, are denoted with the same reference signs, and the overlapping descriptions thereof are omitted.

Configuration Example of Staple Removing Device 1G

Figure 34A:
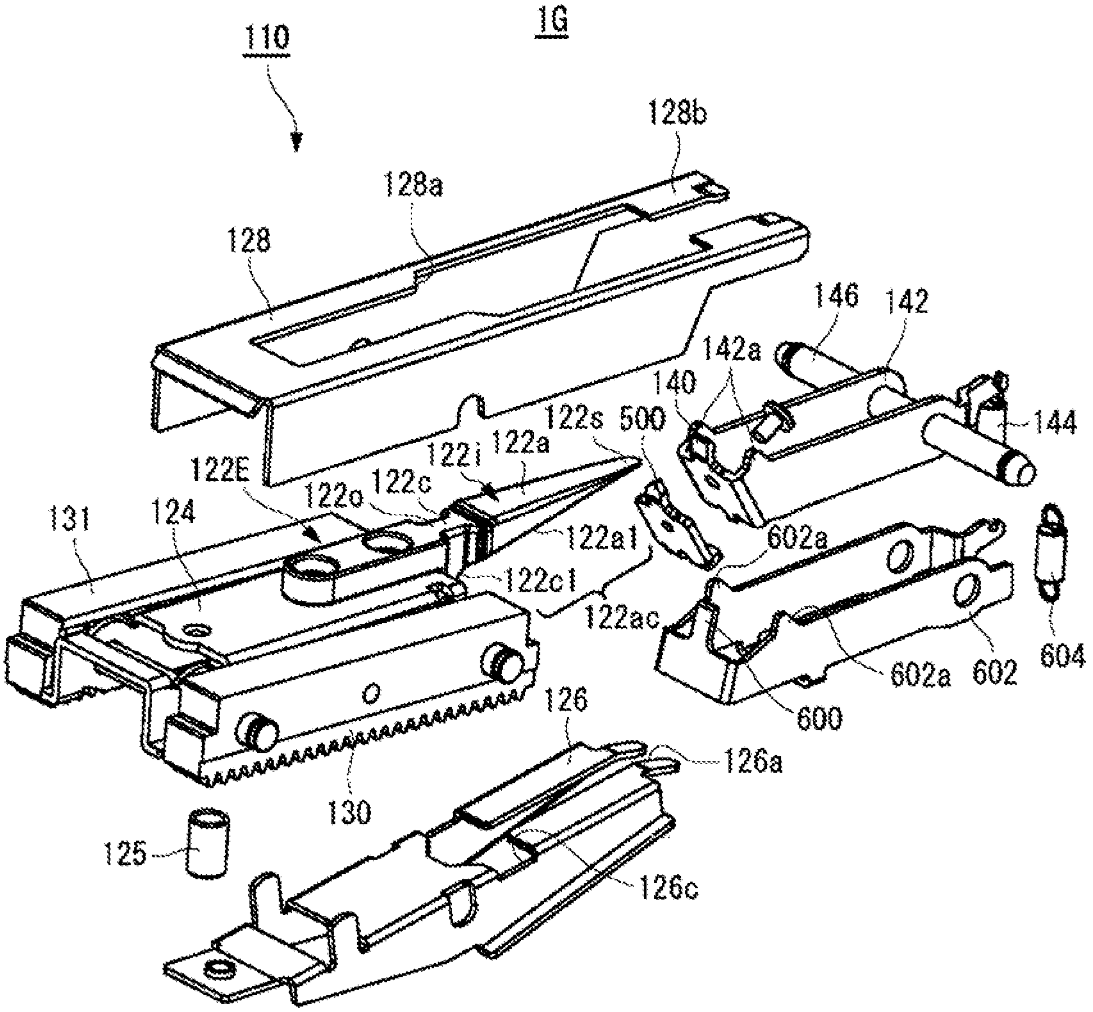
FIG. 34A is an exploded perspective view of a staple removing device according to a modified embodiment 1-3.
Figure 34B:
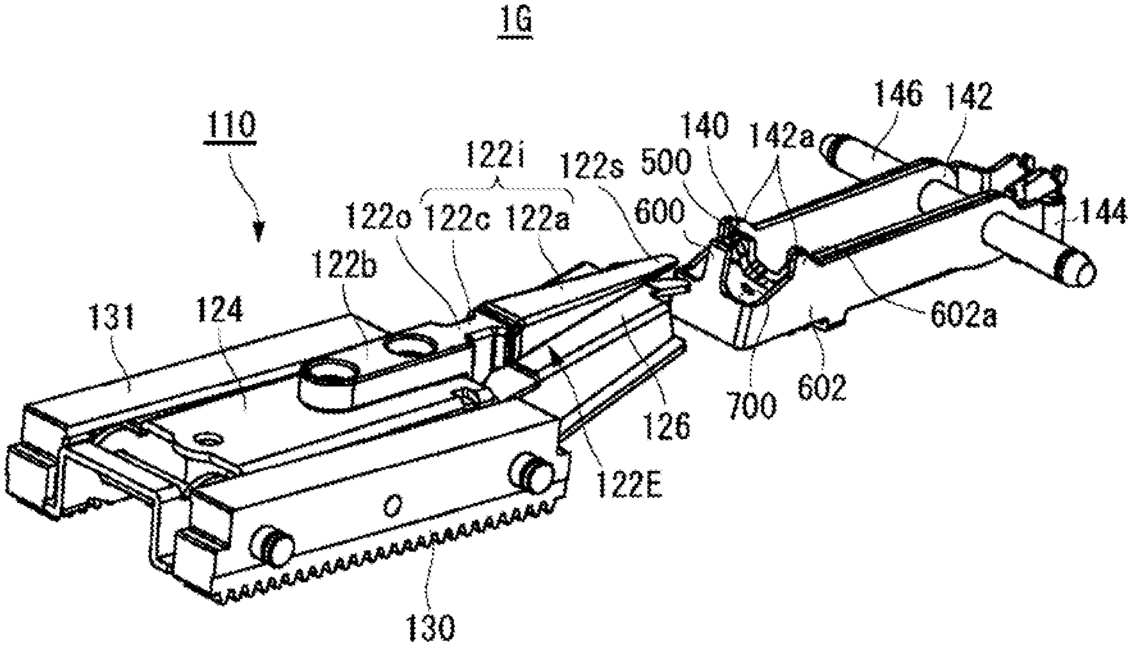
FIG. 34B is a perspective view of the staple removing device according to the modified embodiment 1-3.

FIG. 34A is an exploded perspective view of the staple removing device 1G according to the modified embodiment 1-3, and FIG. 34B is a perspective view of the staple removing device 1G.

As shown in FIGS. 34A and 34B, the staple removing device 1G mainly includes the placing table 102, the wedge plate 122E including the inclined part 122*i*, the pressing portion 140, the crown support part 500, the staple contact portion 600, and the holding member 602.

As shown in FIGS. 33C and 34A, the crown support part 500 is located below the crown portion Sa of the staple S while the pressing portion 140 restricts movement of the staple S. The crown support part 500 has the attaching portion 502 fixed to the pressing portion 140 and the support portion 504 capable of contacting the crown portion Sa of the staple S. The attaching portion 502 is constituted by a flat plate having a substantially rectangular shape in plan view, and is attached to a front surface of the pressing portion 140 by a screw or the like. The support portion 504 protrudes in a convex shape from an upper end portion of the attaching portion 502 toward the inclined part 122*i*E, and a tip end-side thereof is configured to have a tapered shape.

As shown in FIGS. 33C and 34A, the staple contact portion 600 is located between the standby position L1 and the removal start position L2*a*, and is configured to face the first inclined surface 122*a*1 and to contact, from the standby position L1-side, the crown portion Sa of the staple S pulled out from the sheet bundle P by the inclined part 122*i* and engaged to the inclined part 122*i*, while the tip end portion 122*s* moves from the removal completion position L3 to the removal start position L2*a*. The staple contact portion 600 is arranged facing the pressing portion 140 and the crown support part 500 at a predetermined interval in front of the pressing portion and the crown support part, and protrudes in a convex shape from a front upper end portion of the holding member 602 toward the inclined part 122*i*-side. An area surrounded by the crown support part 500, the staple contact portion 600 and the holding member 602 is formed as an opening portion 700 through which the staple S passes when the staple S pulled and peeled off from the inclined part 122*i* by the staple contact portion 600 drops.

Figure 35A:
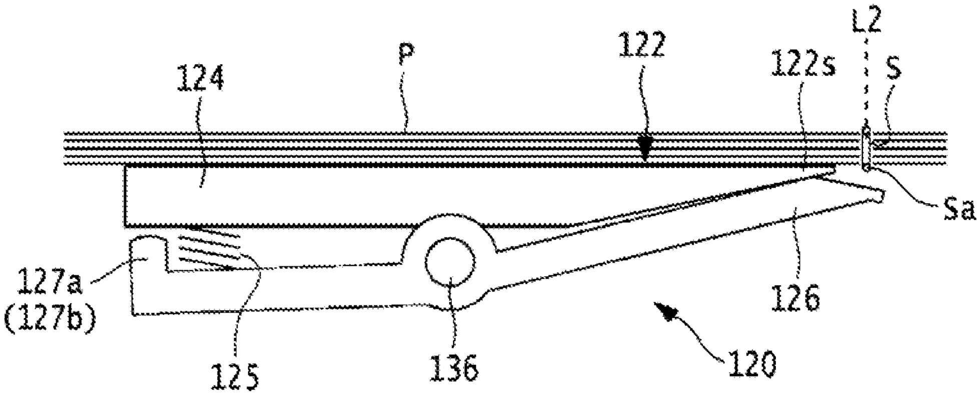
FIG. 35A is a schematic view showing an operation example of the removing part when removing a staple from a sheet bundle bound by the staple having a small wire diameter.
Figure 35B:
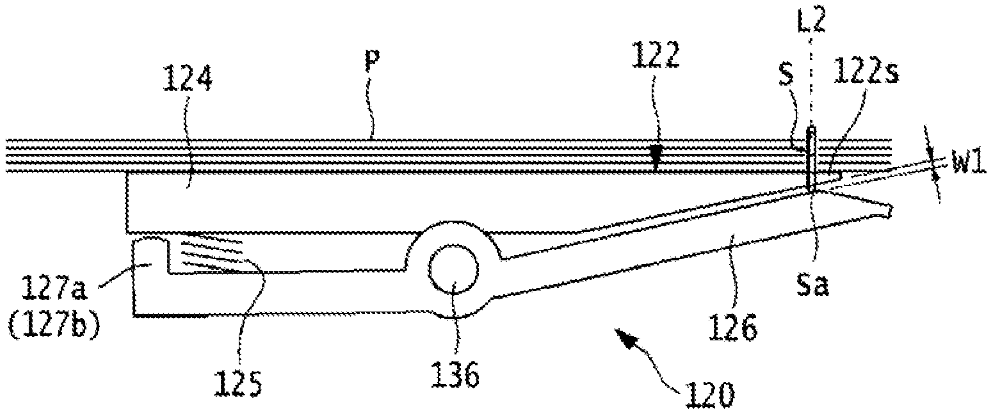
FIG. 35B is a schematic view showing the operation example of the removing part when removing the staple from the sheet bundle bound by the staple having a small wire diameter.
Figure 35C:
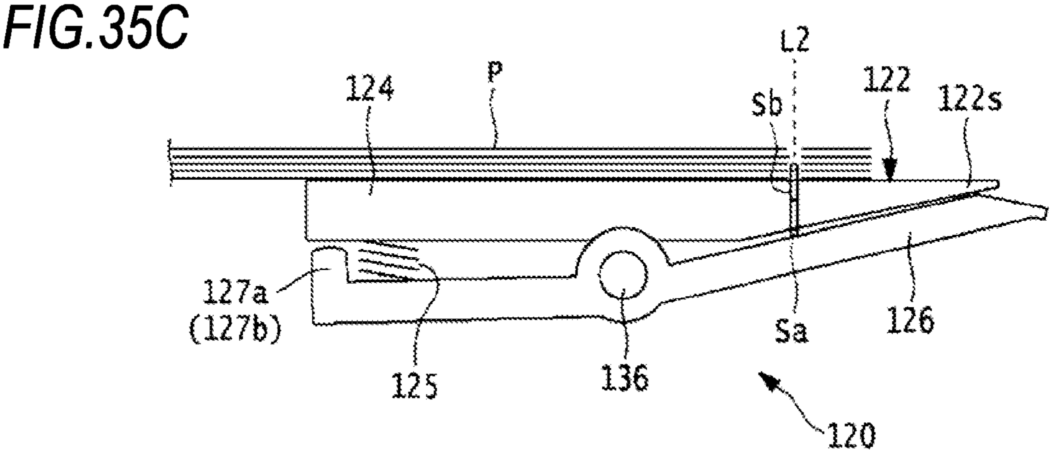
FIG. 35C is a schematic view showing the operation example of the removing part when removing the staple from the sheet bundle bound by the staple having a small wire diameter.

Operation Example of Removing Part 120 According to Wire Diameter of Staple S In the first embodiment shown in FIG. 1 and the like, a case where a staple S having a small (thin) wire diameter is used is described. Note that, the present operation example does not exclude the application in other embodiments and modified embodiments, and can also be applied to the embodiments and modified embodiments. FIGS. 35A to 35C are schematic views showing an operation example of the removing part 120 when removing the staple S having a small (thin) wire diameter from the sheet bundle P bound with the staple S. Note that, in FIG. 35A and the like, for convenience, the wedge plate 122 and the blade holder 124 are integrally shown.

As shown in FIG. 35A, before the wedge plate 122 reaches the removal position L2, the tip end-side of the crown holder 126 is in contact with the lower surface of the wedge plate 122 due to the urging of the spring 125, and the tip end portion 122*s* of the wedge plate 122 and the tip end-side of the crown holder 126 are in a closed state.

When the removing part 120 moves rearward from the front and reaches the removal position L2, the crown portion Sa of the staple S is inserted between the wedge plate 122 and the crown holder 126, as shown in FIG. 35B. At this time, the tip end-side of the crown holder 126 is pushed in a direction away from the wedge plate 122 against the elastic force of the spring 125, and is opened by an opening amount W1 with respect to the tip end portion 122*s* of the wedge plate 122.

Subsequently, when the removing part 120 further moves rearward from the front, as shown in FIG. 35C, the thickness of the wedge plate 122 between the sheet bundle P and the crown portion Sa gradually increases, and the leg portions Sb of the staple S separate from the sheet surface of the sheet bundle P and are in a raised state. At this time, since the load of the spring 125 is set according to the staple S having a small wire diameter, the staple S can be slid while being sandwiched between the wedge plate 122 and the crown holder 126, and does not move rearward from the front together with the wedge plate 122.

Figure 36A:
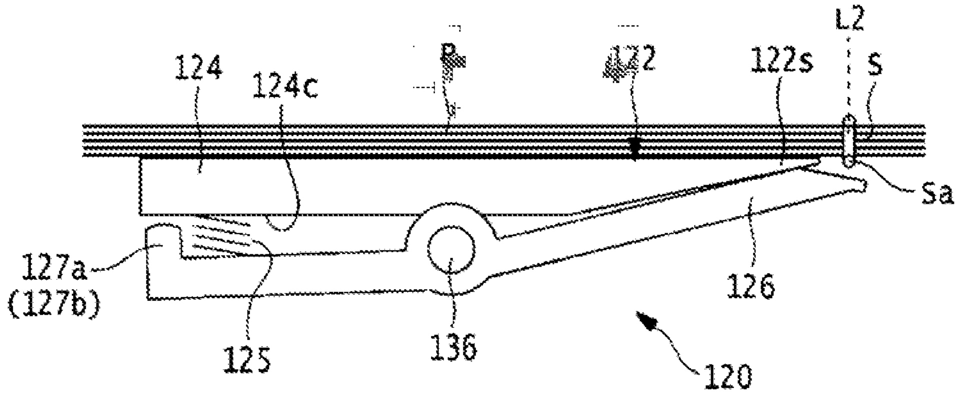
FIG. 36A is a schematic view showing an operation example of the removing part when removing a staple from a sheet bundle bound by the staple having a large wire diameter.
Figure 36B:
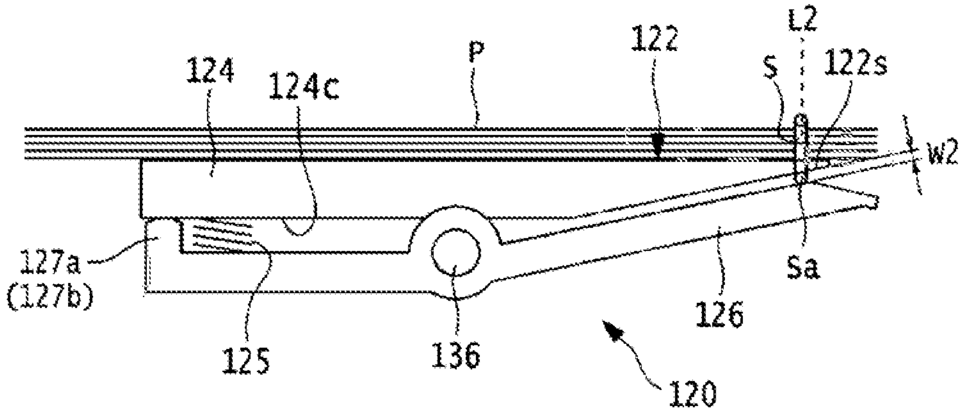
FIG. 36B is a schematic view showing the operation example of the removing part when removing the staple from the sheet bundle bound by the staple having a large wire diameter.
Figure 36C:
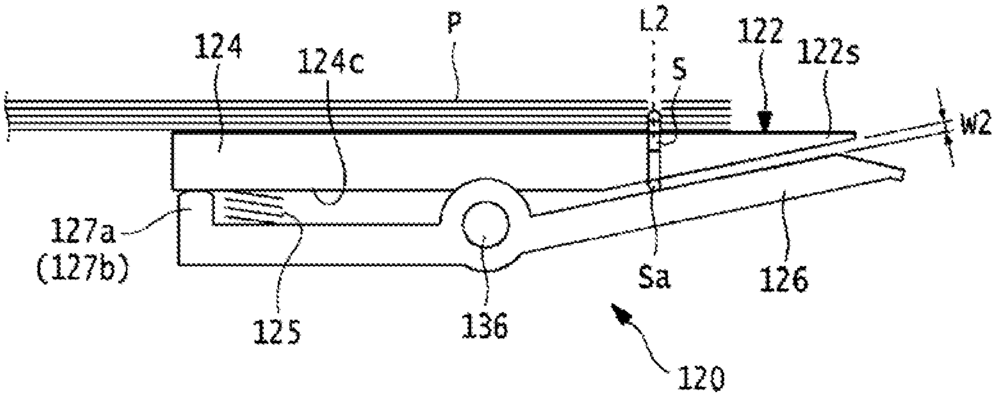
FIG. 36C is a schematic view showing the operation example of the removing part when removing the staple from the sheet bundle bound by the staple having a large wire diameter.

Next, a case where a staple S having a large wire diameter is used is described. FIGS. 36A to 36C are schematic views showing an operation example of the removing part 120 when removing the staple S having a large (thick) wire diameter from the sheet bundle P bound with the staple S. Note that, in FIG. 36A and the like, for convenience, the wedge plate 122 and the blade holder 124 are integrally shown.

As shown in FIG. 36A, the tip end-side of the crown holder 126 is in contact with the lower surface of the wedge plate 122 due to the urging of the spring 125, and the tip end portion 122*s* of the wedge plate 122 and the tip end-side of the crown holder 126 are in a closed state.

When the removing part 120 moves rearward from the front and reaches the removal position L2, the crown portion Sa of the staple S is inserted between the wedge plate 122 and the crown holder 126, as shown in FIG. 36B. At this time, the tip end-side of the crown holder 126 is pushed in a direction away from the wedge plate 122 against the elastic force of the spring 125, and is opened by an opening amount W2 with respect to the tip end portion 122*s* of the wedge plate 122. The opening amount W2 corresponds to the setting value set in advance, and is, for example, an opening amount in which, when a staple S having a large wire diameter is inserted, the crown holder 126 is not excessively opened and can be held with an optimum load.

In the present embodiment, when the crown holder 126 is opened by the opening amount W2 that is the setting value, the restriction portions 127*a* and 127*b* come into contact with the lower surface 124*c* of the blade holder 124, so that the tip end-side of the crown holder 126 is regulated not to be opened by the opening amount W2 or more.

Subsequently, when the removing part 120 further moves rearward from the front, as shown in FIG. 36C, the thickness of the wedge plate 122 between the sheet bundle P and the crown portion Sa gradually increases, and the leg portions Sb of the staple S separate from the sheet surface of the sheet bundle P and are in an erected state. At this time, since the restriction portions 127*a* and 127*b* are maintained in contact with the lower surface 124*c* of the blade holder 124, the tip end-side of the crown holder 126 does not open in excess of the opening amount W2, and the staple S can be pressed by the crown holder 126.

As described above, according to the present embodiment, the load of the spring 125 is set according to the staple S having a small wire diameter, and the crown holder 126 is configured not to be opened by the setting value or more by using the restriction portions 127*a* and 127*b*. Thereby, for example, even when a staple S having a large wire diameter is used, it is possible to prevent the crown holder 126 from being opened by the setting value or more by the restriction portions 127*a* and 127*b*, so that the crown portion Sa can be pressed with a constant load by the crown holder 126. Thereby, it is possible to prevent one leg portion Sb of the staple S from first separating from the sheet bundle P during the removing operation, thereby preventing poor removal. Further, even when the staple S having a small wire diameter is used, the crown portion Sa can be pressed with the optimum load of the crown holder 126 by the spring 125 set according to the staple S having a small wire diameter. Thereby, it is possible to prevent poor removal, such as the crown portion Sa being dragged due to movement of the wedge plate 122 or the like from the front toward the rear, whereby the sheet is torn. Therefore, according to the present embodiment, even when various types of staples S such as a staple S having a large wire diameter and a staple S having a small wire diameter are used, the staples S can be securely removed from the sheet bundle P. Further, since it is not necessary to change the removing operation or the removing mechanism according to the type of staple S, it is possible to effectively perform the removing operation and to reduce the cost of the device.

Modified Embodiment 2-1

In a modified embodiment 2-1, the configuration and the like of a crown holder 226 are different from the configuration and the like of the crown holder 126 of the first embodiment. Note that, since the other configurations, operations and the like of a staple removing device 1H of the modified embodiment 2-1 are common to those of the first embodiment, the detailed descriptions thereof are omitted.

Figure 37A:
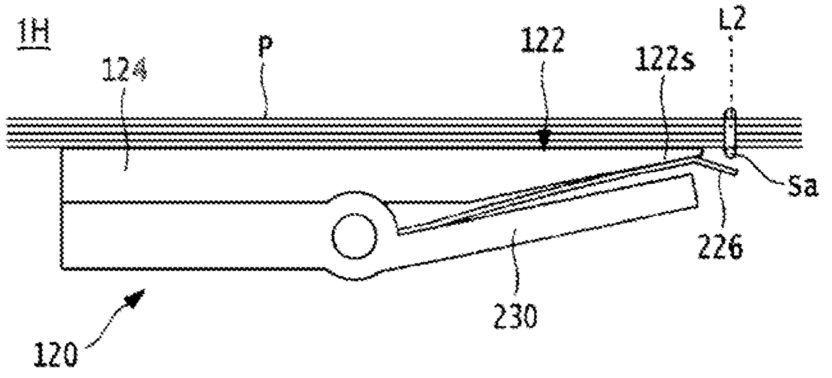
FIG. 37A is a schematic view of a removing part including a crown holder according to a modified embodiment 2-1.
Figure 37B:
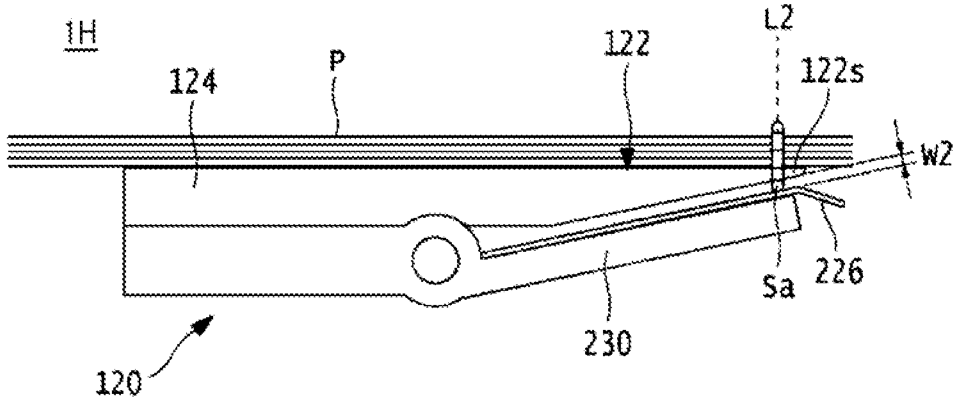
FIG. 37B is a schematic view of the removing part including the crown holder according to the modified embodiment 2-1.
Figure 37C:
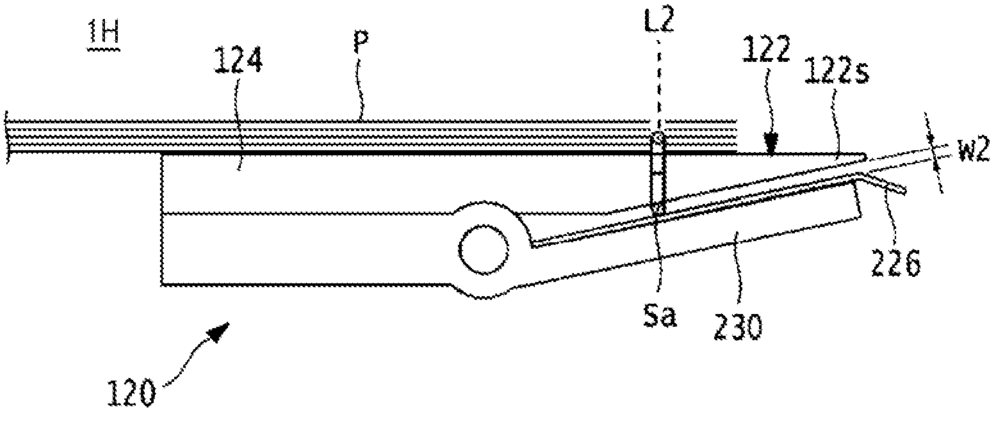
FIG. 37C is a schematic view of the removing part including the crown holder according to the modified embodiment 2-1.

Configuration Example of Removing Part 120 Including Crown Holder 226 and the Like FIGS. 37A to 37C are schematic views of the removing part 120 including a crown holder 226 of the staple removing device 1H according to the modified embodiment 2-1. Note that, in FIG. 37A and the like, for convenience, the wedge plate 122 and the blade holder 124 are integrally shown. Further, in the below, it is assumed that the staple S having a large wire diameter is used and the opening amount W2 is set to the wire diameter of the staple S used.

The removing part 120 constituting the staple removing device 1H includes the wedge plate 122, the blade holder 124, a crown holder 226, and a crown holder stopper 230.

The crown holder 226 is constituted by, for example, a leaf spring, and is configured to hold the crown portion Sa inserted between the wedge plate 122 and the crown holder 226. A base end portion of the crown holder 226 is attached to a substantially central portion of the crown holder stopper 230. A tip end-side of the crown holder 226 is urged toward the wedge plate 122 and is pressed against the lower surface of the wedge plate 122. In the present modified embodiment, a load of the holder 226 is set according to the staple S having a small wire diameter among the staples S to be used.

The crown holder stopper 230 is arranged below the crown holder 226, and is configured to restrict an opening amount of the crown holder 226 so that the crown holder 226 does not open by a setting value or more with respect to the wedge plate 122. The tip end-side of the crown holder 226 is arranged at a certain interval from the lower surface of the facing wedge plate 122. The certain interval is an interval obtained by adding a thickness of the crown holder 226 and a wire diameter of the crown portion Sa. A base end-side of the crown holder stopper 230 is in contact with the lower surface of the blade holder 124.

Operation Example of Removing Part 120 Including Crown Holder 226 and the Like Next, an operation example of the removing part 120 including the crown holder 226 of the staple removing device 1H according to the modified embodiment 2-1 is described with reference to FIGS. 37A to 37C.

As shown in FIG. 37A, before the wedge plate 122 of the removing part 120 reaches the removal position L2, the tip end-side of the crown holder 226 is pressed against the lower surface of the wedge plate 122.

As shown in FIG. 37B, when the wedge plate 122 moves rearward from the front and reaches the removal position L2, the tip end portion 122*s* of the wedge plate 122 is inserted between the sheet bundle P and the crown portion Sa of the staple S. At this time, the crown holder 226 moves in a direction away from the lower surface of the wedge plate 122 against the elastic force, and opens by the opening amount W2 corresponding to the wire diameter of the crown portion Sa. In the modified embodiment 2-1, since the base end-side of the crown holder stopper 230 is in contact with the lower surface of the blade holder 124 and is thus restricted, the tip end-side of the crown holder 226 does not open by the opening amount W2 or more.

As shown in FIG. 37C, even when the wedge plate 122 further moves rearward from the front, since the opening amount of the crown holder 226 is restricted by the crown holder stopper 230, the state opened by the opening amount W2 is maintained.

As described above, the modified embodiment 2-1 can also obtain the similar effects to those of the first embodiment. That is, according to the modified embodiment 2-1, even when various types of staples S such as a staple S having a large wire diameter and a staple S having a small wire diameter are used, the staples S can be securely removed from the sheet bundle P.

Modified Embodiment 2-2

In a modified embodiment 2-2, the configuration and the like of a crown holder 326 are different from the configuration and the like of the crown holder 126 of the first embodiment. Note that, since the other configurations, operations and the like of a staple removing device 1I of the modified embodiment 2-2 are common to those of the first embodiment, the detailed descriptions thereof are omitted.

Figure 38A:
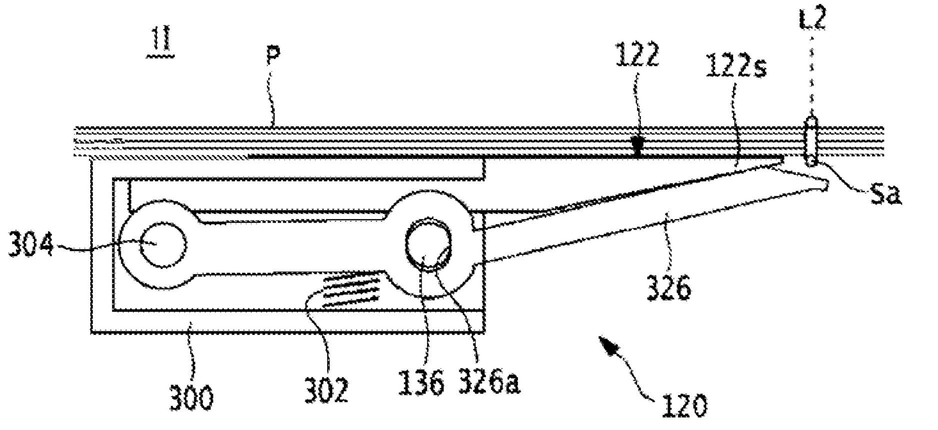
FIG. 38A is a schematic view of a removing part including a crown holder according to a modified embodiment 2-2.
Figure 38B:
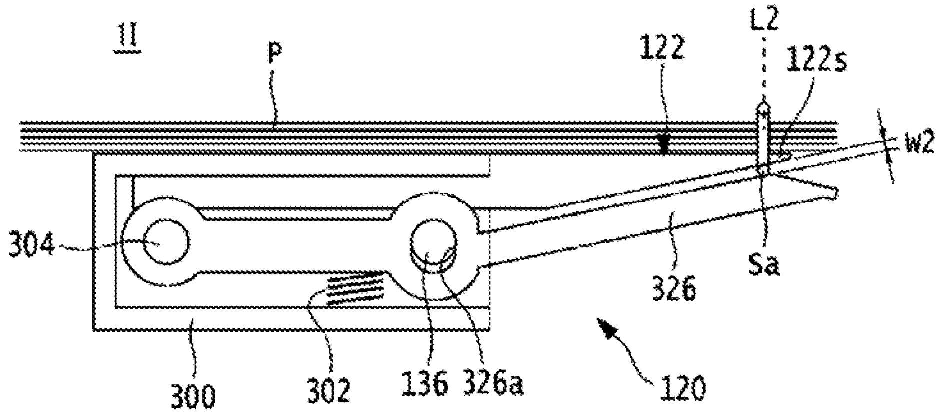
FIG. 38B is a schematic view of the removing part including the crown holder according to the modified embodiment 2-2.
Figure 38C:
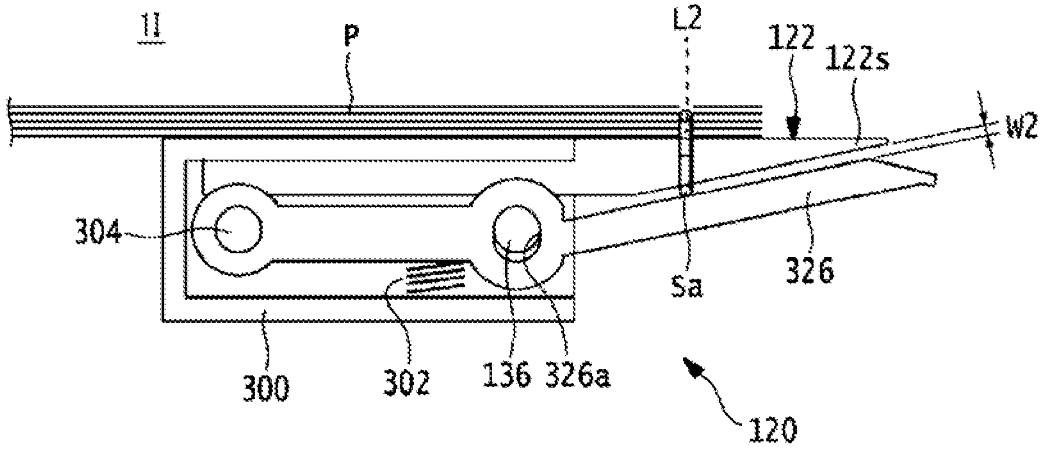
FIG. 38C is a schematic view of the removing part including the crown holder according to the modified embodiment 2-2.

Configuration Example of Removing Part 120 Including Crown Holder 326 and the Like FIGS. 38A to 38C are schematic views of the removing part 120 including a crown holder 326 of the staple removing device 1I according to the modified embodiment 2-2. Further, in the below, it is assumed that the staple S having a large wire diameter is used, for example, and the opening amount W2 is set to the wire diameter of the staple S used.

The removing part 120 constituting the staple removing device 1I includes the wedge plate 122, a wedge plate holder 300, and a crown holder 326.

The wedge plate holder 300 is a box body whose rear side is open, and is configured to accommodate each of the base end-side of the wedge plate 122 and the base end-side of the crown holder 326.

A compression spring 302 is arranged between a portion of the crown holder 326 near the first drive shaft 136 and an inner bottom surface of the wedge plate holder 300. A load of the compression spring 302 is set according to the staple S having a small wire diameter among the staples S to be used.

The crown holder 326 is urged toward the wedge plate 122 by the compression spring 302 and is pressed against the wedge plate 122. The crown holder 326 is formed at a substantially intermediate position in the longitudinal direction with a shaft opening portion 326*a* through which the first drive shaft 136 is inserted. The shaft opening portion 326*a* is configured by a long hole having a long axis in the upper and lower direction. Thereby, the crown holder 326 is adapted to be movable in the upper and lower direction along the shaft opening portion 326*a* with respect to the first drive shaft 136. A fulcrum shaft 304 is inserted through the base end portion of the crown holder 326, and both end portions of the fulcrum shaft 304 are respectively supported on left and right inner side surfaces of the wedge plate holder 300.

Next, an operation example of the crown holder 326 of the removing part 120 constituting the staple removing device 1I is described with reference to FIGS. 38A to 38C.

As shown in FIG. 38A, before the wedge plate 122 of the removing part 120 reaches the removal position L2, the tip end-side of the crown holder 226 is pressed against the lower surface of the wedge plate 122.

As shown in FIG. 38B, when the wedge plate 122 moves rearward from the front and passes through the removal position L2, the tip end portion 122*s* of the wedge plate 122 is inserted between the sheet bundle P and the crown portion Sa of the staple S. At this time, the crown holder 326 moves in a direction away from the lower surface of the wedge plate 122 against the elastic force of the compression spring 302. In the modified embodiment 2-2, when the crown holder 326 is opened by the opening amount W2, an upper end opening edge of the shaft opening portion 326*a* of the crown holder 326 comes into contact with the first drive shaft 136, so that the crown holder 326 is restricted from moving downward. Thereby, the crown holder 326 does not open by the opening amount W2 or more with respect to the wedge plate 122.

As shown in FIG. 38C, even when the wedge plate 122 further moves rearward from the front, since the opening amount of the crown holder 326 is restricted by the shaft opening portion 326*a* and the first drive shaft 136, the state opened by the opening amount W2 is maintained.

As described above, the modified embodiment 2-2 can also obtain the similar effects to those of the first embodiment. That is, according to the modified embodiment 2-2, even when various types of staples S such as a staple S having a large wire diameter or a staple S having a small wire diameter are used, the staples S can be securely removed from the sheet bundle P.

Modified Embodiment 2-3

In a modified embodiment 2-3, the configuration and the like of the wedge plate 122 are different from the configuration and the like of the wedge plate 122 of the first embodiment. Note that, since the other configurations, operations and the like of a staple removing device 1J of the modified embodiment 2-3 are common to those of the first embodiment, the detailed descriptions thereof are omitted.

Configuration Example of Removing Part 120

Figure 39:
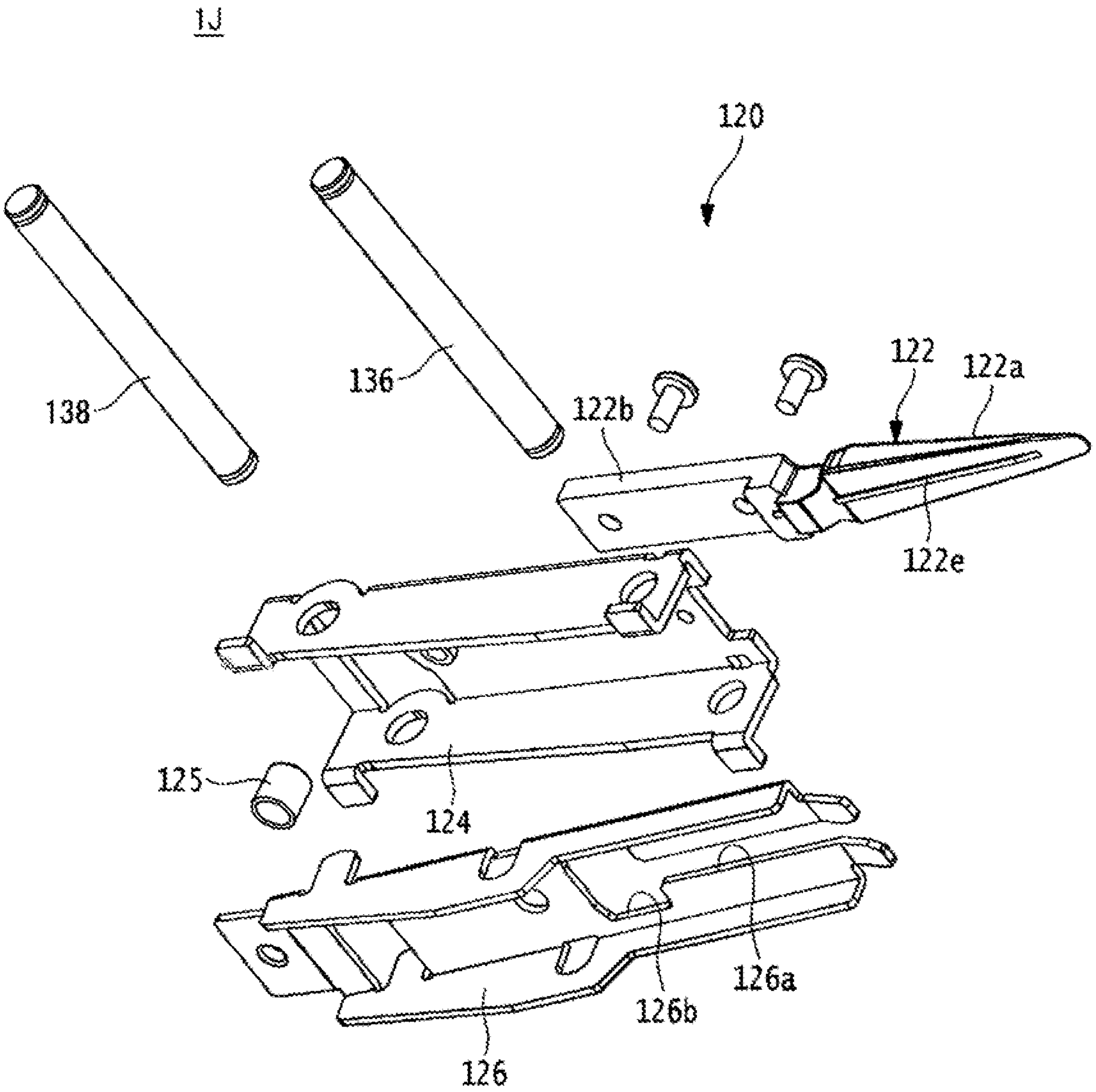
FIG. 39 is an exploded perspective view of a removing part according to a modified embodiment 2-3.
Figure 40A:
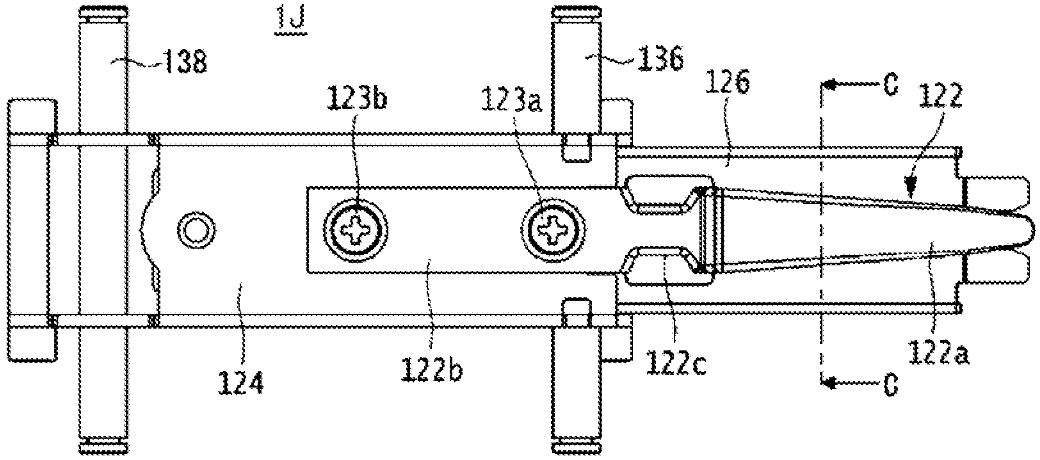
FIG. 40A is a plan view of a removing part according to the modified embodiment 2-3.
Figure 40B:
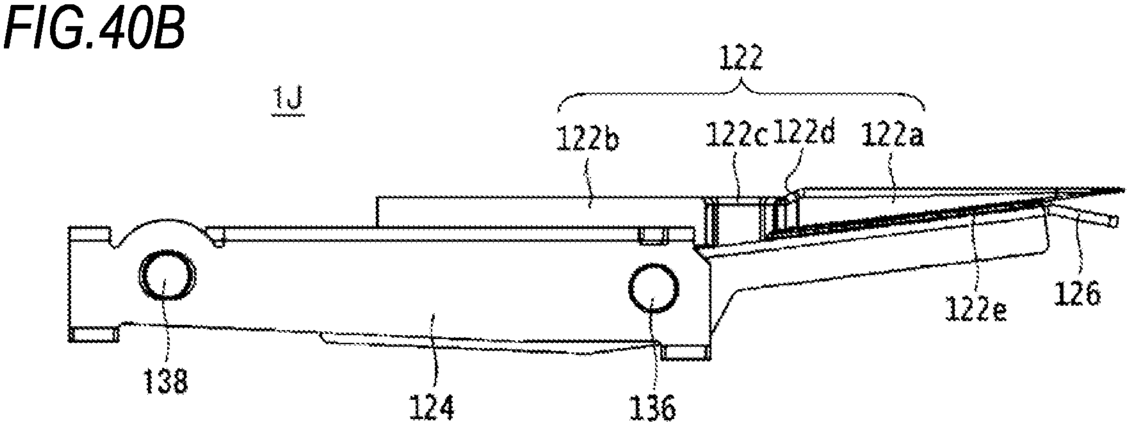
FIG. 40B is a side view of the removing part shown in FIG. 40A.
Figure 40C:
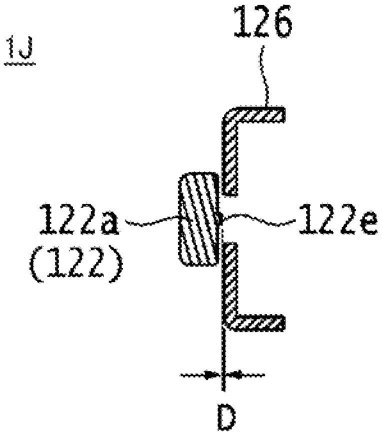
FIG. 40C is a cross-sectional view taken along a C-C line of the removing part shown in FIG. 40A.

FIG. 39 is an exploded perspective view of the removing part 120 of the staple removing device 1J according to the modified embodiment 2-3. FIG. 40A is a plan view of the removing part 120 of the staple removing device 1J according to the modified embodiment 2-3, FIG. 40B is a side view of the removing part 120 shown in FIG. 40A, and FIG. 40C is a cross-sectional view taken along a line C-C of the removing part 120 shown in FIG. 40A.

The removing part 120 constituting the staple removing device 1J includes the wedge plate 122, the blade holder 124, and the crown holder 126. The wedge plate 122 has the wedge plate main body 122*a*, the attaching portion 122*b*, the narrowed portion 122*c*, and a convex portion 122*e*.

The convex portion 122*e* is provided on the lower surface of the wedge plate 122, and is configured to prevent the crown portion Sa from laterally moving when holding the crown portion Sa of the staple S inserted between the wedge plate 122 and the crown holder 126. The convex portion 122*e* is constituted by a linear projection extending along the longitudinal direction of the wedge plate main body 122*a*, and is arranged at a substantially central portion in the width direction of the crown holder 126. A gap D between a lower surface of the convex portion 122*e* and an upper surface of the crown holder 126 is selected to be equal to or smaller than a wire diameter of the staple S to be used. A tip end-side of the convex portion 122*e* is formed so that a thickness of a side surface gradually decreases toward the tip end-side so as not to collide with the crown portion Sa inserted between the wedge plate 122 and the crown holder 126. Note that, a cross-sectional shape of the convex portion 122*e* is not limited to a rectangular shape, and may also be, for example, a semicircular shape.

Operation Example of Removing Part 120 Including Wedge Plate 122

Figure 41A:
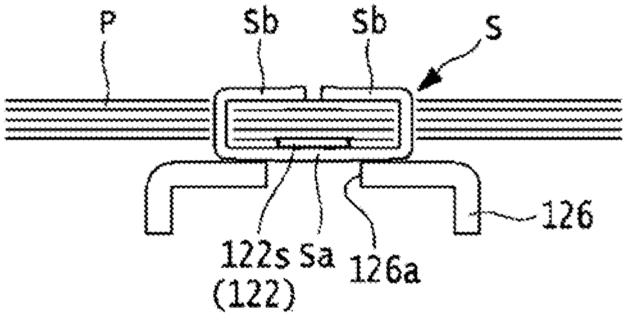
FIG. 41A is an enlarged view of main parts of a wedge plate, a staple and a crown holder when removing the staple from the sheet bundle according to the modified embodiment 2-3.
Figure 41B:
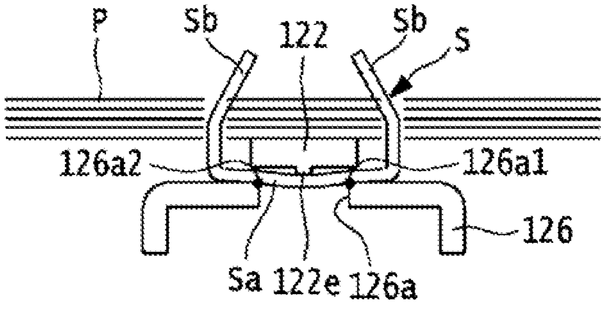
FIG. 41B is a side view of main parts of the wedge plate, the staple and the crown holder when removing the staple from the sheet bundle according to the modified embodiment 2-3.

FIGS. 41A and 41B are enlarged views of main parts of the wedge plate 122, the staple S and the crown holder 126 when removing the staple S from the sheet bundle P.

When the wedge plate 122 of the removing part 120 reaches the removal position L2, the tip end portion 122*s* of the wedge plate 122 is inserted between the sheet bundle P and the crown portion Sa of the staple S, as shown in FIG. 41A. At this time point, the crown portion Sa is held by the lower surface of the wedge plate 122.

When the wedge plate 122 further moves rearward from the front, as shown in FIG. 41B, the convex portion 122*e* of the wedge plate 122 is also introduced between the crown portion Sa and the sheet bundle and comes into contact with the crown portion Sa. Thereby, three points of opening edges 126*a*1 and 126*a*2 of both ends of the groove portion 126*a* of the crown holder 126 and the convex portion 122*e* are in a state of being bitten to the crown portion Sa, so that the crown portion Sa is prevented from laterally moving when the wedge plate 122 and the crown holder 126 move rearward from the front.

As described above, according to the modified embodiment 2-3, the crown portion Sa can be made to bite to the convex portion 122*e* of the wedge plate 122 and the opening edges 126*a*1 and 126*a*2 of both ends of the groove portion 126*a* of the crown holder 126. Therefore, it is possible to securely prevent the crown portion Sa from laterally moving when the wedge plate 122 moves rearward from the front. Thereby, it is possible to prevent poor removal, such as one leg portion Sb of the staple S first separating from the sheet bundle P.

Note that, the technical scope of the present invention is not limited to the above-described embodiments, and the above-described embodiments can be variously changed without departing from the gist of the present invention. For example, the side surface of the wedge plate 122 may also be formed by an inclined surface whose width in the right and left direction becomes narrow from the upper toward the lower, instead of the narrowed portion 122*c*. At this time, the width of the wedge plate 122 in the right and left direction is formed to be narrower than the width dimension D3 between the leg portions Sb and Sb of the staple S.

Modified Embodiment 3-1

Configuration Example of Staple Removing Device 1

Figure 42A:
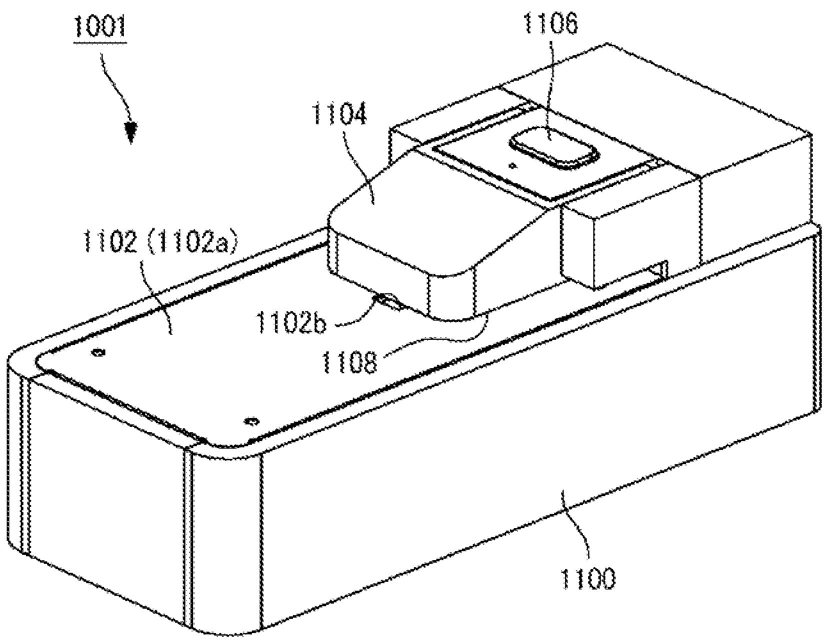
FIG. 42A is a front perspective view of a staple removing device according to a modified embodiment 3-1.
Figure 42B:
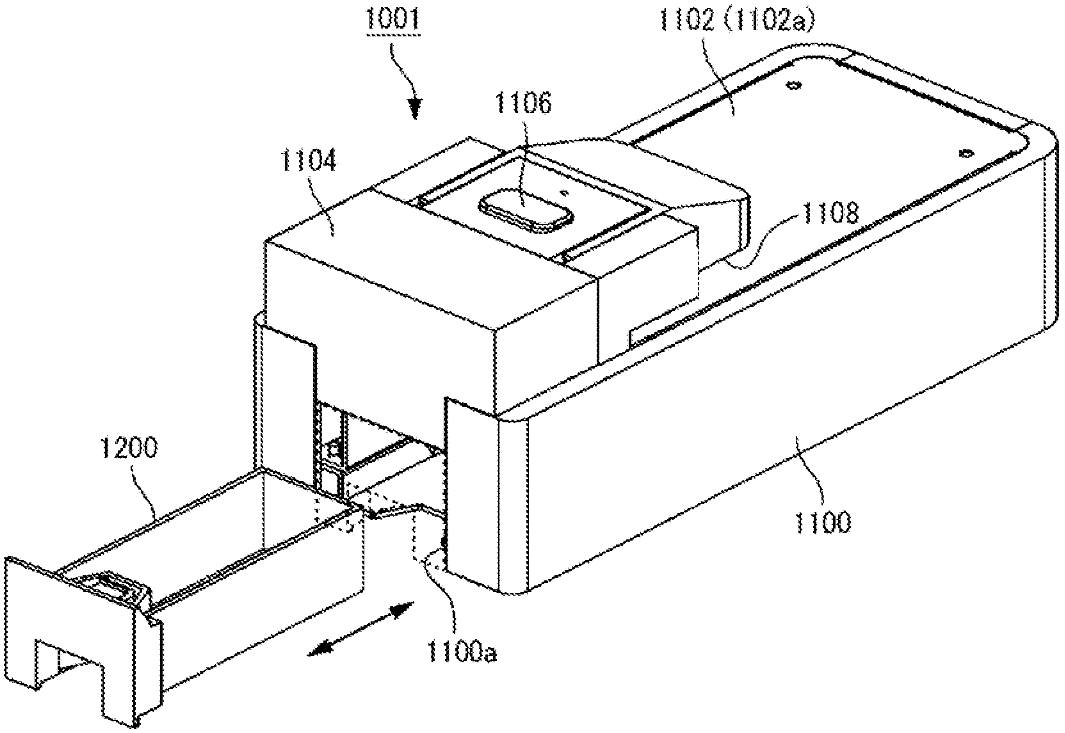
FIG. 42B is a rear perspective view of the staple removing device according to the modified embodiment 3-1.
Figure 43A:
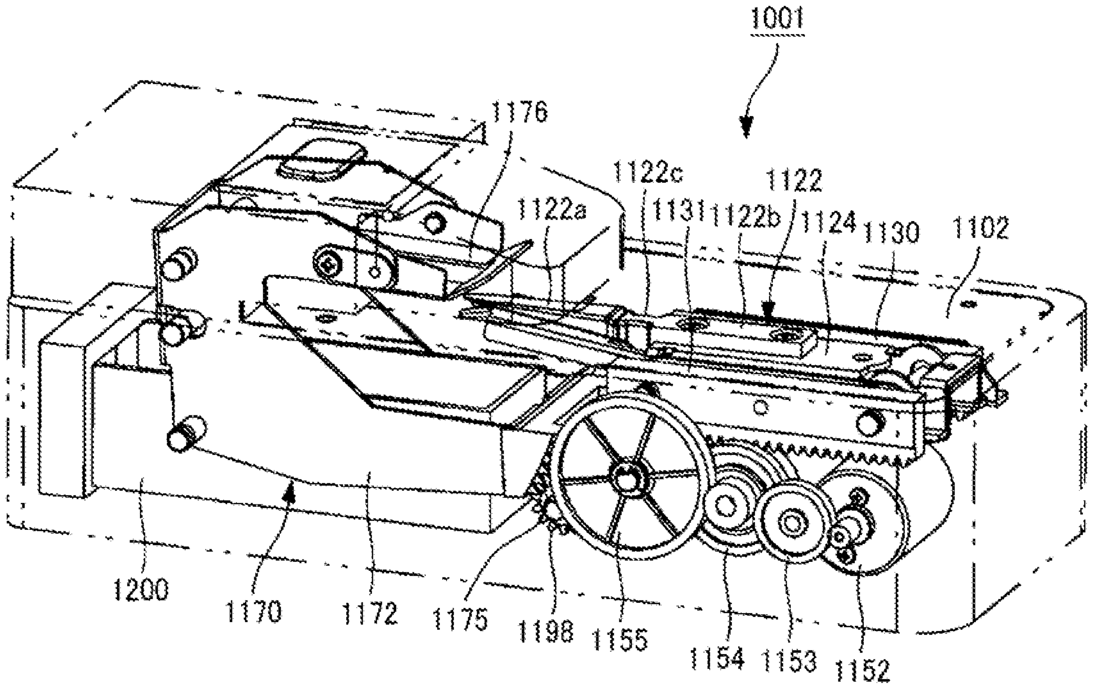
FIG. 43A is a perspective view of an inside of the staple removing device according to the modified embodiment 3-1, as seen from the right.
Figure 43B:
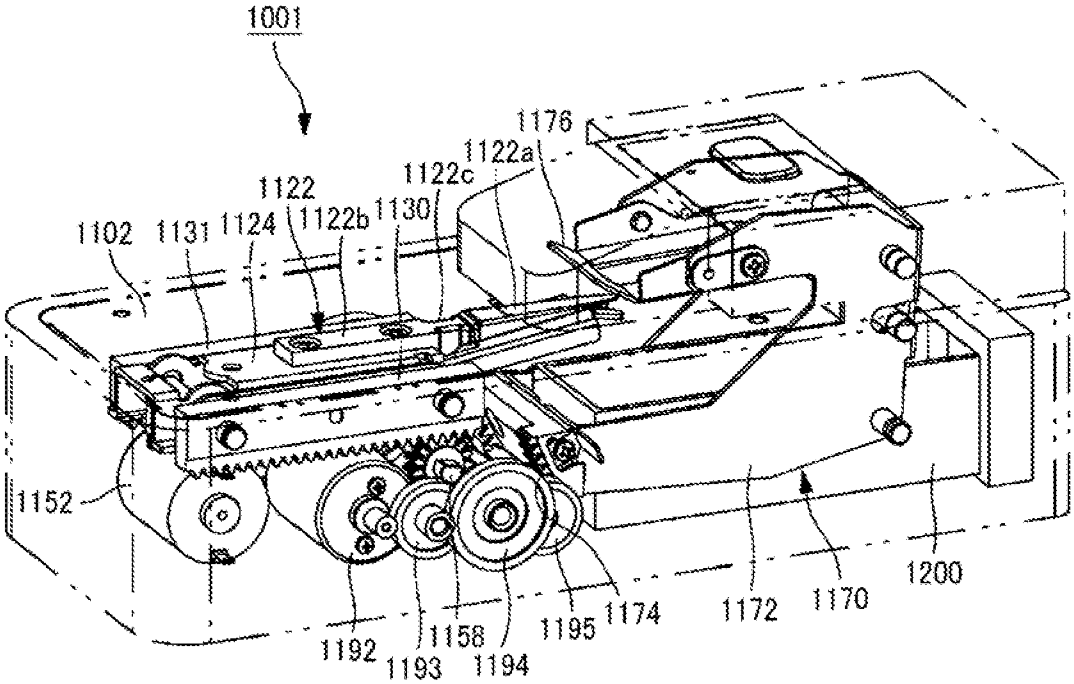
FIG. 43B is a perspective view of the inside of the staple removing device according to the modified embodiment 3-1, as seen from the left.
Figure 44:
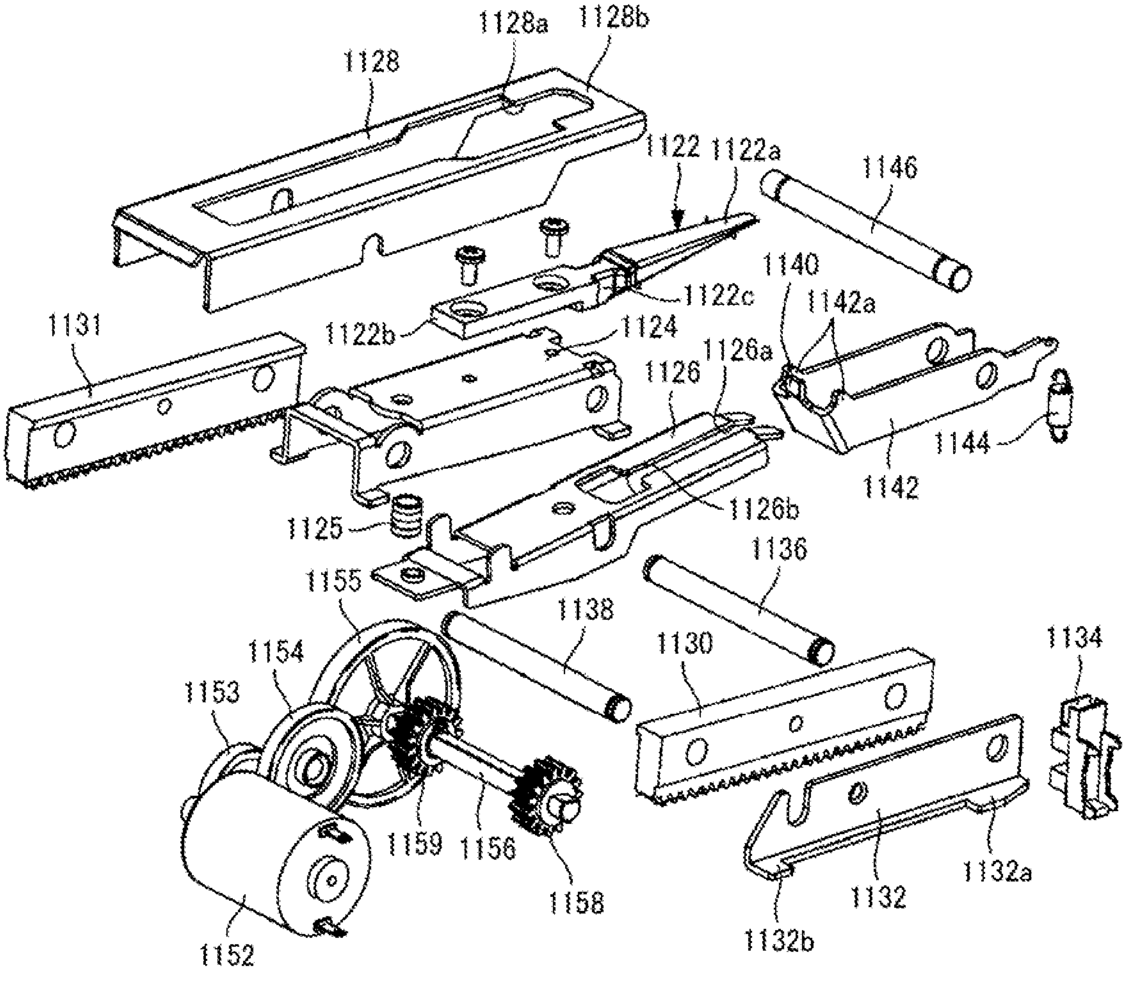
FIG. 44 is an exploded perspective view of a removing part and surrounding components thereof according to the modified embodiment 3-1.
Figure 45A:
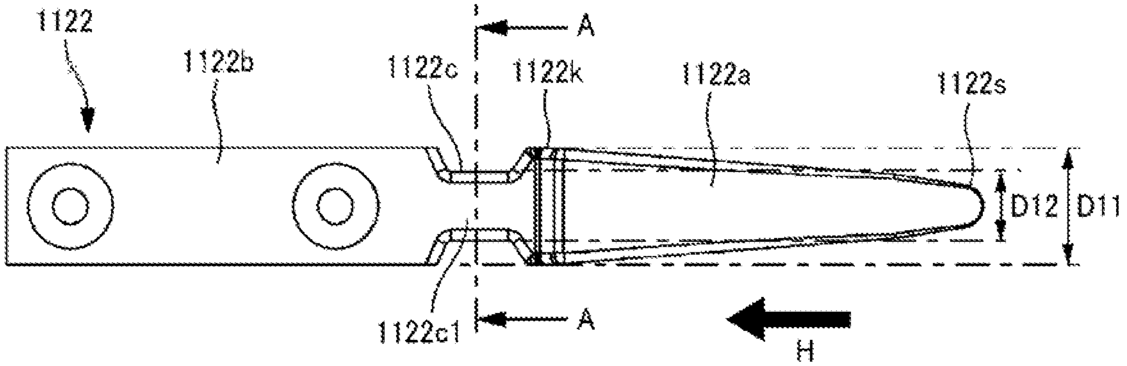
FIG. 45A is a plan view of the removing part according to the modified embodiment 3-1.
Figure 45B:
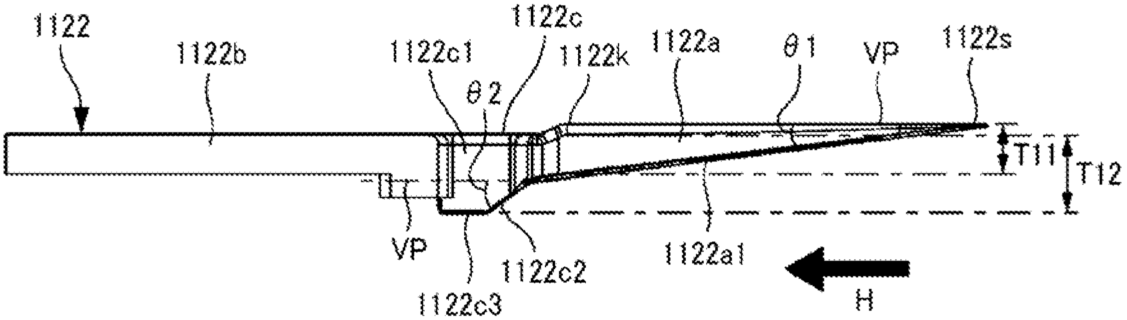
FIG. 45B is a side view of the removing part according to the modified embodiment 3-1.
Figure 45C:
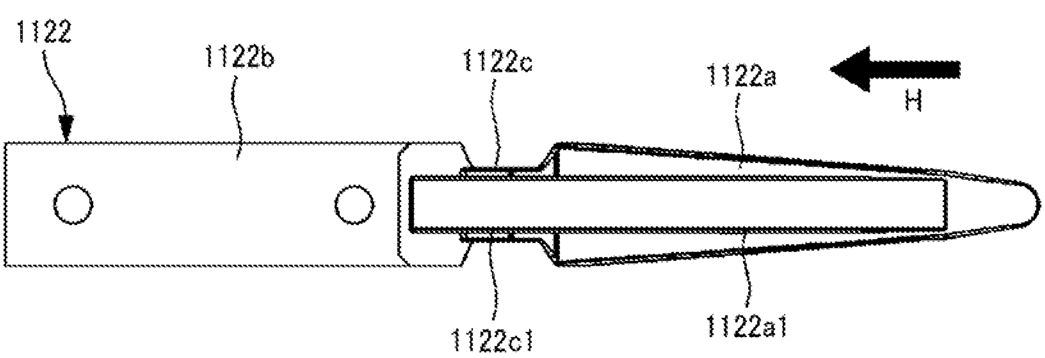
FIG. 45C is a bottom view of the removing part according to the modified embodiment 3-1.
Figure 45D:
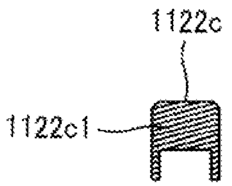
FIG. 45D is a cross-sectional view taken along an A-A line of the removing part shown in FIG. 45A.

FIG. 42A is a front perspective view of a staple removing device 1001, and FIG. 42B is a rear perspective view of the staple removing device 1001. In addition, FIG. 43A is a perspective view of an inside of the staple removing device 1001, as seen from the right, and FIG. 43B is a perspective view of the inside of the staple removing device 1001, as seen from the left. FIG. 44 is an exploded perspective view of a removing part 1122 and surrounding components thereof. FIG. 45A is a plan view of the removing part 1122, FIG. 45B is a side view of the removing part 1122, FIG. 45C is a bottom view of the removing part, and FIG. 45D is a cross-sectional view taken along an A-A line of the removing part 1122 shown in FIG. 46A.

The staple removing device 1001 is a device for automatically removing a staple from a sheet bundle bound by the staple, and as shown in FIGS. 42A to 42B and 43A to 43B, includes a housing 1100 having a substantially cuboid shape, a placing part 1102 on which a sheet bundle bound by a staple having a crown portion and leg portions can be placed with the crown portion facing downward, a removing part 1122 located below the sheet bundle (inside the housing 1100 with respect to the placing part 1102) in a state of the sheet bundle being placed on the placing part 1102 and configured to be insertable between the crown portion and the sheet bundle and to remove the staple from the sheet bundle by being inserted between the crown portion and the sheet bundle, and an accommodation part 1200 located below the removing part 1122 and configured to accommodate the removed staple.

A cover part 1104 configured to cover a part of the placing part 1102 is provided above the placing part 1102 (a side on which the sheet bundle is placed with respect to the placing part 1102). A predetermined gap (sheet bundle insertion opening) 1108 is formed between the cover part 1104 and the placing part 1102, and the sheet bundle is inserted (set) into the gap. A start switch 1106 for operating the staple removal device 1001 is provided on an upper surface of the cover part 1104. Note that, in the present embodiment, a side on which the accommodation part 1200 is provided is referred to as a rear side of the staple removing device 1001, and an opposite side is referred to as a front side of the staple removing device 1001.

The housing 1100 is a substantially cuboid box body whose upper side is open, and is provided therein with the removing part 1120, the accommodation part 1200, and the like.

The placing part 1102 is provided to cover the upper opening of the housing 1100, and has a placing surface 1102*a* for placing a sheet bundle. The placing surface 1102*a* is formed with an opening portion 1102*b* so that a portion of the removing part 1120 can protrude.

The accommodation part 1200 is a box body whose upper side is open, and is configured to be insertable/removable with respect to an opening portion 1100*a* formed on a rear end surface of the housing 1100.

The removing part 1122 includes a wedge plate (first inclined part) 1122*a* inserted between the sheet bundle P and the crown portion Sa to remove the staple S from the sheet bundle P, an attaching portion 1122*b* attached to a plate holder 1124, and a staple drop portion 1122*c* located between the wedge plate 1122*a* and the plate holder 1124 and provided for dropping the staple S removed from the sheet bundle P by the wedge plate 1122*a* into the accommodation part 1200.

As shown in FIGS. 45A and 45B, the wedge plate 1122*a* includes a tip end portion 1122*s* and a base end portion 1122*k*, and is formed to continuously increase in thickness in a first direction H from the tip end portion 1122*s* toward the base end portion 1122*k*. In the form of the present modified embodiment, a thickness T11 of the base end portion of the wedge plate 1122*a* is formed to be thickest in the wedge plate 1122*a*. The thickness T11 is preferably equal to or greater than a length of the leg portion Sb of the staple S.

In addition, when the wedge plate 1122*a* is seen in plan view (from above), a width of the wedge plate 1122*a* is formed in a tapered shape from the base end portion 1122*k* toward the tip end portion 1122*s*. That is, the width of the wedge plate 1122*a* is formed to be gradually narrow from the base end portion 1122*k* toward the tip end portion 1122*s*. In the form of the present modified embodiment, a width D11 of the base end portion of the wedge plate 1122*a* is the widest in the wedge plate 1122*a*, and has a dimension equal to or close to a width of the crown portion Sa.

By forming the shape of the wedge plate 1122*a* in a thickness direction and a width direction into a wedge shape, as described above, when the wedge plate 1122*a* is inserted between the sheet bundle P and the staple S and advances, the staple S is removed from the sheet bundle P.

The staple drop portion 1122*c* is located downstream of the wedge plate 1122*a* with respect to the first direction H. Specifically, the staple drop portion 1122*c* is provided between the wedge plate 1122*a* and the attaching portion 1122*b* with one end portion (a tip end portion of the staple drop portion 1122*c*) being continuous with the base end portion of the wedge plate 1122*a* and the other end portion (a base end portion of the staple drop portion 1122*c*) being continuous with the tip end portion of the attaching portion 1122*b*. The staple drop portion 1122*c* has a narrow portion 1122*c*1 having a width D12 narrower than the width D11 of the base end portion of the wedge plate 1122*a*, i.e., the maximum width D11 of the wedge plate 1122*a*. In the form of the present modified embodiment, as shown in FIG. 45C, the width of the narrow portion 1122*c*1 is formed to be the same or substantially the same width D12 from the uppermost portion to the lowermost portion in the thickness direction. Therefore, when the entire removing part 1122 is seen in plan view, a portion corresponding to the staple drop portion 1122*c* constitutes a concave portion of the removing part 1122. In this way, by forming the width of the staple drop portion 1122*c* to be narrower than the maximum width D11 of the wedge plate 1122*a*, the staple S held and engaged to the wedge plate 1122*a* separates and drops at the time of being located at the staple drop portion 1122*c* while the wedge plate 1122*a* moves. In order to more securely drop the staple S to the staple drop portion 1122*c*, the width D12 of the narrow portion 1122*c*1 is preferably set narrower than an interval D13 (refer to FIG. 48E) between the pair of leg portions Sb and Sb of the staple S removed from the sheet bundle P by the wedge plate 1122*a*.

The staple drop portion 1122*c* may have an inclination 1122*c*2 formed to be continuous with a lower surface of the base end portion of the wedge plate 1122*a* and to increase in thickness in the first direction H. By providing the staple drop portion 1122*c* with the inclination 1122*c*2, the staple S removed from the sheet bundle P can be more easily dropped into the accommodation part 1200.

In the form of the present modified embodiment, as shown in FIG. 45B, when a plane parallel to the upper surface of the wedge plate 1122*a* is referred to as a virtual plane (horizontal plane) VP, the inclination 1122*c*2 of the staple drop portion 1122*c* with respect to the virtual plane VP is greater than an inclination 1122*a*1 of the wedge plate 1122*a* with respect to the virtual plane VP. In other words, an angle θ2 formed between the virtual plane VP and the inclination 1122*c*2 is configured to be larger than an angle θ1 formed between the virtual plane VP and the inclination **1122*a*1 of the wedge plate 1122*a*. The reason is described, as follows. When the wedge plate 1122*a* is inserted between the crown portion Sa and the sheet bundle P and advances, the leg portions Sb of the staple S are raised by the inclination 1122*a*1 of the wedge plate 1122*a*, and then, the staple S is gradually pulled out from the sheet bundle P. When the staple S reaches the vicinity of the base end portion of the wedge plate 1122*a*, the leg portions Sb of the staple S are completely pulled out from the sheet bundle P, or is in a state immediately before being pulled out. During the series of operations, a large load is applied to the wedge plate 1122*a*. In contrast, at a time point when the staple S is located at the staple drop portion 1122*c*, the leg portions Sb of the staple S have already been pulled out from the sheet bundle P or is in a state immediately before being pulled out, so that the load received by the staple drop portion 1122*c* is smaller than the load received by the wedge plate 1122*a*. Therefore, the inclination 1122*a*1 of the wedge plate 1122*a* to which a large load is applied is set small so that the load is gradually applied to the wedge plate 1122*a* and the inclination 1122*c*2 of the staple drop portion 1122*c* to which a large load is not applied is set large, so that the staple S is securely guided downward and a length of the staple drop portion 1122*c*** in the front and rear direction is shortened.

As shown in FIG. 44, the plate holder 1124 is constituted by a flat plate having a substantially U-shaped section, has an upper surface to which the attaching portion **1122*b* is attached, and is arranged overlapped over the crown holder 1126**.

The crown holder 1126 is arranged below the wedge plate **1122*a* with the plate holder 1124 being interposed therebetween, and is configured to support the crown portion Sa of the staple S removed from the sheet bundle P. The crown holder 1126 has a groove portion 1126*a* for preventing contact with the pressing portion 1140 when the removing part 1122 advances, and an opening portion 1126*b* for dropping the staple S removed from the sheet bundle P into the accommodation part 1200. The opening portion 1126*b* of the crown holder 1126 and the staple drop portion 1122*c* of the removing part 1122 attached to the plate holder 1124 are arranged to be at the same position, in plan view. The groove portion 1126*a* is cut out from a tip end portion to a substantially central portion of the crown holder 1126, and has a width slightly wider than a width of the pressing portion 1140. The opening portion 1126*b* is formed at a substantially central portion in the longitudinal direction of the crown holder 1126 and continuously on a base end-side of the groove portion 1126*a***, and has a width wider than, for example, a length of the crown portion Sa of the staple S.

A spring 1125 is arranged between a lower surface on the other end-side of the plate holder 1124 and an upper surface on the other end-side of the crown holder 1126, and one end-side (tip end-side) of the removing part 1122 and one end-side (tip end-side) of the crown holder 1126 are urged in a direction of coming close to each other by an elastic force of the spring 1125.

The holder 1128 is constituted by a flat plate having a substantially U-shaped section, and is arranged overlapped on the upper surface of the plate holder 1124. The holder 1128 includes an opening portion **1128*a* for exposing the removing part 1122, and a support portion 1128*b* configured to regulate the pressing portion 1140 to be located below the tip end portion 1122*s* of the wedge plate 1122*a* at least when the removing part 1122 is stopped at the standby position L1 (a position where the removing part 1122** is stopped before starting a removing operation).

As shown in FIGS. 43B and 44, on the left side of the plate holder 1124, a plate-shaped rack 1130 having substantially the same length as the longitudinal direction of the plate holder 1124 is arranged. The rack 1130 is configured to receive a drive force of a first motor 1152. A lower surface of the rack 1130 is formed with a plurality of teeth in mesh with a pinion 1158, which will be described later.

As shown in FIGS. 43A and 44, on the right side of the plate holder 1124, a plate-shaped rack 1131 having substantially the same length as the longitudinal direction of the plate holder 1124 is arranged. The rack 1131 is configured to receive a drive force of the first motor 1152. A lower surface of the rack 1131 is formed with a plurality of teeth in mesh with a pinion 1159, which will be described later.

On the left side of the rack 1130, a sensor 1134 configured to detect a position of the removing part 1122 and a flag attaching plate 1132 for detecting a position of the removing part 1122 in the front and rear direction are provided. A rear end portion of the flag attaching plate 1132 is provided with a first flag **1132*a* for detecting movement of the wedge plate 1122*a* from the standby position L1 to the removal position (a position where the removing part 1122 starts a removing operation and is inserted between the crown portion Sa of the staple S and the sheet bundle P, and the staple S is removed from the sheet bundle P) L2. A front end portion of the flag attaching plate 1132 is provided with a second flag 1132*b* for detecting arrival of the wedge plate 1122*a* at the removal position L2. The sensor 1134 is constituted by a transmission-type sensor and is configured to detect the first flag 1132*a* and the second flag 1132*b* of the flag attaching plate 1132 moving in the front and rear direction. A detection signal detected by the sensor 1134 is supplied to a control unit (not shown), and the control unit is configured to control operations of the first motor 1152 and a second motor 1192, based on the detection signal supplied from the sensor 1134**.

A first drive shaft 1136 is inserted into opening portions formed in each of the flag attaching plate 1132, the rack 1130, the plate holder 1124, the crown holder 1126 and the rack 1131 from the left side toward the right side of the housing 1100.

A second drive shaft 1138 is inserted into opening portions formed in each of the flag attaching plate 1132, the rack 1130, the plate holder 1124 and the rack 1131 from the left side toward the right side of the housing 1100.

The pressing portion 1140 configured to restrict movement of the sheet bundle P and the staple S in an insertion direction is arranged behind the crown portion Sa located at the removal position L2 and is configured to be able to come into contact with the crown portion Sa pushed by the wedge plate **1122*a*. A width of the pressing portion 1140 is selected to be, for example, a length in which it can support the crown portion Sa moving rearward from the front by a pushing force of the wedge plate 1122*a* and can be inserted into the groove portion 1126*a* of the crown holder 1126**.

A pressing holder 1142 configured to support the pressing portion 1140 is constituted by a flat plate processed into a substantial U-shape in plan view, and a rear end-side of the pressing holder 1142 is rotatably supported by a shaft 1146. One end portion of a tension spring 1144 is attached to the further rear of the pressing holder 1142 than the shaft 1146. The other end portion of the tension spring 1144 is attached to a frame (not shown). An upper end portion on the rear side of the pressing holder 1142 is provided with a convex portion **1142*a* capable of coming into contact with the support portion 1128*b* of the holder 1128**.

The first motor 1152 is constituted by, for example, a DC motor, a DC brushless motor, or the like. The first motor 1152 is configured to drive based on an instruction from the control unit (not shown), thereby transmitting a drive force of the first motor 1152 to the removing part 1120 via a speed reduction mechanism such as gears 1153, 1154 and 1155 and moving the removing part 1120 forward or rearward.

A sheet pressing part 1170 is configured to press the sheet bundle P placed on the placing part 1102, and as shown in FIG. 43A to 43B, at least a part thereof is located above the placing part 1102 and is configured to be movable toward the placing part 1102. The sheet pressing part 1170 is configured to drive by the second motor 192.

The sheet pressing part 1170 includes a sheet pressing plate 1176 configured to press the sheet bundle P placed on the placing part 1102, a hold lever 1172 configured to support the sheet pressing plate 1176, and a pair of sheet pressing racks 1174 and 1175 attached to the hold lever 1172.

The hold lever 1172 is arranged on a rear side of the housing 1100, and an upper side thereof is arranged to be exposed from the placing part 1102 and is covered with the cover part 1104.

The sheet pressing racks 1174 and 1175 are provided at a lower front end portion of the hold lever 1172. The sheet pressing racks 1174 and 1175 have a substantial fan shape and are in mesh with sheet pressing pinions 1198 and 1199. The sheet pressing racks 1174 and 1175 are configured to convert rotational motions of the sheet pressing pinions 1198 and 1199 into substantially linear motions.

The sheet pressing plate 1176 is configured to move toward the placing surface 1102*a* so that the sheet bundle P does not deviate from the removal position L2 of the placing part 1102 during a removing operation of the staple S, thereby pressing against the sheet bundle P placed on the placing part 1102 The sheet pressing plate 1176 is attached to the hold lever 1172 so as to be parallel to or substantially parallel to the placing part 1102.

The second motor 1192 is constituted by, for example, a DC motor, a DC brushless motor, or the like. The second motor 1192 is configured to drive based on an instruction from the control unit (not shown), thereby transmitting a drive force of the second motor 1192 to the sheet pressing part 1170 via the speed reduction mechanism such as gears 1193, 1194 and 1195 and operating the sheet pressing part 1170.

Operation Example of Staple Removing Device 1

Next, an operation and the like of the staple removing device 1001 that is performed when removing the staple S from the sheet bundle P are described.

Figure 46A:
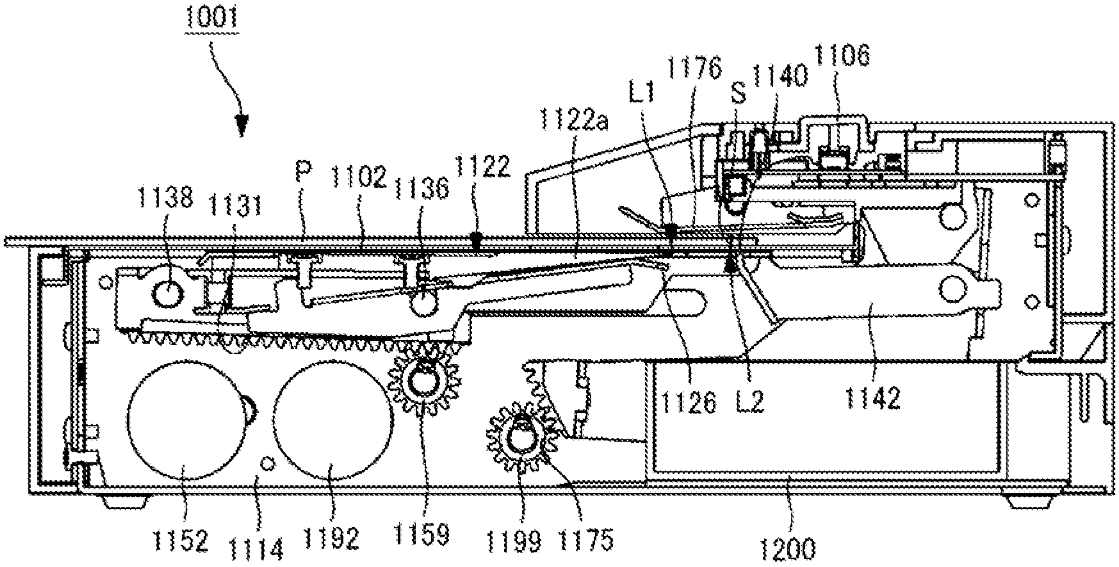
FIG. 46A is a side view showing an operation of the staple removing device.
Figure 46B:
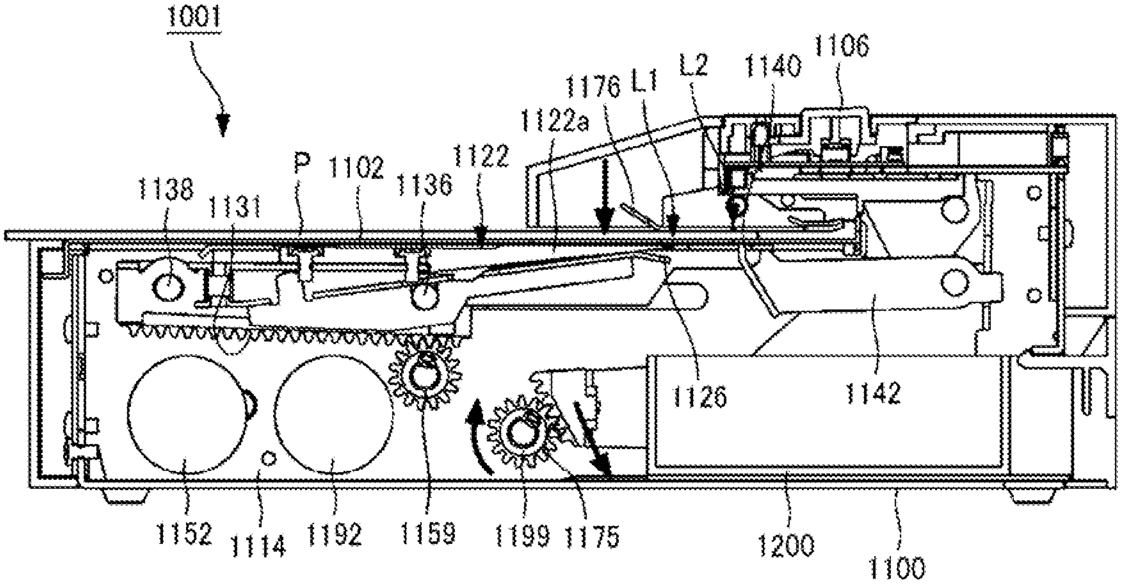
FIG. 46B is a side view showing the operation of the staple removing device.
Figure 46C:
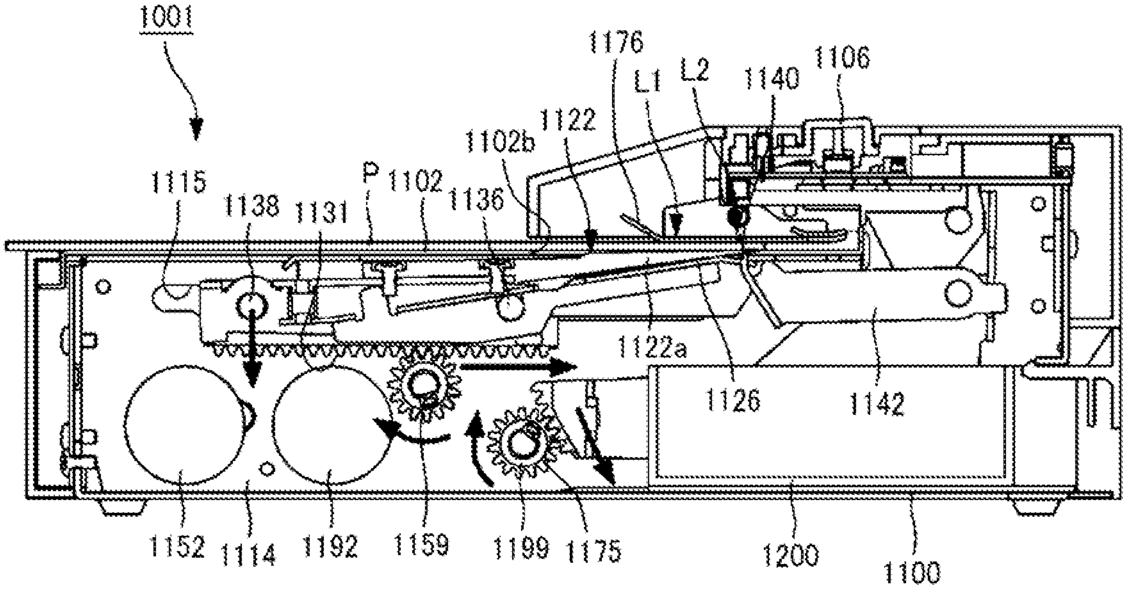
FIG. 46C is a side view showing the operation of the staple removing device.
Figure 46D:
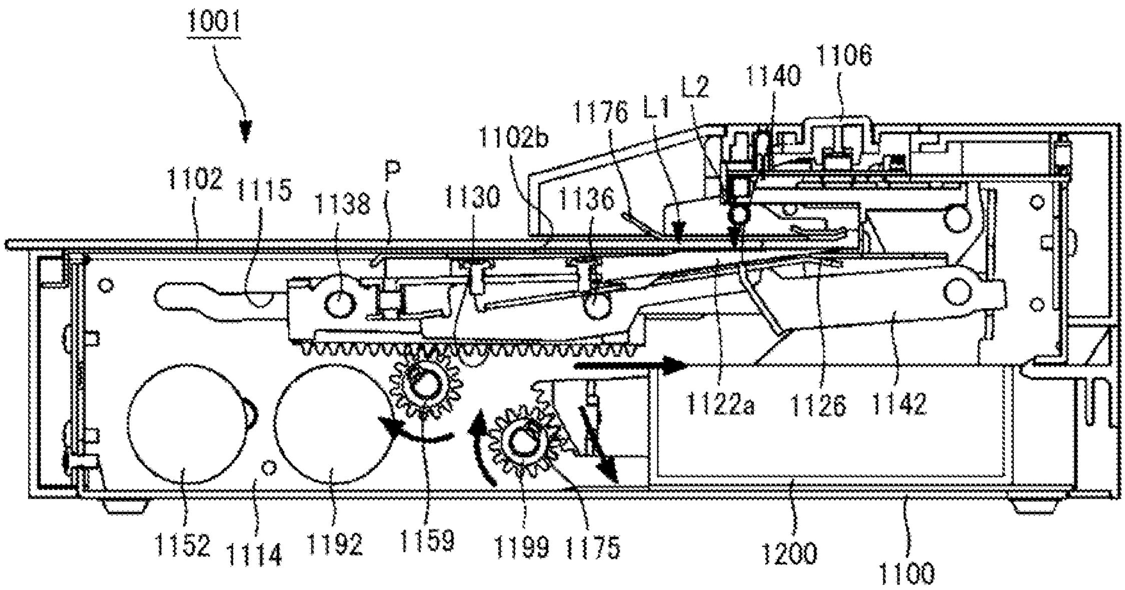
FIG. 46D is a side view showing the operation of the staple removing device.
Figure 46E:
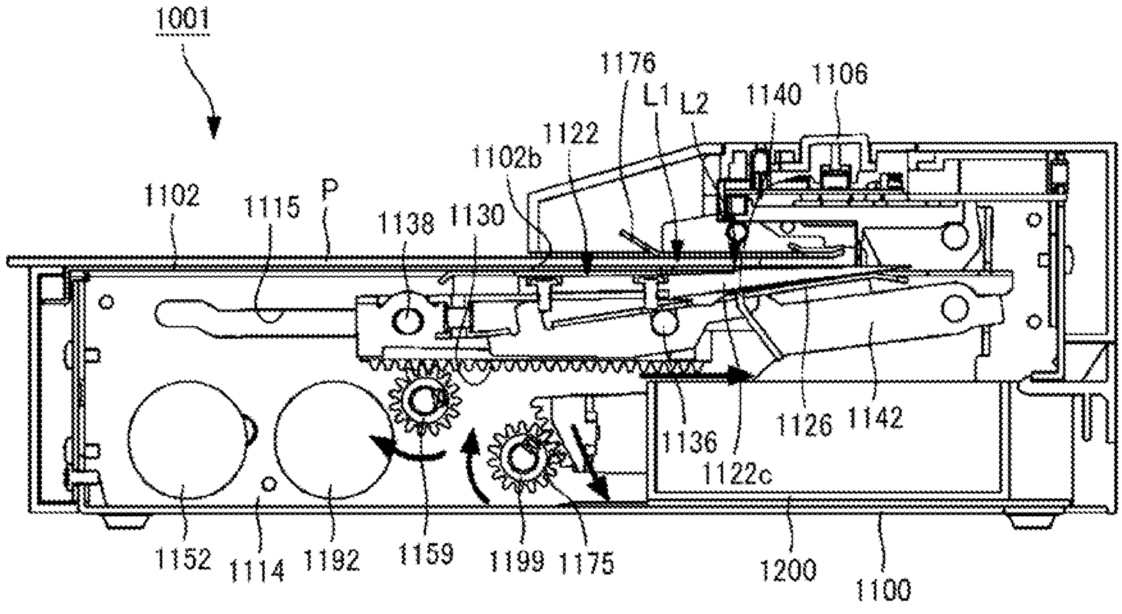
FIG. 46E is a side view showing the operation of the staple removing device.
Figure 46F:
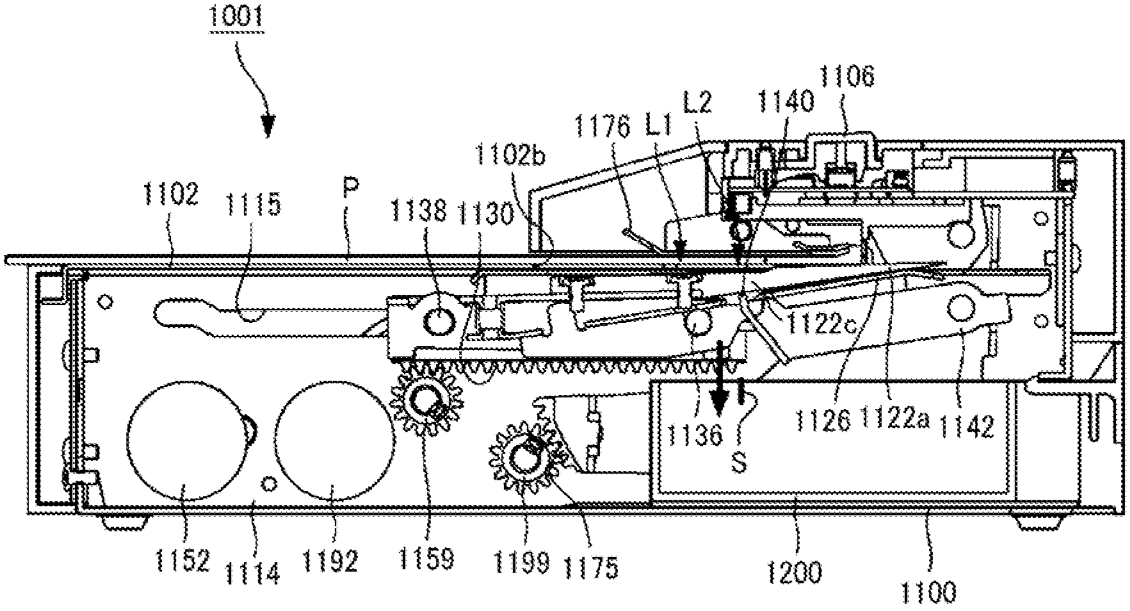
FIG. 46F is a side view showing the operation of the staple removing device.
Figure 46G:
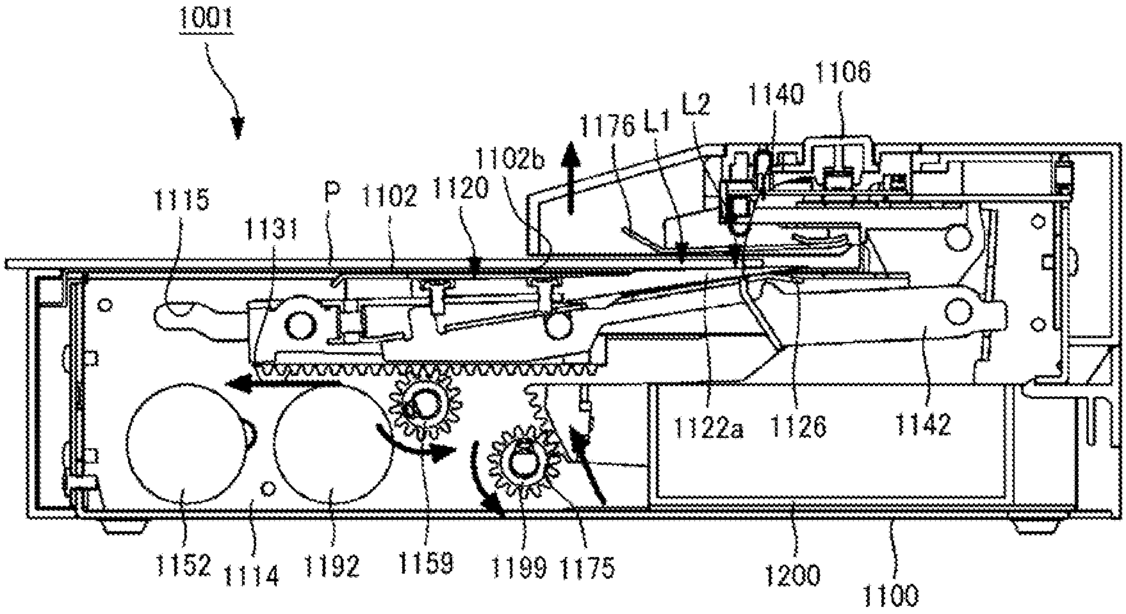
FIG. 46G is a side view showing the operation of the staple removing device.

FIGS. 46A and 46G are side views showing an example of an operation of the staple removing device 1001 that is performed when removing the staple S from the sheet bundle P. FIGS. 47A to 47E are perspective views showing operations of the wedge plate 1122*a* and the staple S when removing the staple S from the sheet bundle P. FIGS. 48A to 48E show states of the wedge plate 1122*a* and the staple S when removing the staple S from the sheet bundle P.

As shown in FIG. 46A, when removing the staple S from the sheet bundle P, first, the sheet bundle P bound by the staple S is placed on the placing surface 1102*a* with a binding part being inserted into the sheet bundle insertion opening 1108 (at this time, the binding part is aligned at a predetermined position). At this time, the user places the sheet bundle P with aligning the sheet bundle P with a mark indicating the removal position L2 provided on the placing surface 1102*a*.

Next, when the user pushes the start switch 1106 of the staple removing device 1001, the second motor 1192 is driven, and as shown in FIG. 46B, the sheet pressing plate 1176 moves (descends) in the direction toward the placing part 1102 When the sheet pressing plate 1176 moves to a predetermined position, the sheet bundle P is pressed with a certain pressing force by the sheet pressing plate 1176.

Subsequently, after a predetermined time has elapsed from the start of driving of the second motor 1192, the first motor 1152 is driven and the pinion 1159 rotates in the clockwise direction. When the pinion 1159 rotates, the removing part 1120 including the rack 1131 and the wedge plate 1122*a* advances (moves rearward from the front with respect to the housing 1100).

When the removing part 120 advances, the second drive shaft 1138 of the removing part 1120 moves along the guide groove 1115. Therefore, as shown in FIG. 46C, the tip end portion of the removing part 1122, i.e., the tip end portion 1122*s* of the wedge plate 1122*a* protrudes from the placing surface 1102*a* via the opening portion 1102*b* of the placing part 1102. The removing part 1122 advances while its upper surface is in contact with the back surface of the lowermost sheet of the sheet bundle P.

When the tip end portion of the removing part 1122 moves to the removal position L2, the wedge plate 1122*a* is inserted between the crown portion Sa and the sheet bundle P, as shown in FIG. 46C. When the wedge plate 1122*a* further advances, the convex portion 1142*a* of the pressing holder 1142 separates from the support portion 1128*b* of the holder 1128. Thereby, the pressing portion 1140 ascends due to the urging of the tension spring 1144, and comes into contact with the crown portion Sa of the sheet bundle P moving rearward from the front by the pushing force of the wedge plate 1122*a*, thereby restricting the forward movement of the staple S.

Figure 47A:
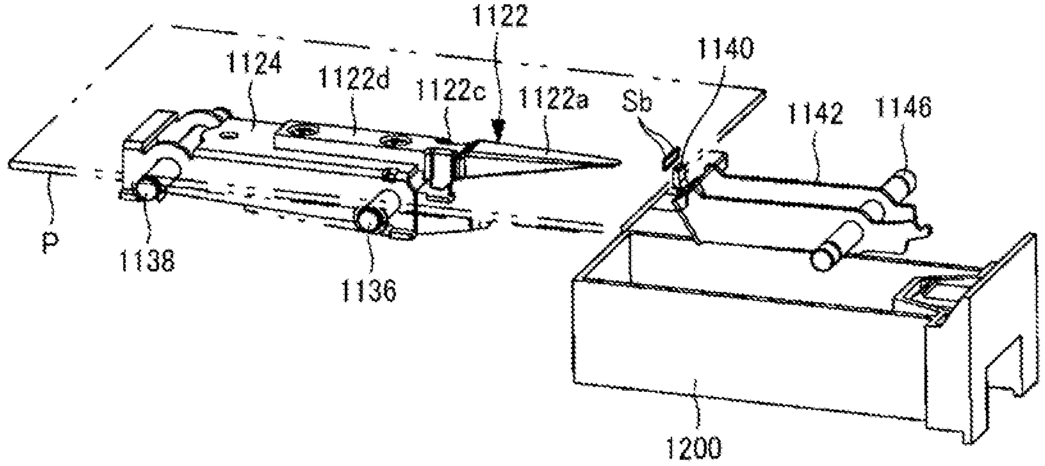
FIG. 47A is a perspective view showing operations of the wedge plate and the staple.
Figure 47B:
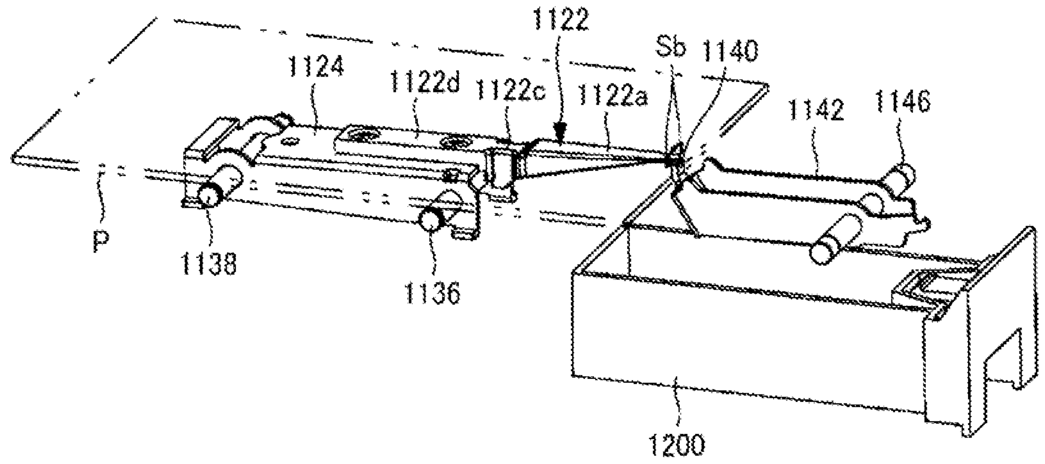
FIG. 47B is a perspective view showing an operation of the removing part.
Figure 47C:
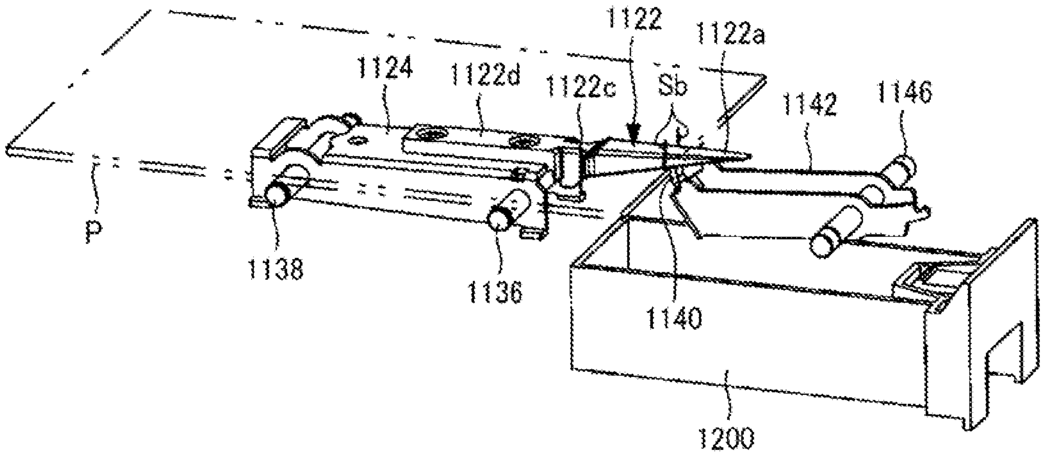
Figure 47D:
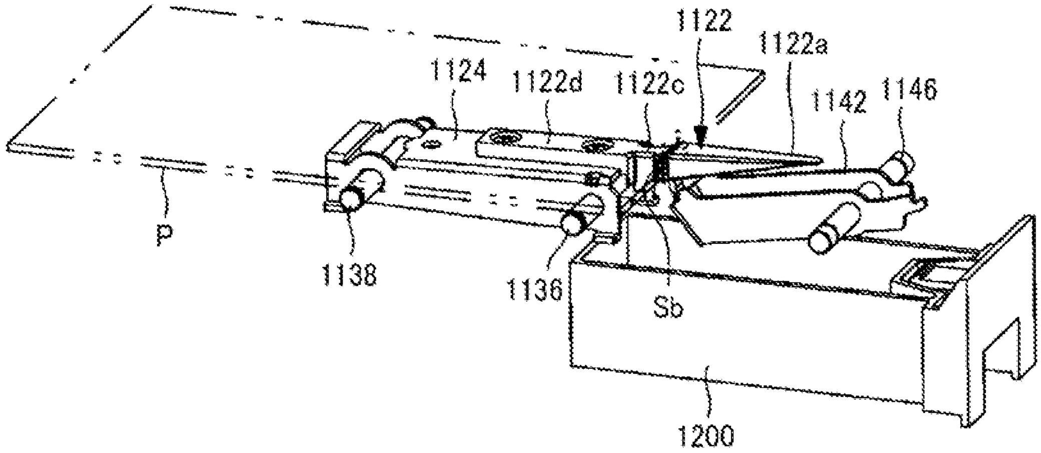
Figure 47E:
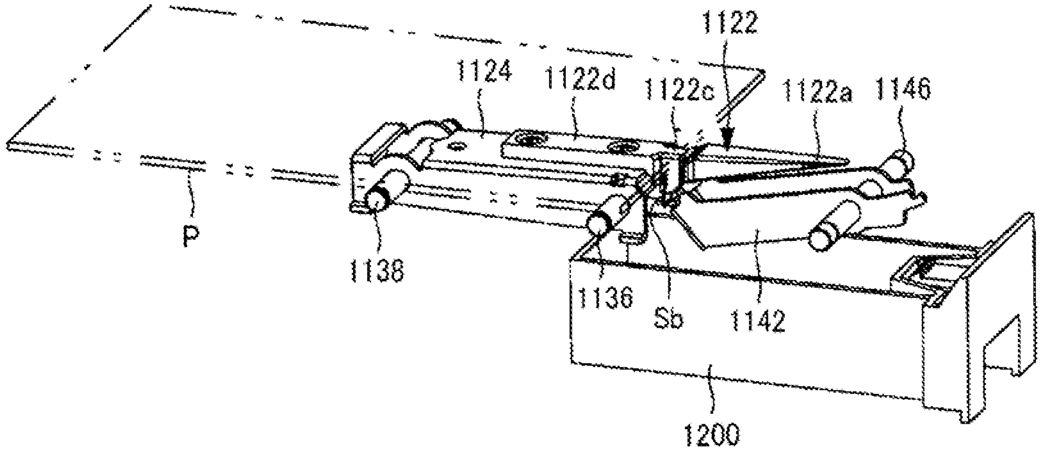
Figure 48A:
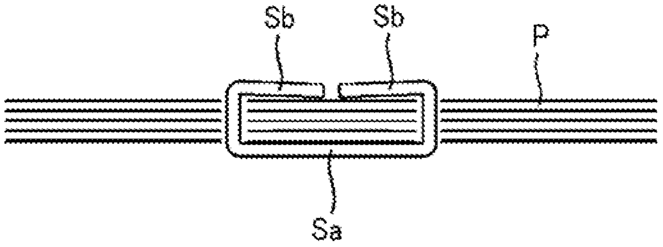
Figure 48B:
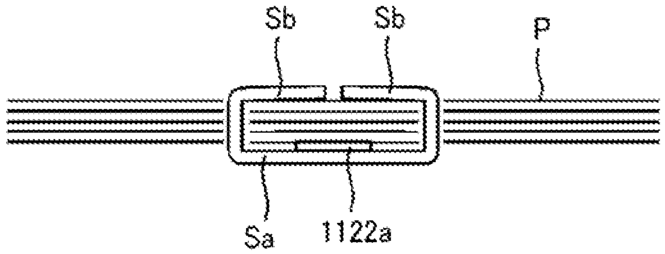
Figure 48C:
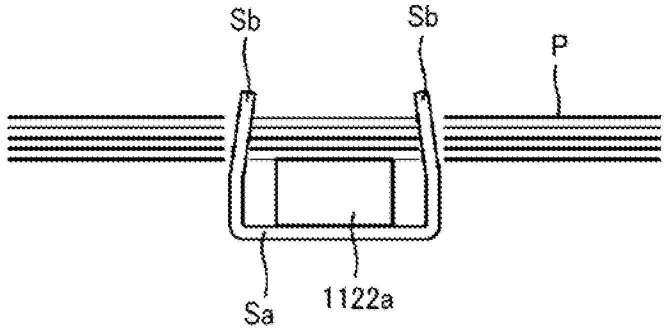
Figure 48D:
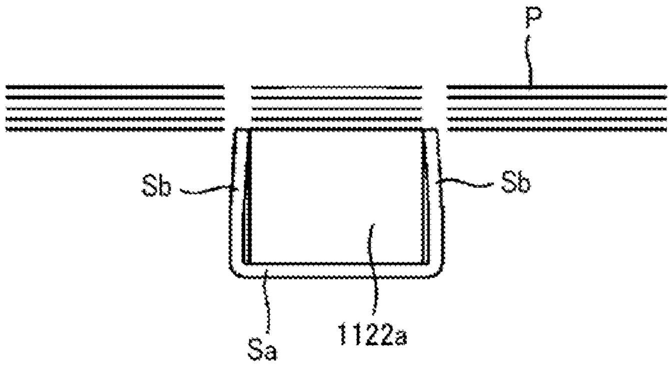
Figure 48E:
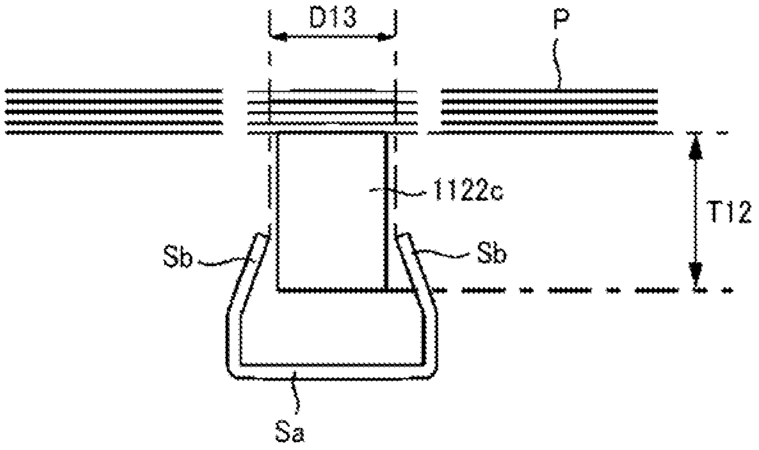

When the tip end portion of the wedge plate 1122*a* passes through the removal position L2 and further advances, as shown in FIG. 46D, a thickness, in side view, of the wedge plate 1122*a* inserted between the sheet bundle P and the crown portion Sa at the removal position L2 becomes thicker, so that the staple is gradually pulled out from the sheet bundle P. The pressing portion 1140 is moved down by extension of the tension spring 1144, following the thickness direction of the wedge plate 1122*a* in a state of being in contact with the wedge plate 1122*a* and the crown portion Sa. Thereby, as shown in FIGS. 47C and 48C, the crown portion Sa is pushed in a direction away from the sheet bundle P by the wedge plate 1122*a*, and the leg portions Sb and Sb of the staple S bent inwardly are raised to be substantially orthogonal to the sheet surface of the sheet bundle P. As shown in FIG. 46E, when the thickness, in side view, of the wedge plate 1122*a* at the removal position L2 becomes further thicker, the leg portions Sb and Sb of the staple S are pulled out from the sheet bundle P, as shown in FIGS. 47D and 48D. However, since the leg portions Sb and Sb are caught on the side surface of the wedge plate 1122*a* due to the springback of the staple S, the staple S does not drop at this stage.

As shown in FIG. 46F, when the wedge plate 1122*a* moves to the end position of the movement range, the staple drop portion 1122*c* is located at the removal position L2, and the removed staple S is also located at the staple drop portion 1122*c*. Thereby, the leg portions Sb and Sb of the staple S separate from the side surface of the wedge plate 1122*a*, and the staple S drops into the accommodation part 1200.

As shown in FIG. 46G, when the removal of the staple S from the sheet bundle P is completed, the first motor 1152 reversely rotates and the pinion 1159 also reversely rotates in the counterclockwise direction. When the pinion 1159 reversely rotates, the removing part 1122 moves rearward (moves forward from the rear with respect to the housing 1100) along the placing surface 1102*a*, and the removing part 1120 returns to the standby position L1. Further, after a predetermined time has elapsed from the reverse rotation of the first motor 1152, the second motor 1192 reversely rotates and the sheet pressing pinion 1199 rotates in the counter-clockwise direction, so that the sheet pressing rack 1175 moves substantially upward. When the sheet pressing rack 1175 moves upward, the sheet pressing plate 1176 moves in the direction away from the placing part 1102 via the hold lever 1172 and returns to the standby position.

As described above, according to the modified embodiment 3-1, the staple S removed from the sheet bundle P is located at the staple drop portion 1122*c* by advancing the removing part 1122 (wedge plate 1122*a*). Therefore, the staple S pulled out from the sheet bundle P can be dropped into the accommodation part 1200 without the staple S being held and engaged to the wedge plate 1122*a*. As a result, the staple S can be removed from the sheet bundle P without the user manually removing the staple S from the wedge plate 1122*a* or separately providing a mechanism for dropping the staple S from the wedge plate 1122*a*.

Further, according to the present modified embodiment, since the load received by (inclination 1122*c*2 of) the staple drop portion 1122*c* is smaller than the load received by the inclination 1122*c*2 of the wedge plate 1122*a*, the inclination of the staple drop portion 1122*c* can be set larger than the inclination 1122*a*1 of the wedge plate 1122*a*. Since the length of the staple drop portion 1122*c* in the front and rear direction can be accordingly shortened, it is possible to prevent an entire length (size) of the wedge plate 1122*a* from being increased. Thereby, one staple removing device 1 can handle a removing operation of a plurality of types of staple S, such as a size of the diameter of the staple S and a length of the leg portion Sb.

Modified Embodiment 3-2

A modified embodiment 3-2 is different from the staple drop portion 1122*c* of the modified embodiment 3-1, in that a cross section of a staple drop portion 1222*c* is formed in a tapered shape. Note that, in descriptions below, the same names and reference signs are used for the parts common to the staple removing device 1001 according to the modified embodiment 3-1, and the detailed descriptions thereof are omitted.

Figure 49A:
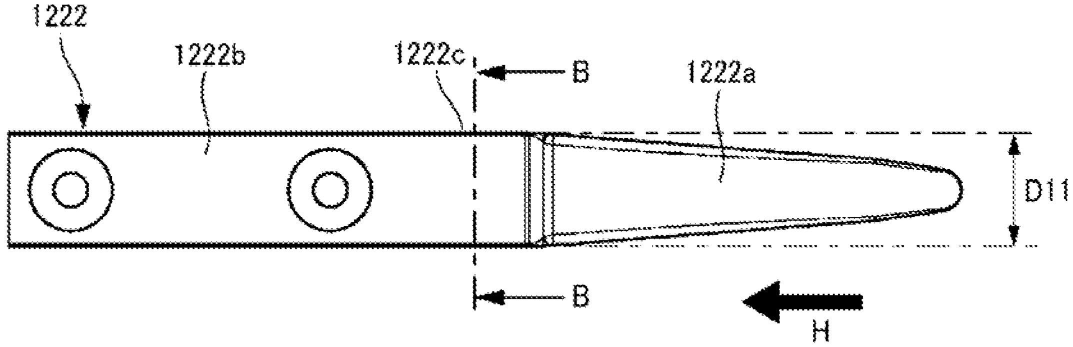
Figure 49B:
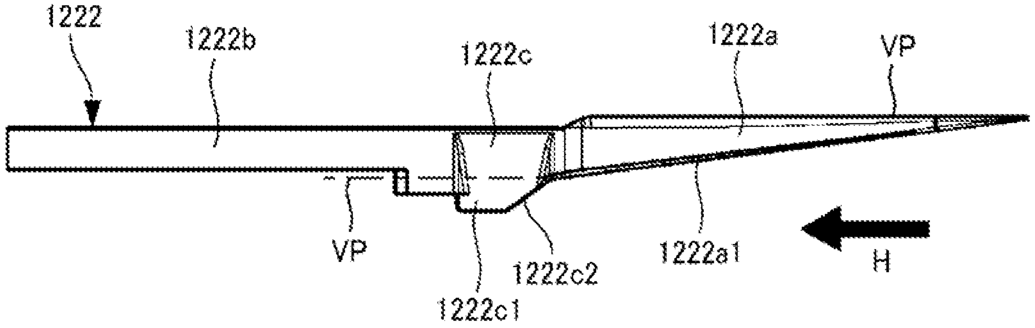
Figure 49C:
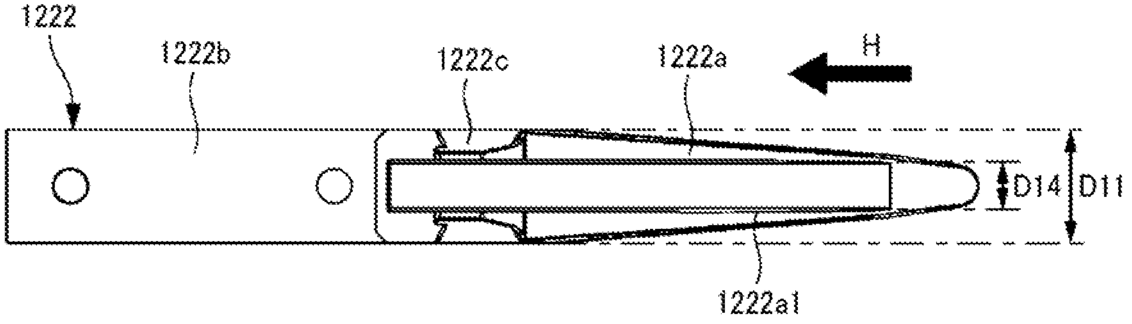
Figure 49D:
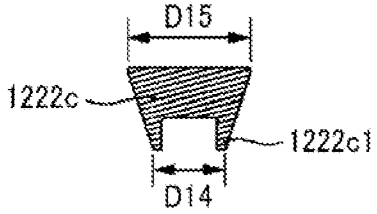

FIG. 49A is a plan view of a removing part 1222 according to the modified embodiment 3-2, FIG. 45B is a side view, FIG. 49C is a bottom view, and FIG. 49D is a cross-sectional view taken along a B-B line of the removing part 1222 shown in FIG. 49A. FIG. 50 shows states of a wedge plate 1222*a* and the staple S when removing the staple S from the sheet bundle P.

As shown in FIGS. 49A to 49C, a removing part (first inclined part) 1222 includes a wedge plate 1222*a* configured to remove the staple S from the sheet bundle P, an attaching portion 1222*b* attached to a plate holder 1124 (refer to FIG. 43A), and a staple drop portion 1222*c* located between the wedge plate 1222*a* and the attaching portion 1222*b* and provided for dropping the staple S removed from the sheet bundle P by the wedge plate 1222*a* into the accommodation part 1200.

The staple drop portion 1222*c* is located downstream of the wedge plate 1222*a* with respect to the first direction H. As shown in FIG. 49C, a width of the staple drop portion 1222*c* is formed to be gradually narrow from the uppermost portion to the lowermost portion in the thickness direction, and left and right side surfaces of the staple drop portion 1222*c* are formed as inclined surfaces. The staple drop portion 1222*c* has a narrow portion 1222*c*1 having a width D14 narrower than the maximum width D11 of the wedge plate 1122*a*. The narrow portion 1222*c*1 is located at least at the lowermost portion of the staple drop portion 1222*c* in the thickness direction of the staple drop portion 1222*c*. An uppermost width D15 of the staple drop portion 1222*c* is the same as or substantially the same as the maximum width D11 of the wedge plate 1222*a*. In addition, as shown in FIG. 49B, the staple drop portion 1222*c* has an inclination 1222*c*2 formed to be continuous with a lower surface of the base end portion of the wedge plate 1222*a* and to increase in thickness in the first direction H. The inclination 1222*c*2 with respect to the virtual plane VP is larger than an inclination 1222*a*1 of the wedge plate 1222*a* with respect to the virtual plane VP.

As described above, the staple drop portion 1222*c* according to the modified embodiment 3-2 is formed in a tapered shape so that the width in the thickness direction becomes gradually narrow from the uppermost portion to the lowermost portion. Therefore, as shown in FIG. 50, the staple S located at the staple drop portion 1222*c* separates from the staple drop portion 1222*c* and drops into the accommodation part 1200.

Modified Embodiment 3-3

A modified embodiment 3-3 is different from the staple drop portion 1122*c* of the modified embodiment 3-1, in that a cross section of a staple drop portion 1322*c* is formed in a substantial T-shape. Note that, the same names and reference signs are used for the parts common to the staple removing device 1001 according to the modified embodiment 3-1, and the detailed descriptions thereof are omitted.

FIG. 51A is a plan view of a removing part 1322 according to the modified embodiment 3-1, FIG. 51B is a side view, FIG. 51C is a bottom view, and FIG. 51D is a cross-sectional view taken along a C-C line of the removing part 1322 shown in FIG. 51A.

As shown in FIGS. 51A and 51B, a removing part 1322 according to the modified embodiment 3-1) includes a wedge plate 1322*a* configured to remove the staple S from the sheet bundle P, an attaching portion 1322*b* attached to a plate holder 1124 (refer to FIG. 2A), and a staple drop portion 1322*c* located between the wedge plate 1322*a* and the attaching portion 1322*b* and provided for dropping the staple S removed from the sheet bundle P by the wedge plate 1322*a* into the accommodation part 1200.

As shown in FIG. 51C, the staple drop portion 1322*c* is located downstream of the wedge plate 1322*a* with respect to the first direction H, and is formed so that a width thereof becomes stepwise narrow from the uppermost portion to the lowermost portion in the thickness direction (two steps, in the present embodiment. However, the present invention is not limited thereto, and the width may also be narrowed in three or more steps (may be formed in a step shape)). More specifically, the staple drop portion 1322*c* has a substantially T-shaped section, and has an uppermost portion constituted by a wide portion 1322*c*4 having the greatest width and a narrow portion 1322*c*5 having a width narrower than the wide portion 1322*c*4 from the vicinity of the uppermost portion to the lowermost portion. A width D16 of the narrow portion 1322*c*5 is at least narrower than a distance D13

(refer to FIG. 48E) between the leg portions Sb and Sb of the staple S removed from the sheet bundle P. A width D17 of the wide portion 1322*c*4 is the same as or substantially the same as the maximum width D11 of the wedge plate 1222*a*. In addition, the staple drop portion 1322*c* has an inclination 1322*c*2 formed to be continuous with a lower surface of a base end portion of the wedge plate 1322*a* and to increase in thickness in the first direction H. The inclination 1322*c*2 with respect to the virtual plane VP is larger than an inclination 1322*a*1 of the wedge plate 1322*a* with respect to the virtual plane VP.

As described above, the staple drop portion 1322*c* according to the modified embodiment 3-1 has a substantially T-shaped cross section. Therefore, the staple S located at the staple drop portion 1222*c* separates from the staple drop portion 1222*c* by the narrow portion 1322*c*5 and drops into the accommodation part 1200.

Modified Embodiment 3-4

A modified embodiment 3-4 is different from the staple drop portion 1122*c* of the modified embodiment 3-1, in that a cross section of a staple drop portion 1422*c* is formed in a curved shape. Note that, the same names and reference signs are used for the parts common to the staple removing device 1001 according to the modified embodiment 3-1, and the detailed descriptions thereof are omitted.

FIG. 52A is a plan view of a removing part 1422 according to the modified embodiment 3-4, FIG. 52B is a side view, FIG. 52C is a bottom view, and FIG. 52D is a cross-sectional view taken along a D-D line of the removing part 1422 shown in FIG. 52A.

As shown in FIGS. 52A to 52C, a removing part 1422 according to the modified embodiment 3-4 includes a wedge plate 1422*a* configured to remove the staple S from the sheet bundle P, an attaching portion 1422*b* attached to a plate holder 1124 (refer to FIG. 43A), and a staple drop portion 1422*c* located between the wedge plate 1422*a* and the attaching portion 1422*b* and provided for dropping the staple S removed from the sheet bundle P by the wedge plate 1422*a* into the accommodation part 1200 (refer to FIG. 44).

The staple drop portion 1422*c* is located downstream of the wedge plate 1422*a* with respect to the first direction H, and is formed so that a width becomes narrow in a curved shape from the uppermost portion to the lowermost portion in the thickness direction. A width D19 of the uppermost portion of the staple drop portion 1422*c* is the same as or substantially the same as the maximum width D11 of the wedge plate 1422*a*, but is formed in a curved shape from the uppermost portion toward the lowermost portion, and a width D18 of a narrow portion 1422*c*1 having the narrowest width is configured to be at least narrower than the distance D13 between the leg portions Sb and Sb of the staple S removed from the sheet bundle P. In addition, the staple drop portion 1422*c* has an inclination 1422*c*2 formed to be continuous with a lower surface of a base end portion of the wedge plate 1422*a* and to increase in thickness in the first direction H. The inclination 1422*c*2 with respect to the virtual plane VP is larger than an inclination 1422*a*1 of the wedge plate 1422*a* with respect to the virtual plane VP.

As described above, the staple drop portion 1422*c* according to the modified embodiment 3-4 is formed so that the width becomes narrow in a curved shape from the uppermost portion to the lowermost portion. Therefore, the staple S located at the staple drop portion 1222*c* separates from the staple drop portion 1222*c* by the narrow portion 1422*c*1 and drops into the accommodation part 1200.

Modified Embodiment 3-5

A modified embodiment 3-5 is different from the staple drop portion 1122*c* of the first embodiment, in that an inclination 1522*c*2 of a staple drop portion 1522*c* is formed to be flush with an inclination 1522*a*1 of a wedge plate 1522*a*. Note that, the same names and reference signs are used for the parts common to the staple removing device 1 according to the modified embodiment 3-1, and the detailed descriptions thereof are omitted.

FIG. 53A is a plan view of a removing part 1522 according to the modified embodiment 3-5, FIG. 53B is a side view, and FIG. 53C is a bottom view.

As shown in FIGS. 53A and 53B, a removing part 1522 according to the modified embodiment 3-5 includes a wedge plate 1522*a* configured to remove the staple S from the sheet bundle P, an attaching portion 1522*b* attached to a plate holder 1124 (refer to FIG. 43A), and a staple drop portion 1522*c* located between the wedge plate 1522*a* and the attaching portion 1522*b* and provided for dropping the staple S removed from the sheet bundle P by the wedge plate 1522*a* into the accommodation part 1200.

The staple drop portion 1522*c* is located downstream of the wedge plate 1522*a* with respect to the first direction H and has an inclination 1522*c*2 formed to continuously increase in thickness in the first direction H. The inclination 1522*c*2 of the staple drop portion 1522*c* is the same as or substantially the same as (continuously) an inclination 1522*a*1 of the wedge plate 1522*a*, and the inclination 1522*c*2 is formed on the same plane as the inclination 1522*a*1 of the wedge plate 1522*a*. In addition, the staple drop portion 1522*c* has a narrow portion 1522*c*1 having a width D20 narrower than the maximum width D11 of the wedge plate 1122*a*. The width D20 of the narrow portion 1522*c*1 is formed narrower than the distance D13 (refer to FIG. 48E) between the pair of leg portions Sb and Sb of the staple S removed from the sheet bundle P by the wedge plate 1522*a*. In addition, the narrow portion 1522*c*1 of the staple drop portion 1522*c* is formed to have the width D20, which is the same or substantially the same from the uppermost portion to the lowermost portion in the thickness direction.

As described above, according to the modified embodiment 3-5, similar to the modified embodiment 3-1, by moving forward the wedge plate 1522*a*, the leg portions Sb and Sb of the staple S is pulled out from the sheet bundle P by the inclination 1522*a*1 of the wedge plate 1522*a* and the staple Sb can be subsequently dropped into the accommodation part 1200 by the staple drop portion 1522*c*. Thereby, the staple S can be removed from the sheet bundle P without adding a mechanism for dropping the staple S from the wedge plate 1522*a*. Further, the inclination 1522*a*1 of the wedge plate 1522*a* and the inclination 1522*cc*1 of the staple drop portion 1522*c* are made to be the same or substantially the same, so that the molding of the removing part 1522 can be facilitated and the cost can be suppressed.

Although the favorable embodiments of the present disclosure have been described in detail with reference to the accompanying drawings, the technical scope of the present disclosure is not limited thereto. The technical spirit that can be led to a variety of changes or modifications within the technical spirit defined in the claims by one skilled in the art of the present disclosure is included within the technical scope of the present disclosure.

For example, the staple removing device 1A or the like according to the above embodiments can be mounted on an image forming apparatus configured to form an image on a sheet. In this case, the staple removing device 1A or the like according to the present embodiment may be arranged at a position adjacent to an operation panel of the image forming apparatus, or may be arranged inside the image forming apparatus or a post-processing apparatus connected to the image forming apparatus.

The technical scope of the present disclosure is not limited to combinations of the embodiments and the modified embodiments described in detail, or combinations of the modified embodiments. The technical spirit that can be conceived by a combination of an embodiment and a modified embodiment not described in detail in the above embodiments or a combination of a plurality of modified embodiments within the technical spirit defined in the claims by one skilled in the art of the present disclosure is included within the technical scope of the present disclosure.

Note that, following aspects are also included within the technical scope of the present disclosure.

(1-1)

A staple removing device including a placing table on which a sheet bundle bound by a staple including a crown portion and a pair of leg portions can be placed with the crown portion facing downward; an inclined part located below the placing table, including a base end portion and a tip end portion, having an inclined surface inclined so as to be thinner from the base end portion toward the tip end portion, the tip end portion being capable of moving from a first position to a third position via a second position along the placing table, and configured to be inserted between the sheet bundle and the staple when the tip end portion moves from the first position to the second position and to start pullout of the staple from the sheet bundle as the tip end portion further moves from the second position toward the third position; a restriction portion located between the second position and the third position, and configured to face the inclined surface, to contact, from the third position-side, the crown portion of the staple pulled out from the sheet bundle by the inclined part and engaged to the inclined part, and to thereby restrict the staple from moving in the third direction together with the inclined part, while the tip end portion moves from the second position to the third position; and a crown support part adjacent to the restriction portion on the second position-side and located below the crown portion of the staple while the restriction portion restricts movement of the staple.

(1-2)

In the above (1-1), the crown support part is urged toward the inclined part so as to come into contact with the crown portion from below, while the tip end portion moves from the second position to the third position.

(1-3)

In the above (1-1) or (1-2), the crown support part has such a shape where it is tapered on the crown portion-side.

(1-4)

In any one of the above (1-1) to (1-3), the crown support part and the restriction portion are integrally configured.

(1-5)

A staple removing device including a placing table on which a sheet bundle bound by a staple including a crown portion and a pair of leg portions is placed; an inclined part including a base end portion and a tip end portion, having an inclined surface inclined so as to be thinner from the base end portion toward the tip end portion, the tip end portion being capable of moving between a first position and a third position via a second position along the placing table, and configured to be inserted between the sheet bundle and the staple when the tip end portion moves from the first position to the second position and to start pullout of the staple from the sheet bundle as the tip end portion further moves from the second position toward the third position; a contact portion located between the first position and the second position, and configured to face the inclined surface, and to contact, from the first position-side, the crown portion of the staple pulled out from the sheet bundle by the inclined part and engaged to the inclined part, while the tip end portion moves from the thickness position to the second position.

(1-6)

In the above (1-5), including a holding part configured to support the staple contact portion so as to hold the contact portion within a predetermined distance from the inclined surface while the tip end portion moves from the third position to the second position.

(1-7)

In the above (1-6), the holding part is urged toward the inclined part so as to bring the contact portion into contact with the inclined part.

(1-8)

In any one of the above (1-5) to (1-7), including a restriction portion located between the second position and the third position, and configured to face the inclined surface, to contact, from the third position-side, the crown portion of the staple pulled out from the sheet bundle by the inclined part and engaged to the inclined part, and to thereby restrict the staple from moving in the third direction together with the inclined part, while the tip end portion moves from the second position to the third position, wherein the contact portion is provided to face the restriction portion on the second position-side and is inclined in a direction of coming close to the restriction portion toward the inclined part.

(1-9)

In the above (1-8), an opening portion to which the staple pulled and peeled off from the inclined part by the contact portion drops is provided between the contact portion and the restriction portion.

(2-1)

A staple removing device including a placing table on which a sheet bundle bound by a staple is placed; a removing part located below the placing table, including a tip end portion capable of being inserted between the sheet bundle and the staple, and configured to remove the staple from the sheet bundle as the tip end portion is inserted between the sheet bundle and a crown portion of the staple; and a motor configured to move the removing part, wherein the removing part has a holding part configured to hold the crown portion of the staple removed from the sheet bundle by the removing part and having one end-side configured to be relatively openable and closable relative to the tip end portion of the removing part.

(2-2)

In the above (2-1), the removing part has an urging part for urging the tip end portion of the removing part and one end-side of the holding part in a direction of coming close to each other.

(2-3)

In the above (2-1) or (2-2), the removing part has a restriction portion configured to restrict an opening amount between the tip end portion of the removing part and one end-side of the holding part.

(2-4)

In any one of the above (2-1) to (2-3), the removing part has a rotary shaft between one end-side and the other end-side of the holding part, and one end-side of the holding part is configured to open and close with respect to the tip end portion of the removing part with the rotary shaft as a fulcrum.

(2-5)

In the above (2-4), the urging part and the restriction portion are arranged on the other end-side of the holding part with respect to the rotary shaft.

(2-6)

In the above (2-4) or (2-5), the restriction portion is configured to restrict the opening amount by coming into contact with the removing part by rotation with the rotary shaft as a fulcrum.

In the related art, a staple removing device configured to remove a staple from a sheet bundle produced by binding a plurality of sheets by using a staple (needle) having a crown portion and a pair of leg portions has been used. In a general staple removing device, the staple is removed from the sheet bundle by pressing the sheet in the vicinity of the staple with a pressing member and then inserting a wedge plate between the sheet bundle and the crown portion of the staple.

Here, in the sheet bundle, a load on the sheet surface, which is applied by the pair of leg portions penetrating through the sheet bundle and bent inwardly, may not be uniform. If the staple is removed from the sheet bundle in this state, one leg portion first comes out of the sheet bundle and the other leg portion remains in the sheet bundle, so that poor removal that the staple cannot be removed from the sheet bundle may occur.

In order to solve such a problem, technologies disclosed in JP-A-H05-16161 and JP-A-H08-141935 have been suggested. JP-A-H05-16161 discloses a manual stapler having a needle sandwiching part configured to overlap a needle removing part at an end of a bottom plate and to sandwich a needle during a needle pulling operation. In addition, JP-A-H08-141935 discloses a staple pullout device having a leaf spring for pressing in parallel a staple introduced between a wedge plate and the leaf spring and pulling out the staple without any trouble.

In the meantime, when binding a sheet bundle by a staple, staples having various wire diameters are used, depending on the number of sheets to be bound and the like. For example, when binding 30 to 50 sheets, a staple having a large wire diameter is used, and when binding 2 to 3 sheets, a staple having a small wire diameter is used. When removing staples from these various sheet bundles, the staple removing device of the related art has following problems.

Specifically, when removing a staple from a sheet bundle bound by the staple having a large wire diameter, it is necessary to press a crown portion with a certain load or greater by a holding part configured to hold the crown portion so as to prevent one leg portion of the staple from coming off first. In contrast, when removing a staple from a sheet bundle bound by the staple having a small wire diameter, if the sheet bundle is pressed with a high load by the holding part, the staple is firmly sandwiched between the wedge plate and the holding part, so that the staple may be dragged as the wedge plate moves forward, causing poor removal such as tearing of the sheet. According to the technologies disclosed in JP-A-H05-16161 and JP-A-H08-141935, it is difficult to solve the above-described two problems at the same time.

Therefore, in order to solve the above problems, an object of the present invention is to provide a staple removing device capable of removing staples having various wire diameters from a sheet bundle.

According to the aspect of the above (2-1), one end-side of the holding part is configured to be relatively openable and closable with respect to the tip end portion of the removing part. Therefore, it is possible to set the opening amount between the removing part and the holding part, according to a wire diameter of a staple to be used, so that it is possible to remove staples having various wire diameters from the sheet bundle.

(3-1)

A staple removing device including a placing part on which a sheet bundle bound by a staple having a crown portion and leg portions can be placed with the crown portion facing downward; a removing part located below the sheet bundle in a state where the sheet bundle is placed on the placing part, and configured to be insertable between the crown portion and the sheet bundle and to remove the staple from the sheet bundle by being inserted between the crown portion and the sheet bundle; and an accommodation part located below the removing part and configured to accommodate the removed staple, wherein the removing part has a staple drop portion for dropping the staple removed from the sheet bundle into the accommodation part.

(3-2)

In the above (3-1), the removing part has, as an inclined part including a tip end portion and a base end portion, a first incline part formed to increase continuously or intermittently in thickness in a first direction from the tip end portion toward the base end portion, and the first inclined part is configured to be inserted between the crown portion and the sheet bundle from the tip end portion and to remove the staple from the sheet bundle by being inserted between the crown portion and the sheet bundle.

(3-3)

In the above (3-2), the staple drop portion is located downstream of the first inclined part with respect to the first direction.

(3-4)

In the above (3-3), the staple drop portion has a narrow portion having a width dimension narrower than a maximum width dimension of the first inclined part.

(3-5)

In the above (3-4), the width dimension of the narrow portion is the same or substantially the same from an uppermost portion to a lowermost portion in a thickness direction.

(3-6)

In the above (3-4), the narrow portion is located at least at a lowermost portion of the staple drop portion in a thickness direction of the staple drop portion.

(3-7)

In any one of the above (3-1) to (3-3), a width dimension of the staple drop portion becomes gradually narrow from an uppermost portion to a lowermost portion in a thickness direction.

(3-8)

In any one of the above (3-1) to (3-3), a width dimension of the staple drop portion becomes stepwise narrow from an uppermost portion to a lowermost portion in a thickness direction.

(3-9)

In any one of the above (3-1) to (3-3), a width dimension of the staple drop portion becomes narrow in a curved shape from an uppermost portion to a lowermost portion in a thickness direction.

(3-10)

In any one of the above (3-2) to (3-9), the first inclined part has a first inclination formed to increase in thickness in the first direction, and the staple drop portion has a second inclination formed to increase in thickness in the first direction and having an inclination greater than the first inclination.

In the related art, disclosed is a staple removing device configured to remove a staple from a sheet bundle (Japanese Patent No. 4,078,728). This type of the staple removing device is configured to remove the staple from the sheet bundle by inserting a wedge-shaped plate between the sheet bundle and a crown portion of the staple.

A binding member removing device disclosed in Japanese Patent No. 4,078,728 includes a first insertion member configured to be inserted between a surface of a sheet bundle and a crown portion of a staple, and a second insertion member configured to be inserted between a back surface of the sheet bundle and leg portions of the staple, and is configured to pull out the staple from the sheet bundle by inserting the second insertion member between the sheet bundle and the leg portions to raise the leg portions of the staple and then inserting the first insertion member between the sheet bundle and the crown portion. The pulled-out staple freely drops and is collected in a collection box.

However, the leg portions of the staple pulled out from the sheet bundle may be held and engaged to the first insertion member by a restoring force of the leg portions (a force by which the leg portions close inward (springback)), so that the leg portions may not separate from the first insertion member and the staple may not drop. In this case, it was necessary for the user to manually remove the staple from the first insertion member or to separately provide a mechanism for removing the staple from the first insertion member.

Therefore, it is an object of the present invention to provide a staple removing device configured to enable a removed staple to easily drop from a removing part when removing the staple from a sheet bundle by inserting the removing part between the sheet bundle and the staple.

According to the staple removing device of the above (3-1), the removing part is provided with the staple drop portion for dropping the removed staple into the accommodation part. Therefore, the staple can be dropped from the removing part without the user manually removing the staple held and engaged to the removing part or separately providing a mechanism for dropping the staple from the removing part.

The subject application is based on Japanese Patent Application Nos. 2019-142574 and 2019-142575 filed on Aug. 1, 2019, 2019-184850 filed on Oct. 7, 2019, and 2020-119478 filed on Jul. 10, 2020, which are incorporated herein by reference.

REFERENCE SIGNS LIST

1A, 1B, 1C, 1D, 1E, 1F, 1G, 1H, 1I, 1J: staple removing device
102: placing table
112: left frame (support member)
113: guide groove (guide portion)
113*a*: first groove
113*b*: second groove
114: right frame (support member)
115: guide groove (guide portion)
115*a*: first groove
115*b*: second groove
120: removing part
122: wedge plate
122E: wedge plate
122*ac*: inclined surface
122*a*: wedge plate main body
122*c*: narrowed portion
122*i*: inclined part
140: pressing portion (restriction portion)
152: first motor (motor)
500: crown support part (support part)
600: staple contact portion (contact portion
602: holding member (holding part)
L1: standby position (first position)
L2: removal position (second position)
L2*a*: removal start position (second position)
L3: removal completion position (third position)
S: staple
P: sheet bundle
125: spring (urging part)
126, 226, 326: crown holder (holding part)
127*a*, 127*b*: restriction portion
136: first drive shaft (rotary shaft)
152: first motor (motor)
176: sheet pressing plate (sheet pressing part)
W1, W2: opening amount
1001: staple removing device
1102: placing part
1122, 1222, 1322, 1422, 1522: removing part
1122*a*, 1222*a*, 1322*a*, 1422*a*, 1522*a*: wedge plate (first inclined part
1122*a*1, 1222*a*1, 1322*a*1, 1422*a*1, 1522*a*1: inclination of removing part
1122*b*, 1222*b*, 1322*b*, 1422*b*, 1522*b*: attaching portion
1122*c*, 1222*c*, 1322*c*, 1422*c*, 1522*c*: staple drop portion
1122*c*1, 1222*c*1, 1322*c*5, 1422*c*1, 1522*c*1: narrow portion
1122*c*2, 1222*c*2, 1322*c*2, 1422*c*2, 1522*c*2: inclination of staple drop portion
1122S: tip end portion
1122K: base end portion
1200: accommodation part
Sa: crown portion
Sb: leg portion

The invention claimed is:

1. A staple removing device comprising:

a placing table on which a sheet bundle bound by a staple is placed;

a sheet pressing part configured to press against the sheet bundle placed on the placing table;

a removing part located below the placing table, configured to remove the staple from the sheet bundle placed on the placing table, and including a tip end portion that can be inserted between the sheet bundle and the staple and is configured to be movable along the placing table between a first position and a second position and to be inserted between the sheet bundle and the staple when the tip end portion moves to the second position; and a motor configured to move the removing part, wherein the placing table is provided with an opening into which the tip end portion can protrude, wherein the tip end portion moves while maintaining a state of protruding from the placing table via the opening at least until passing through the second position from a front of the second position, and wherein the tip end portion of the removing part is located below the placing table at the first position on a main body front side, and protrudes from the placing table at the second position on a main body rear side.

2. The staple removing device according to claim 1, wherein the tip end portion of the removing part is located below the placing table at the first position.

3. The staple removing device according to claim 1, comprising a support member provided along a moving direction of the removing part and having a guide portion configured to movably guide the removing part along the placing table, wherein the removing part has:

a first shaft provided on the tip end portion-side of the removing part and engaged to the guide portion, and a second shaft provided on a base end portion-side of the removing part and engaged to the guide portion, and wherein the guide portion is formed in such a shape that the second shaft is closer to the placing table than the first shaft when the removing part is at the first position.

4. The staple removing device according to claim 3, wherein the guide portion is formed in such a shape that the first shaft and the second shaft can move in parallel to the placing table at least until the tip end portion of the removing part passes through the second position from the front of the second position.

5. The staple removing device according to claim 1, comprising a support member provided along a moving direction of the removing part and having a guide groove configured to movably guide the removing part along the placing table, wherein the guide groove is formed so that the tip end portion of the removing part standing by at the first position is located below the placing table and the tip end portion of the removing part is caused to protrude from the placing table until passing through the second position from the front of the second position.

6. The staple removing device according to claim 5, wherein the guide groove comprises a first groove for locating, below the placing table, the tip end portion of the removing part standing by at the first position, and a second groove for moving the tip end portion of the removing part in a state of protruding from the placing table until passing through a removal position from the front of the second position.

7. The staple removing device according to claim 1, comprising a support member provided along a moving direction of the removing part and having a guide portion configured to movably guide the removing part along the placing table, wherein the removing part has:

a first shaft provided on the tip end portion-side of the removing part and engaged to the guide portion, and a second shaft provided on a base end portion-side of the removing part and engaged to the guide portion, and wherein the tip end portion protrudes from the placing table by rotating with the first shaft as a fulcrum.

8. The staple removing device according to claim 1, comprising:

a pair of pinions connected to an output shaft of the motor via at least one or more gears and arranged at a predetermined interval in a width direction, and a pair of racks extending in a traveling direction at the predetermined interval in the width direction and configured to engage with the pair of pinions.

9. The staple removing device according to claim 6, wherein the first groove extends along and parallel to a placing surface of the placing table, and wherein the second groove is formed at a lower position than the first groove via a step portion, and extends along and parallel to the placing surface of the placing table.

* * * * *